United States Patent [19]
Okino

[11] Patent Number: 5,386,228
[45] Date of Patent: Jan. 31, 1995

[54] IMAGE PICKUP DEVICE INCLUDING MEANS FOR ADJUSTING SENSITIVITY OF IMAGE PICKUP ELEMENTS

[75] Inventor: Tadashi Okino, Yokohama, Japan

[73] Assignee: Canon Kabushiki Kaisha, Tokyo, Japan

[21] Appl. No.: 900,471

[22] Filed: Jun. 18, 1992

[30] Foreign Application Priority Data

| Jun. 20, 1991 | [JP] | Japan | 3-148442 |
| Jun. 21, 1991 | [JP] | Japan | 3-149144 |
| Sep. 5, 1991 | [JP] | Japan | 3-225499 |
| Sep. 5, 1991 | [JP] | Japan | 3-225500 |
| Sep. 5, 1991 | [JP] | Japan | 3-225501 |
| Sep. 5, 1991 | [JP] | Japan | 3-225502 |
| Sep. 20, 1991 | [JP] | Japan | 3-240758 |
| Nov. 11, 1991 | [JP] | Japan | 3-294451 |

[51] Int. Cl.$^6$ .................................. H04N 5/232
[52] U.S. Cl. ...................... 348/218; 348/229
[58] Field of Search ............ 358/213.28, 225, 213.11, 358/209; 348/218, 229, 362

[56] References Cited

U.S. PATENT DOCUMENTS

| 4,038,690 | 7/1977 | Hoagland | 358/213 |
| 4,634,882 | 1/1987 | Craine et al. | 250/578 |
| 4,641,215 | 2/1987 | Katoh et al. | 360/35.1 |
| 4,656,517 | 4/1987 | Shida et al. | 358/213.28 |
| 4,663,656 | 5/1987 | Elabd et al. | 358/75 |
| 4,689,686 | 8/1987 | Hashimoto et al. | 358/213.26 |
| 4,712,134 | 12/1987 | Murakami | 358/213.28 |
| 4,823,202 | 4/1989 | Morizumi | 358/213.28 |
| 4,940,309 | 7/1990 | Baum | 350/171 |
| 5,130,814 | 7/1992 | Spencer | 358/213.28 |
| 5,194,959 | 3/1993 | Kameko et al. | 358/213.28 |

FOREIGN PATENT DOCUMENTS

| 0001535 | 4/1979 | European Pat. Off. . |
| 0256131 | 2/1988 | European Pat. Off. . |
| 2729291 | 1/1979 | Germany | 358/213.28 |
| 3432185 | 3/1985 | Germany | H04N 1/028 |
| 59-126378 | 7/1984 | Japan . |
| 61-281682 | 12/1986 | Japan . |
| 672385 | 11/1989 | Sweden | H04N 1/10 |
| 2061660 | 5/1981 | United Kingdom . |
| WO90/02466 | 3/1990 | WIPO | H04N 7/14 |

OTHER PUBLICATIONS

Japanese Patent Abstract No. 62-190980, vol. 12, No. 38 (E-580) (2885).
Japanese Patent Abstract No. 58-9480, vol. 7, No. 80 (E-168) (1125).
Japanese Patent Abstract No. 62-69672, vol. 11, No. 265 (E-535) (2712).

Primary Examiner—Joseph Mancuso
Assistant Examiner—Wendy R. Greening
Attorney, Agent, or Firm—Fitzpatrick, Cella, Harper & Scinto

[57] ABSTRACT

An image pickup device includes a split member for splitting image pickup light from an object into a plurality of beams in equal light amounts, and forming object images at different positions, a plurality of image pickup elements, light-receiving portions of which are arranged at split positions which are not adjacent to each other when an object image is split into a plurality of image portions on each image formation plane, and an image synthesizing circuit for receiving information from the image pickup elements, and synthesizing the object image. The image pickup elements are controlled by a timing signal from a single clock generation circuit.

19 Claims, 53 Drawing Sheets

FIG. 1
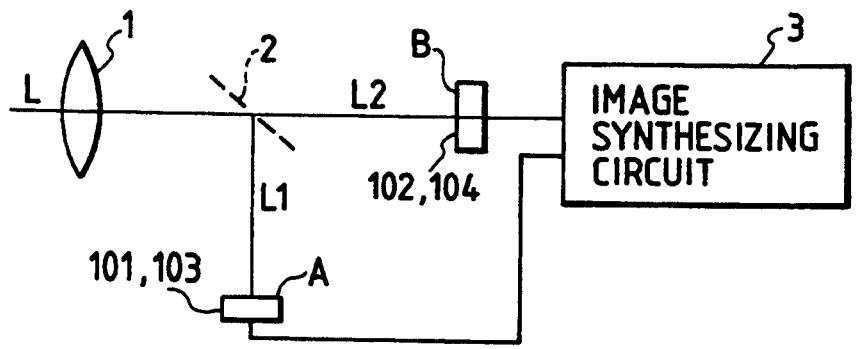
FIG. 2A
FIG. 2B
FIG. 3
FIG. 4
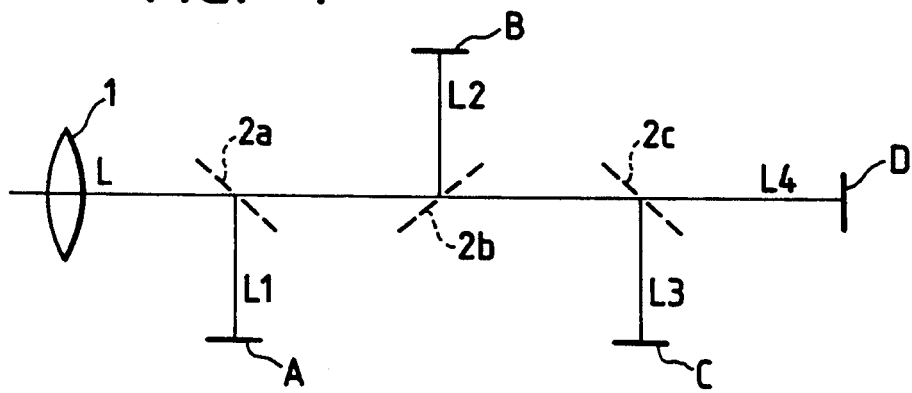

| 1<br>a1 | 2 | 3<br>a2 | 4 |
|---|---|---|---|
| 5 | 6 | 7 | 8 |
| 9<br>a3 | 10 | 11<br>a4 | 12 |
| 13 | 14 | 15 | 16 |

| 1 | 2<br>b1 | 3 | 4<br>b2 |
|---|---|---|---|
| 5 | 6 | 7 | 8 |
| 9 | 10<br>b3 | 11 | 12<br>b4 |
| 13 | 14 | 15 | 16 |

| 1 | 2 | 3 | 4 |
|---|---|---|---|
| 5<br>c1 | 6 | 7<br>c2 | 8 |
| 9 | 10 | 11 | 12 |
| 13<br>c3 | 14 | 15<br>c4 | 16 |

| 1 | 2 | 3 | 4 |
|---|---|---|---|
| 5 | 6<br>d1 | 7 | 8<br>d2 |
| 9 | 10 | 11 | 12 |
| 13 | 14<br>d3 | 15 | 16<br>d4 |

FIG. 6

| 1<br>a1 | 2<br>b1 | 3<br>a2 | 4<br>b2 |
|---|---|---|---|
| 5<br>c1 | 6<br>d1 | 7<br>c2 | 8<br>d2 |
| 9<br>a3 | 10<br>b3 | 11<br>a4 | 12<br>b4 |
| 13<br>c3 | 14<br>d3 | 15<br>c4 | 16<br>d4 |

FIG. 8A

| a1 | b1 |  |
|----|----|--|

FIG. 8B

| a | b | a | b | a | b | a | b |
|---|---|---|---|---|---|---|---|

FIG. 9A

| a1 | b1 |
|----|----|
| c1 | d1 |

FIG. 9B

| a | b | a | b | a | b | a | b |
|---|---|---|---|---|---|---|---|
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |

FIG. 19A

| 1 a1 | 2 b1 | 3 a2 | 4 b2 |
|---|---|---|---|
| 5 c1 | 6 d1 | 7 c2 | 8 d2 |
| 9 a3 | 10 b3 | 11 a4 | 12 b4 |
| 13 c3 | 14 d3 | 15 c4 | 16 d4 |

FIG. 19B

| a | b | a | b | a | b | a | b |
|---|---|---|---|---|---|---|---|
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |

FIG. 25A
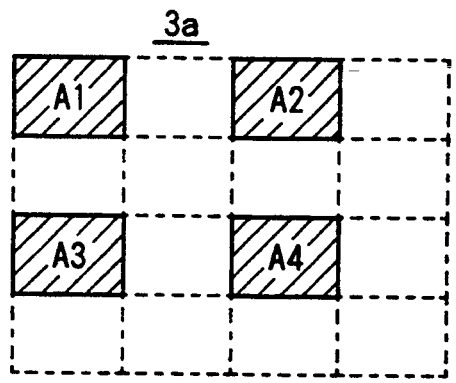
FIG. 25B
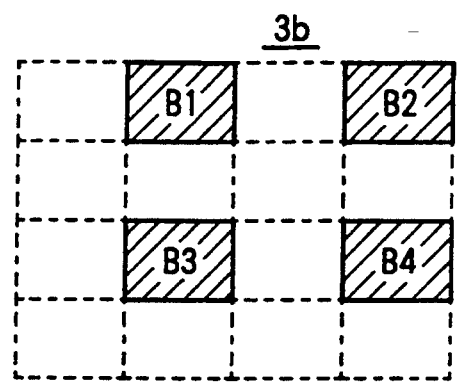
FIG. 25C
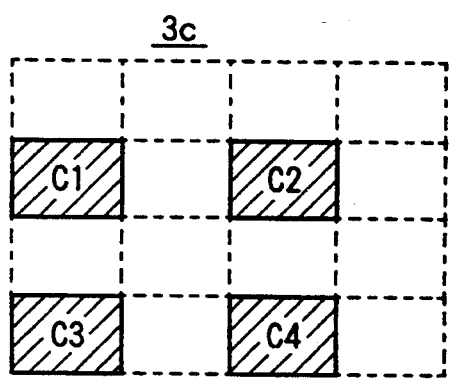
FIG. 25D
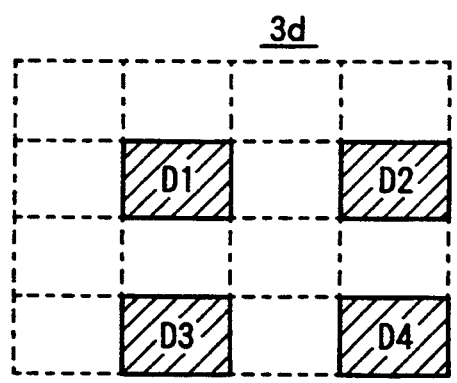
FIG. 26
| A1 | B1 | A2 | B2 |
|----|----|----|----|
| C1 | D1 | C2 | D2 |
| A3 | B3 | A4 | B4 |
| C3 | D3 | C4 | D4 |

FIG. 34A
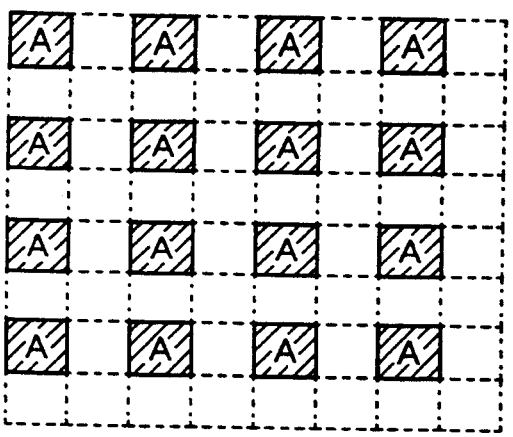
FIG. 34B
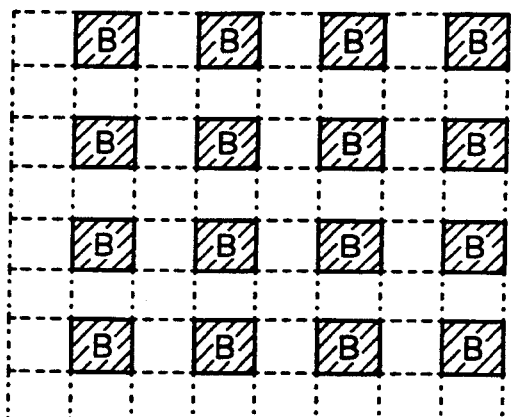
FIG. 34C
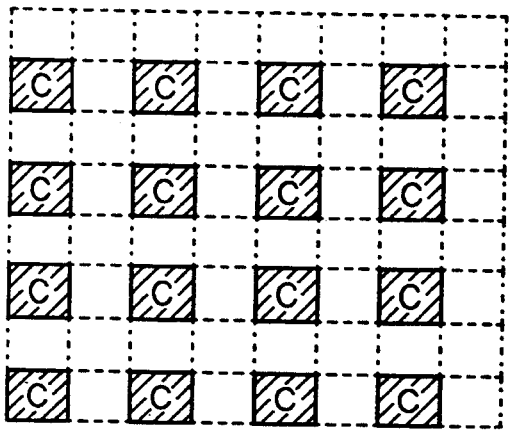
FIG. 34D
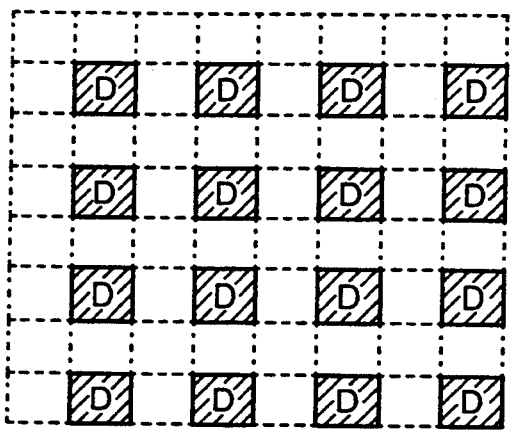
FIG. 35
| A | B | A | B | A | B | A | B |
|---|---|---|---|---|---|---|---|
| C | D | C | D | C | D | C | D |
| A | B | A | B | A | B | A | B |
| C | D | C | D | C | D | C | D |
| A | B | A | B | A | B | A | B |
| C | D | C | D | C | D | C | D |
| A | B | A | B | A | B | A | B |
| C | D | C | D | C | D | C | D |

| 1 a1 | 2 | 3 a2 | 4 |
| --- | --- | --- | --- |
| 5 | 6 | 7 | 8 |
| 9 a3 | 10 | 11 a4 | 12 |
| 13 | 14 | 15 | 16 |

| 1 | 2 b1 | 3 | 4 b2 |
| --- | --- | --- | --- |
| 5 | 6 | 7 | 8 |
| 9 | 10 b3 | 11 | 12 b4 |
| 13 | 14 | 15 | 16 |

| 1 | 2 | 3 | 4 |
| --- | --- | --- | --- |
| 5 c1 | 6 | 7 c2 | 8 |
| 9 | 10 | 11 | 12 |
| 13 c3 | 14 | 15 c4 | 16 |

| 1 | 2 | 3 | 4 |
| --- | --- | --- | --- |
| 5 | 6 d1 | 7 | 8 d2 |
| 9 | 10 | 11 | 12 |
| 13 | 14 d3 | 15 | 16 d4 |

FIG. 47

| 1 a1 | 2 b1 | 3 a2 | 4 b2 |
| --- | --- | --- | --- |
| 5 c1 | 6 d1 | 7 c2 | 8 d2 |
| 9 a3 | 10 b3 | 11 a4 | 12 b4 |
| 13 c3 | 14 d3 | 15 c4 | 16 d4 |

FIG. 49A

| a1 | b1 | |
|----|----|---|

FIG. 49B

| a | b | a | b | a | b | a | b |
|---|---|---|---|---|---|---|---|

FIG. 50A

| a1 | b1 |
|----|----|
| c1 | d1 |

FIG. 50B

| a | b | a | b | a | b | a | b |
|---|---|---|---|---|---|---|---|
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |

FIG. 53
| A1 | B1 | A2 | B2 |
|----|----|----|----|
| C1 | D1 | C2 | D2 |
| A3 | B3 | A4 | B4 |
| C3 | D3 | C4 | D4 |
FIG. 54A
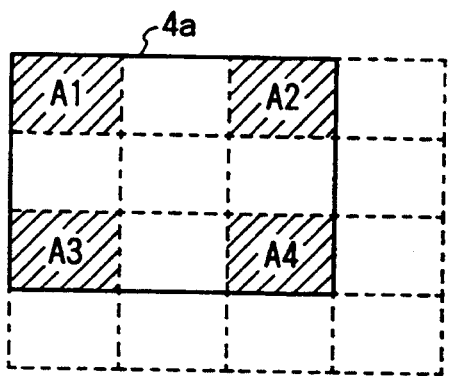
FIG. 54B
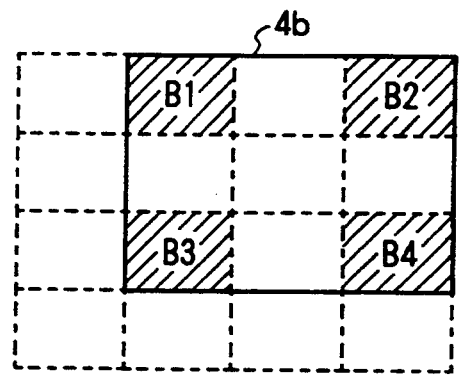
FIG. 54C
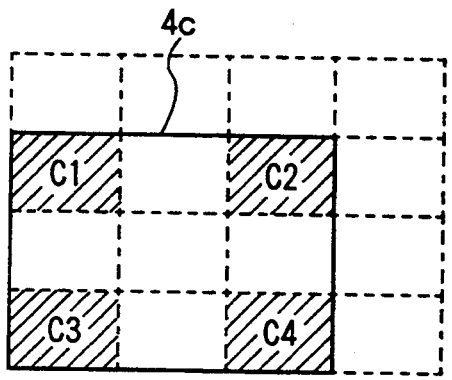
FIG. 54D
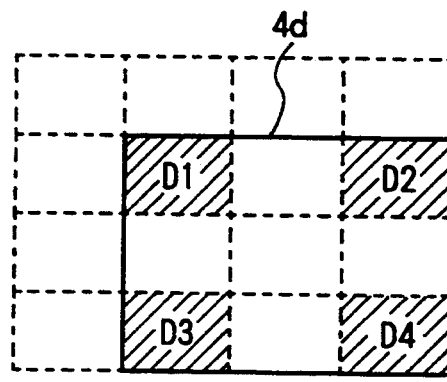

FIG. 62

| A | B |
|---|---|
| C | D |

FIG. 64

| A | B | A | B | A | B | A | B |
|---|---|---|---|---|---|---|---|
| C | D | C | D | C | D | C | D |
| A | B | A | B | A | B | A | B |
| C | D | C | D | C | D | C | D |
| A | B | A | B | A | B | A | B |
| C | D | C | D | C | D | C | D |
| A | B | A | B | A | B | A | B |
| C | D | C | D | C | D | C | D |

FIG. 67A
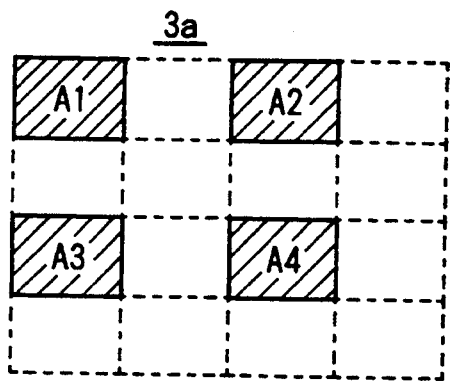
FIG. 67B
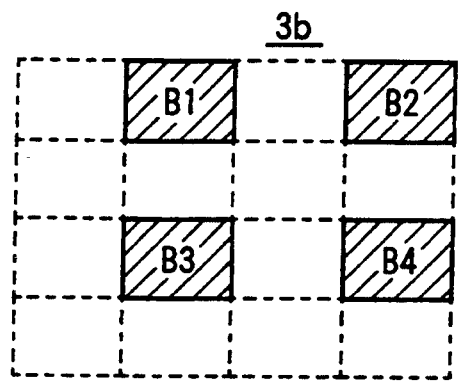
FIG. 67C
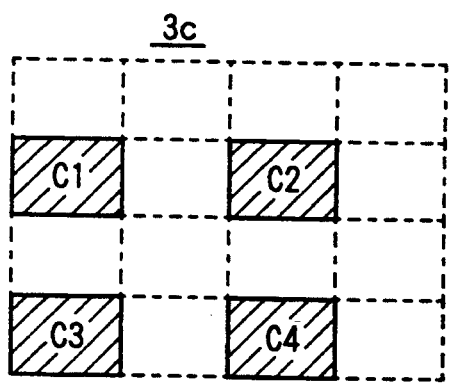
FIG. 67D
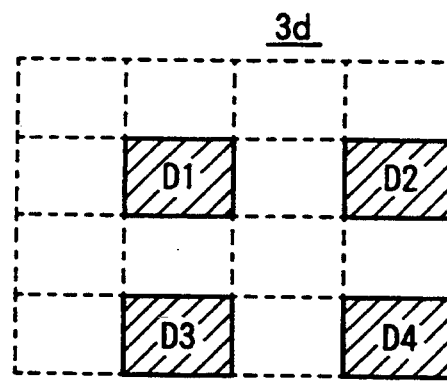
FIG. 68
| A1 | B1 | A2 | B2 |
|----|----|----|----|
| C1 | D1 | C2 | D2 |
| A3 | B3 | A4 | B4 |
| C3 | D3 | C4 | D4 |

FIG. 73

| A | B |
|---|---|
| C | D |

FIG. 75

| A | B | A | B | A | B | A | B |
|---|---|---|---|---|---|---|---|
| C | D | C | D | C | D | C | D |
| A | B | A | B | A | B | A | B |
| C | D | C | D | C | D | C | D |
| A | B | A | B | A | B | A | B |
| C | D | C | D | C | D | C | D |
| A | B | A | B | A | B | A | B |
| C | D | C | D | C | D | C | D |

FOCAL PLANE 3

FOCAL PLANE 4

SYNTHESIZATION

FIG. 80A

| A1 | N | A2 | N |
|----|---|----|---|
| N  | N | N  | N |
| A3 | N | A4 | N |
| N  | N | N  | N |

| N | B1 | N | B2 |
|---|----|---|----|
| N | N  | N | N  |
| N | B3 | N | B4 |
| N | N  | N | N  |

| N  | N | N  | N |
|----|---|----|---|
| C1 | N | C2 | N |
| N  | N | N  | N |
| C3 | N | C4 | N |

| N | N  | N | N  |
|---|----|---|----|
| N | D1 | N | D2 |
| N | N  | N | N  |
| N | D3 | N | D4 |

| A | B | A | B |
|---|---|---|---|
| C | D | C | D |
| A | B | A | B |
| C | D | C | D |

IMAGE PICKUP DEVICE INCLUDING MEANS FOR ADJUSTING SENSITIVITY OF IMAGE PICKUP ELEMENTS

BACKGROUND OF THE INVENTION

1. Field of the Invention

The present invention relates to an image pickup device comprising a plurality of image pickup tubes or an image pickup board such as a CCD, MOS element, or the like as an image pickup element.

2. Related Background Art

An image pickup device, which photoelectrically converts image pickup light from an object using an image pickup element such as a CCD, and processes the converted electrical signal to display or record an object image, is known. As the image pickup element used as a photoelectric conversion element, elements having several hundred thousand pixels can be mass-produced according to the recent advance of IC techniques, and are popularly used in home video cameras. In order to meet a high-quality requirement of users, so-called "hi-vision" standard image pickup devices, which can assure higher image quality than the existing NTSC standard devices, are changing from an examination stage to a practical application stage. The hi-vision standard image pickup element requires a degree of integration as high as about two million pixels, and high-grade manufacturing techniques, resulting in a very expensive element. In addition, the signal read frequency is as high as several ten MHz, thus requiring high-grade circuit techniques.

Under these circumstances, a plurality of image pickup elements which are used in a conventional home video camera, and have several hundred thousand pixels, are arranged adjacent to each other on an image formation plane of an object image so as to obtain a high resolution corresponding to several million pixels. However, since the image pickup elements are normally sealed in packages, they cannot be closely arranged adjacent to each other on a single plane. Therefore, the above-mentioned expensive high-integration image pickup element requiring the high-grade techniques must be used.

In a conventional image pickup device, in order to increase the resolution, the high-integration image pickup element must be used, resulting in an expensive device, and necessity of difficult circuit techniques.

The number of pixels of an image pickup element, which can be formed in a unit image size, will undoubtedly keep on increasing according to future advance of semiconductor manufacturing techniques. However, when the number of pixels of the image pickup element is increased, the area per pixel is decreased almost inversely proportionally to the number of pixels. As a result, a light incident amount per pixel is decreased in proportion to the area per pixel, and sensitivity is decreased accordingly.

The same applies to an image pickup tube. That is, as the spot size of an electron beam is decreased, the resolution can be increased. However, the sensitivity is decreased for the same reason as described above.

In a conventional image pickup device, as described above, when the light incident amount is decreased, sensitivity is decreased, and image quality of a dark portion (low-brightness portion) of an object is especially deteriorated. In addition, in order to prevent a decrease in S/N, the standard signal level of an image pickup element must be set to be relatively high.

SUMMARY OF THE INVENTION

The present invention has been made in consideration of the above-mentioned problems, and has as its object to provide a low-cost image pickup device, which can obtain a high resolution by increasing the number of effective pixels without using a high-integration image pickup element, and can improve image quality with a simple circuit.

An image pickup device according to an aspect of the present invention comprises split means for splitting image pickup light from an object into a plurality of beams in equal light amounts, and forming object images at different positions, a plurality of image pickup elements, light-receiving portions of which are arranged at split positions which are not adjacent to each other when an object image is split into a plurality of image portions on each image formation plane, and an image synthesizing circuit for receiving information from the image pickup elements, and synthesizing the object image. The image pickup elements are controlled by a timing signal from a single clock generation circuit.

In the image pickup device according to the above-mentioned aspect, image pickup light from an object is split and guided along a plurality of optical paths, and a plurality of object images are formed at different positions. Each object image is also split into a plurality of image portions, and pieces of image information output from the image pickup elements arranged at the non-neighboring split positions of the object image are input to the image synthesizing circuit. The image synthesizing circuit synthesizes the entire object image.

It is another object of the present invention to provide an image pickup device, which can correct a variation in sensitivity among image pickup elements when a plurality of conventional image pick-up elements are used to increase the number of effective pixels, and is free from brightness nonuniformity.

According to another aspect of the present invention, an image pickup device comprises split means for splitting image pickup light from an object into a plurality of beams in equal light amounts, and forming object images at different positions, a plurality of image pickup elements, light-receiving portions of which are arranged at split positions which are not adjacent to each other when an object image is split into a plurality of portions on each image formation plane, so that each of the light-receiving portions partially overlaps the light-receiving portion at least at a neighboring split position of another image formation plane, an image synthesizing circuit for receiving information from the image pickup elements, and synthesizing the object image, and a correction circuit for comparing outputs from the overlap portions of the image pickup elements, and adjusting sensitivity levels of the image pickup elements.

In the image pickup device according to the above aspect, image pickup light from an object is split and guided along a plurality of optical paths, and a plurality of object images are formed at different positions. Each object image is also split into a plurality of images, and pieces of image information output from the image pickup elements arranged at the non-neighboring split positions of the object image are input to the image synthesizing circuit. The image synthesizing circuit synthesizes the entire object image. The light-receiving portions at least at neighboring positions on different image formation planes partially overlap each other, and the sensitivity levels of the image pickup elements are adjusted based on outputs from the overlapping portions.

It is still another object of the present invention to provide an image pickup device which can use even a plurality of image pickup elements having large packages.

According to still another aspect of the present invention, an image pickup device comprises split means for splitting image pickup light from an object into a plurality of beams in equal light amounts, and forming object images at different positions, a plurality of image pickup elements each having a plurality of light-receiving portions, which are split on a plane, the light-receiving portions being arranged at split positions which are not adjacent to each other when an object image is split into a plurality of image portions on each image formation plane, and an image synthesizing circuit for receiving information from the image pickup elements, and synthesizing the object image.

In the image pickup device according to the above aspect, image pickup light from an object is split and guided along a plurality of optical paths, and a plurality of object images are formed at different positions. Each object image is also split into a plurality of images, and pieces of image information output from the image pickup elements in which the split light-receiving portions are arranged at the non-neighboring split positions of the object image are input to the image synthesizing circuit. The image synthesizing circuit synthesizes the entire object image.

It is still another object of the present invention to provide an image pickup device having a high power saving effect, which can save power consumption when the number of effective pixels is increased to improve image quality.

According to still another aspect of the present invention, an image pickup device comprises split means for splitting image pickup light from an object into a plurality of beams in equal light amounts, and forming object images at different positions, a plurality of image pickup elements, light-receiving portions of which are arranged at split positions which are not adjacent to each other when an object image is split into a plurality of image portions on each image formation plane, an image synthesizing circuit for receiving information from the image pickup elements, and synthesizing the object image, and adjusting means for setting a photographing condition by utilizing an output from one or more of the plurality of image pickup elements. The image pickup elements are controlled by a timing signal from a single clock generation circuit.

In the image pickup device according to the above aspect, image pickup light from an object is split and guided along a plurality of optical paths, and a plurality of object images are formed at different positions. Each object image is also split into a plurality of images, and pieces of image information output from the image pickup elements arranged at the non-neighboring split positions of the object image are input to the image synthesizing circuit. The image synthesizing circuit synthesizes the entire object image. The adjusting means performs automatic exposure adjustment, automatic focusing adjustment, automatic white balance adjustment, and the like on the basis of outputs from some image pickup elements.

It is still another object of the present invention to provide an image pickup device which has a good space factor of each image pickup element chip when a plurality of image pickup elements are used, and also has improved anti-noise characteristics.

According to still another aspect of the present invention, an image pickup device comprises split means for splitting image pickup light from an object into a plurality of beams in equal light amounts, and forming object images at different positions, a plurality of image pickup element chips each having a plurality of light-receiving portions, which are split on a plane, the light-receiving portions being arranged at split positions which are not adjacent to each other when an object image is split into a plurality of image portions on each image formation plane, and an image synthesizing circuit for receiving information from the image pickup element chips, and synthesizing the object image. A peripheral circuit portion of each image pickup element is formed between the split light-receiving portions of the image pickup element chip. Drivers for driving the image pickup element chips are arranged in correspondence with the light-receiving portions, and are controlled by a timing signal from a single clock generation circuit. Each image pickup element chip multiplexes information from the light-receiving portions, and outputs the multiplexed information.

In the image pickup device according to the above aspect, image pickup light from an object is split and guided along a plurality of optical paths, and a plurality of object images are formed at different positions. Each object image is also split into a plurality of images, and pieces of image information output from the image pickup element chips in which the split light-receiving portions are arranged at the non-neighboring split positions of the object image are input to the image synthesizing circuit. The image synthesizing circuit synthesizes the entire object image. In this case, since the peripheral circuit portion for each image pickup element is arranged between a plurality of split light-receiving portions of the element, a good space factor can be obtained. In addition, since short wiring lines can be used, the influence of noise can be eliminated.

It is still another object of the present invention to provide an image pickup device, which allows easy bonding of image pickup elements, and can improve machinability and reliability.

According to still another aspect of the present invention, an image pickup device comprises split means for splitting image pickup light from an object into a plurality of beams in equal light amounts, and forming object images at different positions, a plurality of image pickup element chips each having a plurality of light-receiving portions, which are split on a plane, the light-receiving portions being arranged at split positions which are not adjacent to each other when an object image is split into a plurality of image portions on each image formation plane, and an image synthesizing circuit for receiving information from the image pickup element chips, and synthesizing the object image. A wiring pattern to be connected to a connection portion arranged at a side edge of each image pickup element chip is formed between the split light-receiving portions of the image pickup element chip.

In the image pickup device according to the above aspect, image pickup light from an object is split and guided along a plurality of optical paths, and a plurality of object images are formed at different positions. Each object image is also split into a plurality of images, and pieces of image information output from the image pickup element chips in which the split light-receiving portions are arranged at the non-neighboring split positions of the object image are input to the image synthesizing circuit. The image synthesizing circuit synthesizes the entire object image. In this case, since the wiring pattern connected to the connection portion arranged at the side edge of the image pickup element chip is formed between the plurality of split light-receiving portions, bonding is easy. In addition, since short wiring lines can be used, the influence of noise can be eliminated.

It is still another object of the present invention to provide an image pickup device which can obtain good image quality for a dark portion of an object as well as a bright portion of the image, can set a low standard signal level of an image pickup element, and can widen a dynamic range of the image pickup element.

In order to achieve this object, an image pickup device according to still another aspect of the present invention comprises an image pickup element for photoelectrically converting image pickup light from an object to output image signals in units of pixels, and an operation circuit for, when an output level of the image signal is equal to or lower than a predetermined value, determining a signal obtained by adding and averaging image signals of neighboring pixels satisfying the same condition as image signals of these pixels.

According to still another aspect of the present invention, an image pickup device comprises a plurality of image pickup elements for photoelectrically converting image pickup light from an object to output image signals of corresponding color components in units of pixels, and an operation circuit for, when an output level of the image signal is equal to or lower than a predetermined value, determining a signal obtained by adding and averaging image signals of neighboring pixels satisfying the same condition as image signals of these pixels.

In the image pickup device of each of the above two aspects, image signals in units of pixels are output from the image pickup element. When the output level of each image signal is equal to or lower than a predetermined value, image signals of adjacent pixels under the same conditions are added and averaged. The averaged signal is output as image signals of these pixels. Therefore, sufficient image signals can be obtained for a dark portion of an object. When the level of an image signal of each color component in units of pixels output from each image pickup element is low, image signals of adjacent pixels under the same condition are added and averaged, thus obtaining a sufficient image signal for the color.

Other objects and features of the present invention will become apparent from the following description of the embodiment taken in conjunction with the accompanying drawings.

BRIEF DESCRIPTION OF THE DRAWINGS

FIG. 1 is a diagram showing principal part according to the first embodiment of the present invention;

FIGS. 2A and 2B are explanatory views showing states of image formation planes of FIG. 1;

FIG. 3 is an explanatory view showing a state obtained by synthesizing two pieces of image information shown in FIGS. 2A and 2B;

FIG. 4 is a diagram showing principal part according to the second embodiment of the present invention;

FIGS. 5A to 5D are explanatory views showing states of image formation planes of FIG. 4;

FIG. 6 is an explanatory view showing a state obtained by synthesizing four pieces of image information shown in FIGS. 5A to 5D;

FIGS. 8A and 8B are explanatory views showing an example wherein the number of image pickup elements is increased in the embodiment shown in FIG. 1;

FIGS. 9A and 9B are explanatory views showing an example wherein the number of image pickup elements is increased in the embodiment shown in FIG. 4;

FIGS. 19A and 19B are explanatory views showing an example wherein the number of image pickup elements is increased in the embodiment shown in FIG. 16;

FIGS. 25A to 25D are explanatory views showing states of image formation planes of FIG. 24;

FIG. 26 is an explanatory view showing a state obtained by synthesizing four pieces of image information shown in FIGS. 25A to 25D;

FIGS. 34A to 34D are explanatory views showing an example wherein the number of image pickup elements is increased in the embodiment shown in FIG. 24;

FIG. 35 is an explanatory view showing a state obtained by synthesizing four pieces of image information shown in FIGS. 34A to 34D;

FIGS. 46A to 46D are explanatory views showing states of image formation planes of FIG. 45;

FIG. 47 is an explanatory view showing a state obtained by synthesizing two pieces of image information shown in FIGS. 46A and 46B;

FIGS. 49A and 49B are explanatory views showing an example wherein the number of image pickup elements is increased in the embodiment shown in FIG. 37;

FIGS. 50A and 50B are explanatory views showing an example wherein the number of image pickup elements is increased in the embodiment shown in FIG. 45;

FIG. 53 is an explanatory view showing a state obtained by synthesizing four pieces of image information shown in FIGS. 52A to 52D;

FIGS. 54A to 54D are explanatory views showing setting examples of light-receiving portions of an image pickup element chip shown in FIGS. 52A to 52D;

FIG. 62 is an explanatory view showing a basic unit when the number of effective pixels is increased;

FIGS. 63A to 63D are explanatory views showing an example wherein the number of image pickup element chips is increased;

FIG. 64 is an explanatory view showing a state obtained by synthesizing four pieces of image information shown in FIGS. 63A to 63D;

FIGS. 67A to 67D are explanatory views showing states of image formation planes of FIG. 66;

FIG. 68 is an explanatory view showing a state obtained by synthesizing four pieces of image information shown in FIGS. 67A to 67D;

FIG. 73 is an explanatory view showing a basic unit when the number of effective pixels is increased;

FIG. 74A to 74D are explanatory views showing an example wherein the number of effective pixels is increased;

FIG. 75 is an explanatory view showing a state obtained by synthesizing image information shown in FIG. 74;

FIGS. 80A to 80E are explanatory views of image formation planes of an optical system according to the thirteenth embodiment of the present invention;

FIGS. 85A to 85E are explanatory views of image formation planes of the optical system of the extended example shown in FIG. 84;

DETAILED DESCRIPTION OF THE PREFERRED EMBODIMENTS

Figure 7:
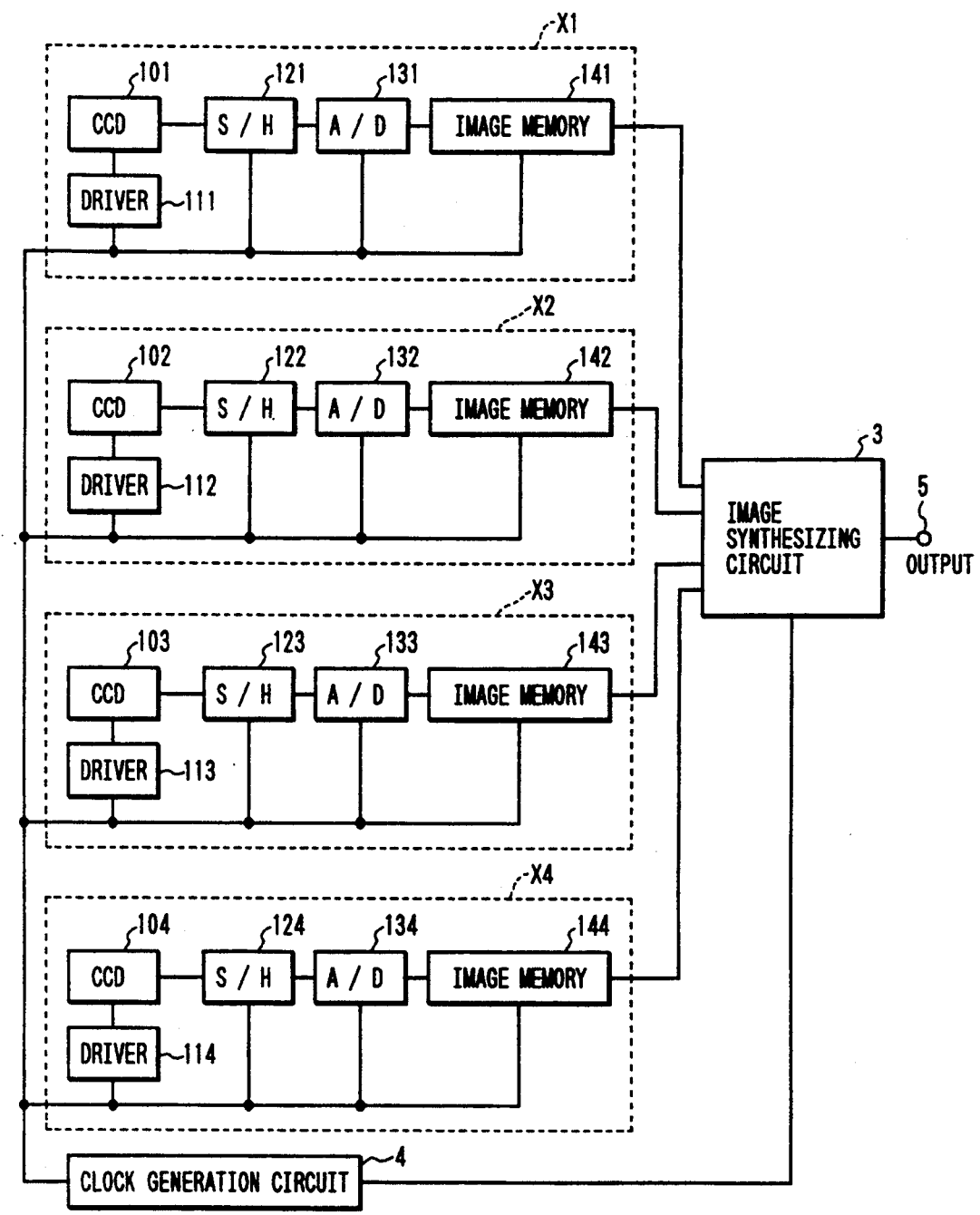
FIG. 7 is a block diagram showing a detailed circuit arrangement of an image pickup device having the arrangement shown in FIG. 1.

FIG. 1 is a diagram showing principal part of an image pickup device according to the first embodiment of the present invention. The image pickup device shown in FIG. 1 includes an imaging lens 1 through which image pickup light L from an object passes, and a beam splitter 2 as split means for splitting the image pickup light L into a plurality of beams L1 and L2 in equal light amounts, and forming object images at different positions. The beam splitter 2 comprises, e.g., a half mirror. The image pickup device also includes a plurality of image pickup elements (e.g., CCDs) 101 to 104 whose light-receiving portions are arranged on image formation planes A and B of the split object images. The light-receiving portions are arranged at non-neighboring split positions when an object image is split into a plurality of images/in this case, four images) on each of the image formation planes A and B. More specifically, since the image pickup elements 101 to 104 are sealed in packages, an object image is split into a plurality of images on each of the image formation planes A and B, and the image pickup elements 101 to 104 are arranged at non-neighboring positions so as not to interfere with each other. The image pickup device also includes an image synthesizing circuit 3 for receiving image information from the image pickup elements 101 to 104 to synthesize the entire object image.

In the image pickup device having the above-mentioned arrangement, the image pickup light L received from an object through the lens 1 is guided as the beams L1 and L2 having equal light amounts along two optical paths split by the beam splitter 2, and the beams L1 and L2 reach the corresponding image formation planes (focal planes) A and B. Thus, object images having the same size and the same brightness are formed on the image formation planes A and B. FIGS. 2A and 2B show states of the image formation planes A and B. FIG. 2A shows the state of the image formation plane A, and FIG. 2B shows the state of the image formation plane B.

On each of the image formation planes A and B, an object image is split into four images. On the image formation plane A, light-receiving portions a1 and a2 of the image pickup elements 101 and 103 are respectively located at the first and third split positions which are not adjacent to each other. On the image formation plane B, light-receiving portions b1 and b2 of the image pickup elements 102 and 104 are respectively located at the second and fourth split positions which are not adjacent to each other. Four pieces of image information photoelectrically converted by the image pickup elements 101 to 104 are input to the image synthesizing circuit 3, and are synthesized, as shown in FIG. 3, thereby forming a complete object image as a whole.

The total number of effective pixels on the image formation planes A and B can be four times that of a single image pickup element, and a resolution equivalent to that obtained when an image pickup element having the number of pixels four times that of a conventional image pickup element, can be obtained, thus obtaining an image having improved image quality. Since conventional image pickup elements used in a home video camera can be used without using a high-integration image pickup element, a low-cost image pickup device can be constituted by a simple circuit.

FIG. 4 is a diagram showing the second embodiment of the present invention. The same reference numerals in FIG. 4 denote the same parts as in FIG. 1. FIG. 4 illustrates only an image pickup optical system.

In the embodiment shown in FIG. 4, the number of split optical paths of image pickup light L is doubled, i.e., four as compared to the embodiment shown in FIG. 1, and three beam splitters 2a, 2b, and 2c are arranged. These beam splitters 2a, 2b, and 2c respectively have reflectances of 25% (¼), 33% (⅓), and 50% (½), and supply beams L1, L2, L3, and L4 having equal light amounts to four image formation planes A, B, C, and D, thus forming object images having the same size and the same brightness on the image formation planes A, B, C, and D. The object image on each of the image formation planes A, B, C, and D is split into a plurality of images, and light-receiving portions of image pickup elements (not shown) are arranged at non-neighboring split positions of the images. Pieces of image information from these image pickup elements are synthesized to form the entire object image.

In the embodiment shown in FIG. 4, an object image is split into 16 images (4×4 in the horizontal and vertical directions) on each of the image formation planes A, B, C, and D, as shown in FIGS. 5A to 5D. The light-receiving portions of the image pickup elements are arranged at non-neighboring four split positions on each image formation plane. More specifically, on the image formation plane A shown in FIG. 5A, light-receiving portions a1, a2, a3, and a4 are respectively arranged at the first, third, ninth, and eleventh positions. On the image formation plane B shown in FIG. 5B, light-receiving portions b1, b2, b3, and b4 are respectively arranged at the second, fourth, tenth, and twelfth positions. On the image formation plane C shown in FIG. 5C, light-receiving portions c1, c2, c3, and c4 are respectively arranged at the fifth, seventh, thirteenth, and fifteenth positions. On the image formation plane D shown in FIG. 5D, light-receiving portions d1, d2, d3, and d4 are respectively arranged at the sixth, eighth, fourteenth, and sixteenth positions.

Image information of an object, which is separately picked up by the 16 light-receiving portions a1 to a4, b1 to b4, c1 to c4, and d1 to d4 in the above-mentioned arrangement states of the image pickup elements on the image formation planes A, B, C, and D, is synthesized by the image synthesizing circuit, as described above. FIG. 6 shows the state of the synthesized image information, and illustrates contributions of the respective light-receiving portions to the object image. In this embodiment, the number of effective pixels on the image formation planes A, B, C, and D is 16 times that of a single image pickup element, and a resolution equivalent to that obtained when an image pickup element having the number of pixels 16 times that of a conventional image pickup element, can be obtained, thus obtaining an image with higher image quality than that of the embodiment shown in FIG. 1.

FIG. 7 is a block diagram showing a detailed circuit arrangement of the image pickup device having the arrangement shown in FIG. 1. The image pickup device shown in FIG. 7 includes an image pickup unit X1. The image pickup unit X1 comprises the image pickup element (e.g., a CCD) 101 shown in FIG. 1, a driver 111 for driving the image pickup element 101, an S/H circuit 121 for sampling and holding an output from the image pickup element 101, an A/D converter 131 for converting sampled/held analog image information into a digital signal, and an image memory 141 for storing the digital image information. The image pickup device also includes image pickup units X2, X3, and X4 having the same arrangement as that of the image pickup unit X1. More specifically, the image pickup units X2, X3, and X4 respectively comprise the image pickup elements 102, 103, and 104 shown in FIG. 1, drivers 112, 113, and 114, S/H circuits 122, 123, and 124, A/D converters 132, 133, and 134, and image memories 142, 143, and 144 like in the image pickup unit X1. The image pickup device also includes a single clock generation circuit 4. The operation timings of the drivers 111 to 114, the S/H circuits 121 to 124, the A/D converters 131 to 134, and the image memories 141 to 144 of the image pickup units X1 to X4 are controlled by a timing signal output from the clock generation circuit 4. In addition, the driving operations of the image pickup elements 101 to 104 are also controlled by this timing signal. The operation of the image synthesizing circuit 3 is also controlled by the timing signal from the clock generation circuit 4. An image signal from an output terminal 5 is output to a display or a recorder (not shown).

The image pickup elements 101 to 104 of the image pickup units X1 to X4 respectively have the light-receiving portions a1, b1, a2, and b2 shown in FIGS. 2A and 2B, and FIG. 3, and pieces of image information of the four split object images described above are respectively stored in the image memories 141 to 144. The pieces of image information stored in the image memories 141 to 144 are read out in response to the signal from the clock generation circuit 4, and are input to the image synthesizing circuit 3. The image synthesizing circuit 3 synthesizes the image information of the overall object, and an image signal obtained by picking up an object is output from the output terminal 5.

The circuit arrangement of the image pickup device having the arrangement shown in FIG. 4 can be realized by arranging 16 image pickup units shown in FIG. 7. Pieces of image information from the image pickup units need only be input to the image synthesizing circuit to form the overall object image.

The above-mentioned image memories 141 to 144 and the image synthesizing circuit 3 can be easily realized by using known memories and their control techniques, which are normally used. Therefore, a detailed description of these memories and image synthesizing circuit will be omitted. In addition, more beam splitters than those in the above embodiment may be used to increase the number of split object images on each image formation plane, thereby obtaining an image having a higher resolution.

In the embodiment shown in FIG. 1, when the light-receiving portions a1 and b1 are juxtaposed in a unit shown in FIG. 8A, the number of image pickup elements can be infinitely increased. FIG. 8B shows a case wherein light-receiving portions a and b are constituted by eight portions.

In the embodiment shown in FIG. 4, when light-receiving portions a1, b1, c1, and d1 are arranged in the vertical and horizontal directions in a unit shown in FIG. 9A, the number of image pickup elements can be infinitely increased. FIG. 9B shows a case wherein light-receiving portions a, b, c, and d are constituted by 64 portions.

In this manner, when an image formation optical path used in, e.g., an existing industrial-use multi-board camera is split into a plurality of paths by a beam splitter, the equivalent number of pixels can be greatly increased, and an image having higher image quality can be obtained. For example, when an image pickup element having four hundred thousand pixels and used in an existing home video camera is adopted in the present invention, the number of pixels can reach 1.6 million in the embodiment shown in FIG. 1, and can reach 6.4 million in the embodiment shown in FIG. 4. When the image size is further increased, the number of effective pixels can be infinitely increased.

As described above, according to the above-mentioned embodiments, image pickup light from an object is split into a plurality of beams in equal light amounts, and object images are formed at different positions. The light-receiving portions of the image pickup elements are arranged at non-neighboring split positions when the object image is split into a plurality of images on each image formation plane, and pieces of image information are synthesized later. Thus, the number of effective pixels can be increased using conventional image pickup elements without using a high-integration image pickup element, and image quality can be improved at low cost by a simple arrangement.

Figures 10, 11A, 11B, 12:
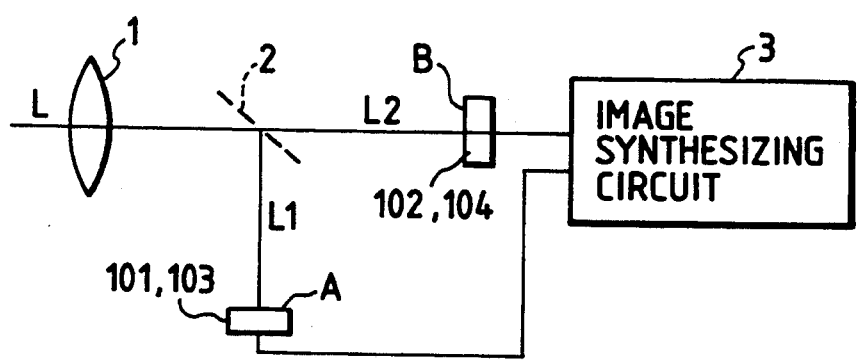
FIG. 10 is a diagram showing principal part according to the third embodiment of the present invention.
FIGS. 11A and 11B are explanatory views showing states of image formation planes of FIG. 10.
FIG. 12 is an explanatory view showing a state obtained by synthesizing two pieces of image information shown in FIGS. 11A and 11B.

FIG. 10 is a diagram showing principal part of an image pickup device according to the third embodiment of the present invention. The image pickup device shown in FIG. 10 includes an imaging lens 1 through which image pickup light L from an object passes, and a beam splitter 2 as split means for splitting the image pickup light L into a plurality of beams L1 and L2 in equal light amounts, and forming object images at different positions. The beam splitter 2 comprises, e.g., a half mirror. The image pickup device also includes a plurality of image pickup elements (e.g., CCDs) 101 to 104 whose light-receiving portions are arranged on image formation planes A and B of the split object images. The light-receiving portions are arranged at non-neighboring split positions when an object image is split into a plurality of images (in this case, four images) on each of the image formation planes A and B. More specifically, since the image pickup elements 101 to 104 are sealed in packages, an object image is split into a plurality of images on each of the image formation planes A and B, and the image pickup elements 101 to 104 are arranged at non-neighboring positions so as not to interfere with each other. Each of the light-receiving portions of the image pickup elements 101 to 104 is arranged to partially overlap the neighboring split position of another image formation plane. The image pickup device also includes an image synthesizing circuit 3 for receiving image information from the image pickup elements 101 to 104 to synthesize the entire object image.

In the image pickup device having the above-mentioned arrangement, the image pickup light L received from an object through the lens 1 is guided as the beams L1 and L2 having equal light amounts along two optical paths split by the beam splitter 2, and the beams L1 and L2 reach the corresponding image formation planes (focal planes) A and B. Thus, object images having the same size and the same brightness are formed on the image formation planes A and B. FIGS. 11A and 11B show states of the image formation planes A and B. FIG. 11A shows the state of the image formation plane A, and FIG. 11B shows the state of the image formation plane B.

On each of the image formation planes A and B, an object image is split into four images. On the image formation plane A, light-receiving portions a1 and a2 of the image pickup elements 101 and 103 are respectively located at the first and third split positions which are not adjacent to each other. On the image formation plane B, light-receiving portions b1 and b2 of the image pickup elements 102 and 104 are respectively located at the second and fourth split positions which are not adjacent to each other. Four pieces of image information photoelectrically converted by the image pickup elements 101 to 104 are input to the image synthesizing circuit 3, and are synthesized, as shown in FIG. 12, thereby forming a complete object image as a whole.

The total number of effective pixels on the image formation planes A and B can be four times that of a single image pickup element, and a resolution equivalent to that obtained when an image pickup element having the number of pixels four times that of a conventional image pickup element, can be obtained, thus obtaining an image having improved image quality. Since conventional image pickup elements used in a home video camera can be used without using a high-integration image pickup element, a low-cost image pickup device can be constituted by a simple circuit.

When the image pickup elements 101 to 104 suffer from variations in sensitivity, brightness nonuniformity is formed in a finally synthesized image. In this embodiment, in order to correct this variation, the above-mentioned overlap portions are provided to the light-receiving portions of the image pickup elements 101 to 104, and the outputs from the overlap portions are compared with each other to adjust the sensitivity levels of the image pickup elements 101 to 104. The sensitivity correction will be described in detail below. For the sake of simplicity, a case will be exemplified below wherein the number of split image planes in the optical system shown in FIG. 10 is two.

Figure 13A:
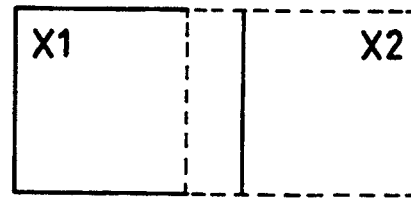
FIGS. 13A to 13E are explanatory views showing states for obtaining a sensitivity correction coefficient in the embodiment shown in FIG. 10.
Figure 13B:
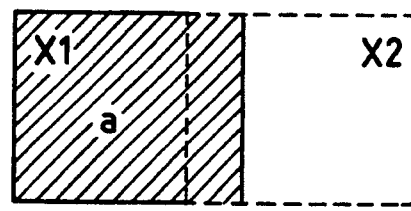
Figure 13C:
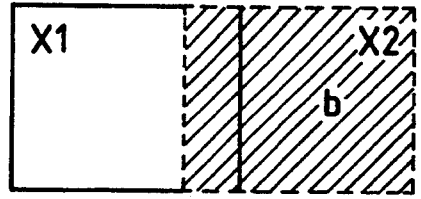
Figure 13D:
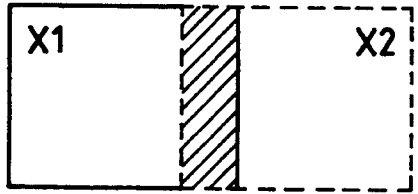
Figure 13E:
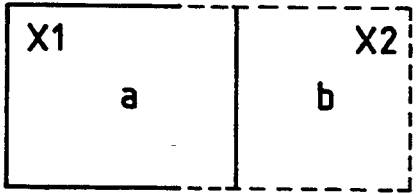

More specifically, as shown in FIG. 13A, an image plane is split into two portions, i.e., a portion X1 surrounded by a solid line, and a portion X2 surrounded by a broken line, and these portions have an overlap portion therebetween. On one image formation plane A, a light-receiving portion a of an image pickup element is arranged to cover a hatched portion corresponding to the portion X1, as shown in FIG. 13B. On the other image formation plane B, a light-receiving portion b of another image pickup element is arranged to cover a hatched portion corresponding to the portion X2, as shown in FIG. 13C. Thus, a hatched portion shown in FIG. 13D is partially included as image pickup regions of the image pickup elements having the light-receiving portions a and b. Therefore, one of the two image pickup elements is determined as a reference element, and the gain of the output from the other image pickup element is controlled, so that the two outputs from the overlap portion on the image plane are equal to each other. As a result, a variation in sensitivity between the two image pickup elements can be corrected, and brightness nonuniformity can be eliminated. When a final output is obtained, image information corresponding to the entire surface of the light-receiving portion a of one image pickup element, and image information corresponding to only a portion, which does not overlap the light-receiving portion a, of the light-receiving portion b of the other image pickup element are used to synthesize a complete object image, as shown in FIG. 13E.

Figure 14:
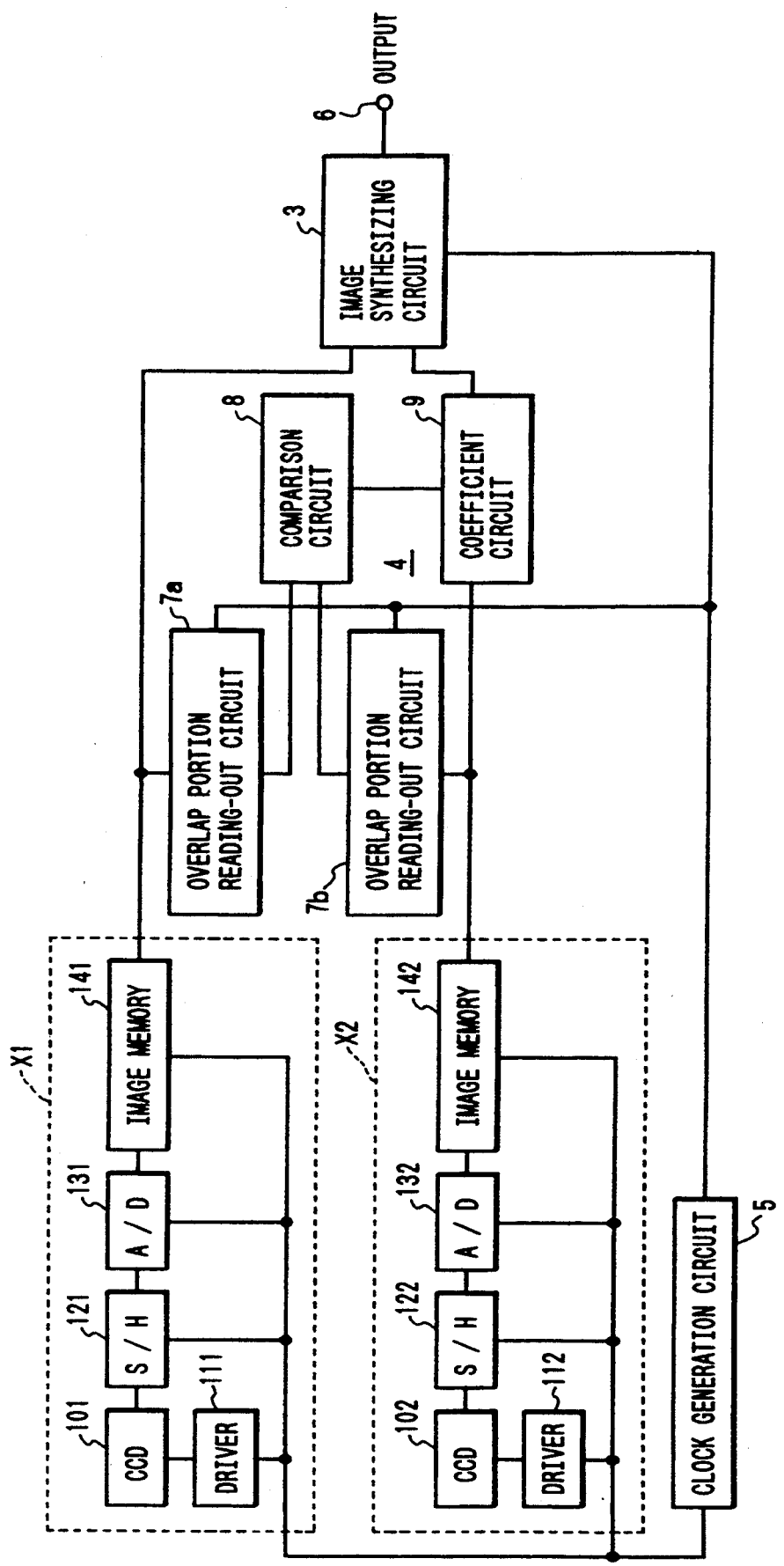
FIG. 14 is a block diagram showing a detailed circuit arrangement of an image pickup device having the arrangement shown in FIG. 10.

FIG. 14 is a block diagram showing a detailed circuit arrangement of the image pickup device having the arrangement shown in FIG. 10. In this case, a case will be exemplified wherein an image plane is split into two portions like in FIGS. 13A to 13E. The image pickup device shown in FIG. 14 includes an image pickup unit X1. The image pickup unit X1 comprises the image pickup element (e.g., a CCD) 101 shown in FIG. 10, a driver 111 for driving the image pickup element 101, an S/H circuit 121 for sampling and holding an output from the image pickup element 101, an A/D converter 131 for converting sampled/held analog image information into a digital signal, and an image memory 141 for storing the digital image information. The image pickup device also includes an image pickup unit X2 having the same arrangement as that of the image pickup unit X1. More specifically, the image pickup unit X2 comprises the image pickup element 102 shown in FIG. 10, a driver 112, an S/H circuit 122, an A/D converter 132, and an image memory 142 like in the image pickup unit X1. The image pickup device also includes a single clock generation circuit 5. The operation timings of the drivers 111 and 112, the S/H circuits 121 and 122, the A/D converters 131 and 132, and the image memories 141 and 142 are controlled by a timing signal output from the clock generation circuit 5. The driving operations of the image pickup elements 101 and 102 are also controlled by this timing signal. The operation of the image synthesizing circuit 3 is also controlled by the timing signal from the clock generation circuit 5, and an image signal is output from an output terminal 6 to a display or a recorder (not shown).

The image pickup device in FIG. 14 also includes overlap portion reading-out circuits 7a and 7b for reading out the outputs from the overlap portions of the image pickup elements, a comparison circuit 8 for comparing these outputs, and a coefficient circuit 9 for multiplying the output from the image pickup unit X2 with a coefficient according to the comparison result, and inputting the product to the image synthesizing circuit 3. The above-mentioned circuits constitute the correction circuit 4 shown in FIG. 10.

The image pickup elements 101 and 102 of the image pickup units X1 and X2 respectively have the light-receiving portions a and b shown in FIGS. 13B and 13C, and two pieces of image information corresponding to two split object images are stored in the image memories 141 and 142, as described above. The image information stored in each of the image memories 141 and 142 is read out in response to the signal from the clock generation circuit 5, and is input to the image synthesizing circuit 3. The image synthesizing circuit 3 synthesizes the image information of the entire object, and an image signal obtained by photographing an object is output from the output terminal 6, as described above. In this case, information of the hatched overlap portion in FIG. 13D of the image information stored in each of the image memories 141 and 142 is read out by a corresponding one of the overlap portion reading-out circuits 7a and 7b, and two pieces of readout information are compared by the comparison circuit 8. A variation in sensitivity of the two image pickup elements 101 and 102 is corrected according to the comparison result.

More specifically, the comparison circuit 8 uses an average luminance Y1 of the output from the overlap portion of the image pickup element 101 as a reference value, and calculates a ratio of the reference value to an average luminance Y2 of the output from the overlap portion of the image pickup element 102. In other words, the comparison circuit 8 calculates $K = Y1/Y2$. The comparison circuit 8 then supplies the coefficient K to the coefficient circuit 9.

The image synthesizing circuit 3 outputs synthesized image information (FIG. 13E) from the output terminal 6 by utilizing all the information in the image memory 141, and information obtained by multiplying information in the image memory 142 excluding information of the overlap portion with the coefficient K.

Figure 15A:
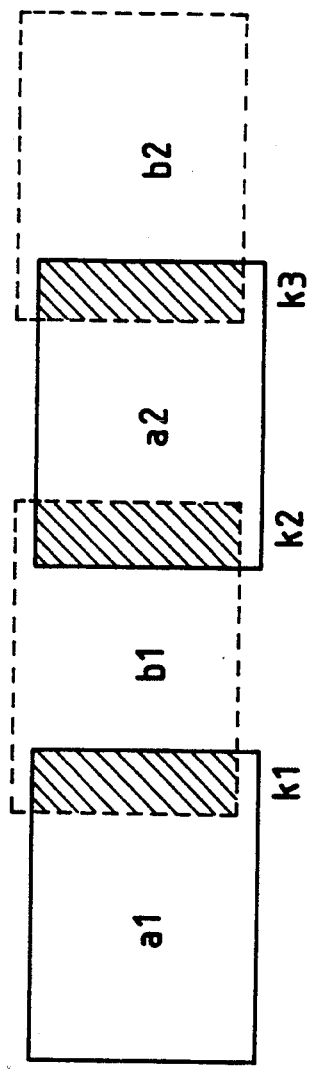
FIGS. 15A and 15B are explanatory views showing an example wherein the number of splits is increased in the embodiment shown in FIG. 10.
Figure 15B:
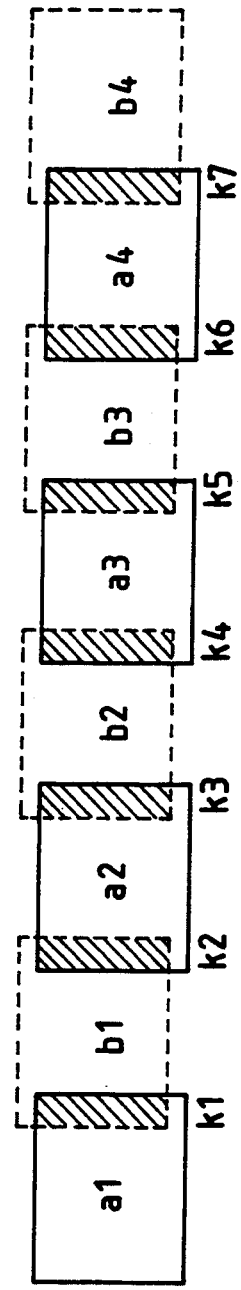

In the above description, the case has been exemplified wherein the image plane is split into two portions. Upon repeating this operation, the number of split image plane portions can be increased. For example, when an image plane is split into four portions, as shown in FIG. 15A, light-receiving portions a1, b1, a2, and b2 are arranged to have overlap portions (hatched portions) at neighboring split positions (in FIG. 15A, the light-receiving portions are slightly vertically shifted for the sake of easy understanding). A sensitivity correction coefficient K1 of the image pickup element having the light-receiving portion b1 is calculated with reference to the output from the image pickup element having the light-receiving portion a1. Then, a sensitivity correction coefficient K2 of the image pickup element having the light-receiving portion a2 is calculated with reference to the output from the image pickup element having the light-receiving portion b1. Similarly, a sensitivity correction coefficient K3 of the image pickup element having the light-receiving portion b2 is calculated. Thus, the sensitivity correction coefficient K of the image pickup element having the light-receiving portion b2 with reference to the output from the image pickup element having the light-receiving portion a1 is given by $K = K1 \times K2 \times K3$, and the sensitivity levels of the four image pickup elements can be adjusted using this coefficient. FIG. 15B exemplifies a case wherein an image plane is split into eight portions using eight image pickup elements having light-receiving portions a1 to a4, and b1 to b4. In this case, sensitivity correction coefficients K1 to K7 are obtained in the same manner as described above, thus adjusting the sensitivity levels of all the image pickup elements.

Figure 16:
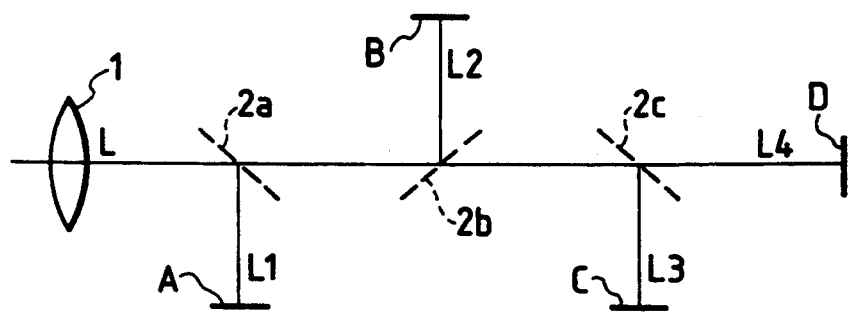
FIG. 16 is a diagram showing, principal part according to the fourth embodiment of the present invention.

FIG. 16 is a diagram showing the fourth embodiment of the present invention. The same reference numerals in FIG. 16 denote the same parts as in FIG. 10. FIG. 16 illustrates only an image pickup optical system.

In the embodiment shown in FIG. 16, the number of split optical paths of image pickup light L is doubled, i.e., four as compared to the embodiment shown in FIG. 10, and three beam splitters 2a, 2b, and 2c are arranged. These beam splitters 2a, 2b, and 2c respectively have reflectances of 25% ($\frac{1}{4}$), 33% ($\frac{1}{3}$), and 50% ($\frac{1}{2}$), and supply beams L1, L2, L3, and L4 having equal light amounts to four image formation planes A, B, C, and D, thus forming object images having the same size and the same brightness on the image formation planes A, B, C, and D. The object image on each of the image formation planes A, B, C, and D is split into a plurality of images, and light-receiving portions of image pickup elements (not shown) are arranged at non-neighboring split positions of the images. Pieces of image information from these image pickup elements are synthesized to form the entire object image.

Figure 17:
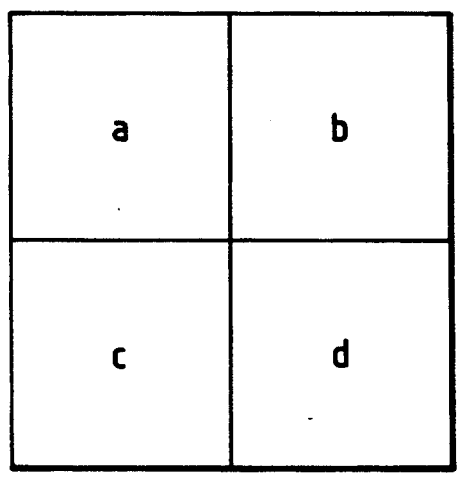
FIG. 17 is an explanatory view showing states of image formation planes of FIG. 16.

In the embodiment shown in FIG. 16, in practice, an object image is split into 16 images (4×4 in the horizontal and vertical directions) on each of the image formation planes A, B, C, and D, and the light-receiving portions of the image pickup elements are arranged at non-neighboring four split positions on each image formation plane. For the sake of simplicity, a case will be exemplified wherein an image plane (object image) is split into four portions, as shown in FIG. 17, and these portions are respectively picked up by image pickup elements whose light-receiving portions a, b, c, and d are arranged on the image formation planes A, B, C, and D.

Figure 18A:
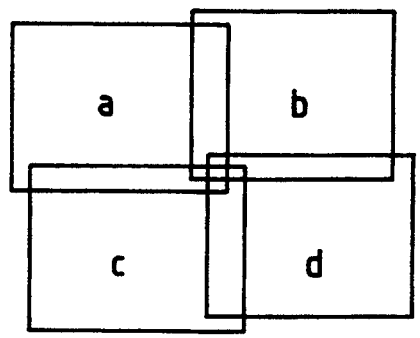
FIGS. 18A to 18D are explanatory views showing states for obtaining a sensitivity correction coefficient in the embodiment shown in FIG. 16.

In this case, in order to adjust the sensitivity levels of the image pickup elements, the light-receiving portions a, b, c, and d also overlap each other in the image plane. FIG. 18A shows this state (in FIG. 18A, the light-receiving portions are slightly shifted in the vertical and horizontal directions for the sake of easy understanding).

Figure 18B:
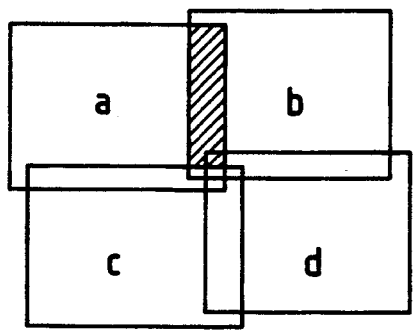
Figure 18C:
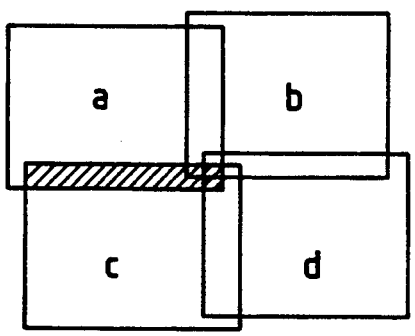
Figure 18D:
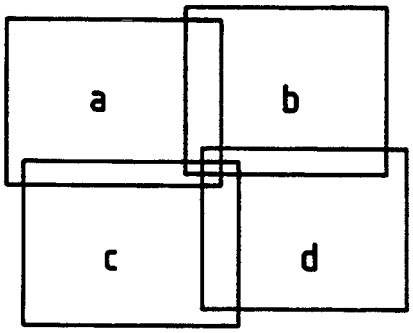

A sensitivity correction coefficient K1 of the light-receiving portion b is calculated with reference to the output from the image pickup element having the light-receiving portion a like in the above embodiment. At this time, outputs corresponding to the hatched overlap portion shown in FIG. 18B are compared with each other like in the case shown in FIGS. 13A to 13E to calculate the coefficient K1. Then, a sensitivity correction coefficient K2 of the image pickup element having the light-receiving portion c is calculated with reference to the output from the image pickup element having the light-receiving portion a. Similarly, a sensitivity correction coefficient K3 of the light-receiving portion d is calculated with reference to the output from the image pickup element having the light-receiving portion a. In this case, the outputs corresponding to the hatched overlap portions shown in FIGS. 18C and 18D are similarly compared to calculate the coefficients K2 and K3.

Using the coefficients K1, K2, and K3 calculated as described above, the sensitivity levels of the four image pickup elements can be adjusted. Thus, the number of effective pixels can be increased like in the above embodiment, and brightness nonuniformity can be eliminated.

In this embodiment, the number of effective pixels can be infinitely increased by extending the device in units of four image pickup elements shown in FIG. 17 in the vertical and horizontal directions, and the resolution can be theoretically infinitely increased. FIG. 19A exemplifies a case wherein the image plane is split into 16 portions, as described above, and light-receiving portions a1 to a4, b1 to b4, c1 to c4, and d1 to d4 of 16 image pickup elements are arranged. In this case, the number of effective pixels can be 16 times that of a single image pickup element, and a resolution equivalent to that obtained upon photographing using an image pickup element having the number of pixels 16 times that of a conventional element, can be obtained. FIG. 19B shows a case wherein 64 (8×8 in the horizontal and vertical directions) image pickup elements are used.

The above-mentioned image memories 141 and 142 and the image synthesizing circuit 3 can be easily realized by using known memories and their control techniques, which are normally used. Therefore, a detailed description of these memories and image synthesizing circuit will be omitted. In addition, more beam splitters than those in the above embodiment may be used to increase the number of split object images on each image formation plane, thereby obtaining an image having a higher resolution.

In a circuit arrangement used when the number of split image plane portions is larger than 2, the numbers of image pickup units Xi (i=1, 2,...), overlap portion reading-out circuits, comparison circuits, and coefficient circuits can be increased in the circuit in FIG. 14, as needed.

In this manner, when an image formation optical path used in, e.g., an existing industrial-use multi-board camera is split into a plurality of paths by a beam splitter, the equivalent number of pixels can be greatly increased, and an image having higher image quality can be obtained. In addition, although a large number of image pickup elements are used, brightness nonuniformity caused by a variation in sensitivity can be prevented.

As described above, according to the present invention, image pickup light from an object is split into a plurality of beams in equal light amounts, and object images are formed at different positions. The light-receiving portions of the image pickup elements are arranged at non-neighboring split positions so that each light-receiving portion partially overlaps the light-receiving portion at least at the neighboring split position of another image formation plane when an object image is split into a plurality of images on each image formation plane. The outputs corresponding to the overlap portion are compared to each other, and pieces of image information from the image pickup elements are synthesized while adjusting the sensitivity levels of the image pickup elements. Thus, the number of effective pixels can be increased using conventional image pickup elements without using a high-integration image pickup element. At the same time, a variation in sensitivity among the image pickup elements can be corrected, and brightness nonuniformity can be eliminated.

Figure 20:
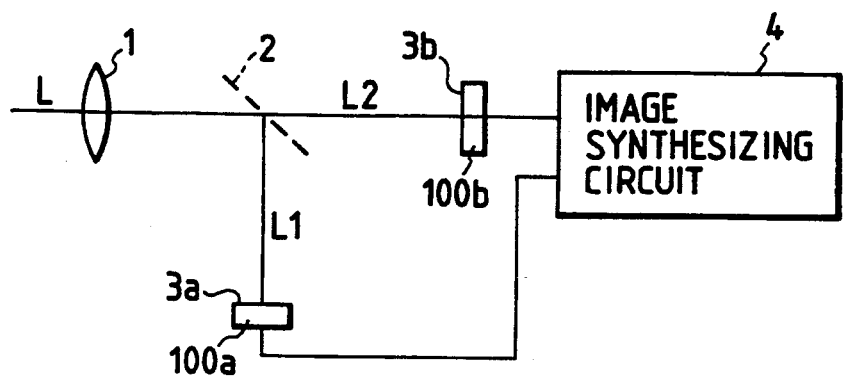
FIG. 20 is a diagram showing principal part according to the fifth embodiment of the present invention.

FIG. 20 is a diagram showing principal part of an image pickup device according to the fifth embodiment of the present invention. The image pickup device shown in FIG. 20 includes an imaging lens 1 through which image pickup light L from an object passes, and a beam splitter 2 as split means for splitting the image pickup light L into a plurality of beams L1 and L2 in equal light amounts, and forming object images at different positions. The beam splitter 2 comprises, e.g., a half mirror. The image pickup device also includes a plurality of image pickup elements (e.g., CCDs) 100a and 100b, which have a plurality of light-receiving portions A1 and A2, and B1 and B2, which are split on a plane. These light-receiving portions A1 and A2, and B1 and B2 are arranged on image formation planes 3a and 3b of the object images. In this case, the light-receiving portions A1 and A2, and B1 and B2 are located at non-neighboring split positions when an object image is split into a plurality of (in this case, four) images on each of the image formation planes 3a and 3b. More specifically, since the image pickup elements 100a and 100b are sealed in packages, an object image is split into a plurality of images on each of the image formation planes 3a and 3b, and the light-receiving portions A1 and A2, and B1 and B2 are arranged at non-neighboring split positions of the split images. The image pickup device also includes an image synthesizing circuit 4 for receiving image information from the image pickup elements 100a and 100b, and synthesizing the entire object image.

Figure 21A:
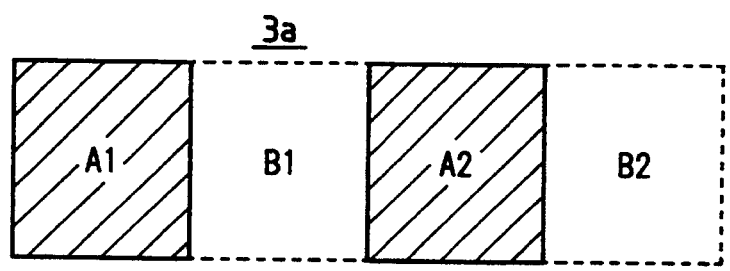
FIGS. 21A and 21B are explanatory views showing states of image formation planes of FIG. 20.
Figure 21B:
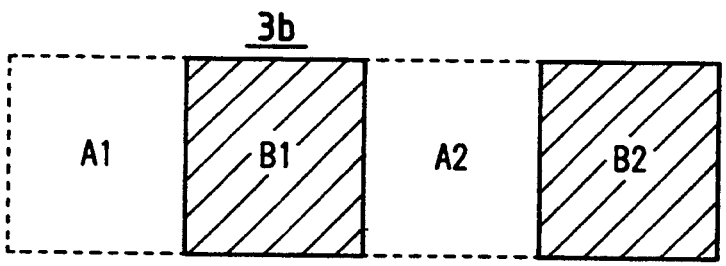

In the image pickup device having the above-mentioned arrangement, the image pickup light L from an object through the lens 1 is guided as the beams L1 and L2 having equal light amounts along two optical paths split by the beam splitter 2, and the beams L1 and L2 reach the corresponding image formation planes (focal planes) 3a and 3b. Thus, object images having the same size and the same brightness are formed on the image formation planes 3a and 3b. FIGS. 21A and 21B show states of the image formation planes 3a and 3b. FIG. 21A shows the state of the image formation plane 3a, and FIG. 21B shows the state of the image formation plane 3b.

Figure 22:
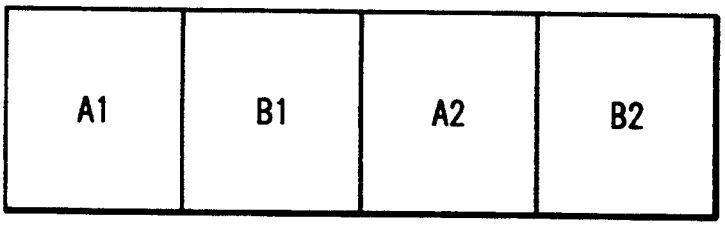
FIG. 22 is an explanatory view showing a state obtained by synthesizing two pieces of image information shown in FIGS. 21A and 21B.

On each of the image formation planes 3a and 3b, an object image is split into four images. On the image formation plane 3a, light-receiving portions A1 and A2 of the image pickup element 100a are respectively located at the first and third split positions which are not adjacent to each other. On the image formation plane 3b, light-receiving portions B1 and B2 of the image pickup element 100b are respectively located at the second and fourth split positions which are not adjacent to each other. Four pieces of image information photoelectrically converted by the image pickup elements 100a and 100b are input to the image synthesizing circuit 4, and are synthesized, as shown in FIG. 22, thereby forming a complete object image as a whole.

The total number of effective pixels on the image formation planes 3a and 3b can be four times that of a single image pickup element, and a resolution equivalent to that obtained when an image pickup element having the number of pixels four times that of a conventional image pickup element, can be obtained, thus obtaining an image having improved image quality. Since conventional image pickup elements used in a home video camera can be used without using a high-integration image pickup element, a low-cost image pickup device can be constituted by a simple circuit.

Upon realization of the arrangement of the light-receiving portions A1 and A2, and B1 and B2 shown in FIGS. 21A and 21B, if the packages of the image pickup elements are sufficiently small, the light-receiving portions A1, A2, B1, and B2 can be constituted by independent image pickup elements. However, when the packages of the image pickup elements are too large, it is impossible to arrange the light-receiving portions A1, A2, B1, and B2 using independent image pickup elements since they interfere with each other.

Figure 23A:
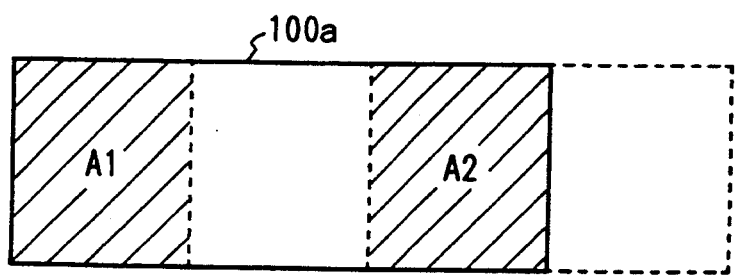
FIGS. 23A and 23B are explanatory views showing setting examples of light-receiving portions on the respective image formation planes of FIG. 20.
Figure 23B:
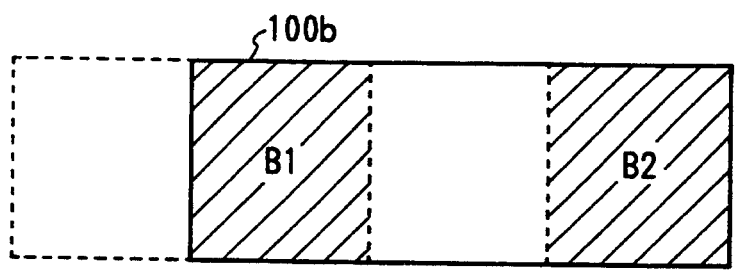

In this embodiment, the image pickup element 100a whose light-receiving portion has a size corresponding to three out of four split portions is arranged on the image formation plane 3a, as indicated by a solid line in FIG. 23A. Of these three split portions, the light-receiving portions A1 and A2 are set on the two hatched portions in FIG. 23A. On the other hand, the image pickup element 100b whose light-receiving portion has a size corresponding to three out of four split portions is arranged on the image formation plane 3b, as indicated by a solid line in FIG. 23B. Of these three split portions, the light-receiving portions B1 and B2 are set on the two hatched portions in FIG. 23B. The size of each of the light-receiving portions A1, A2, B1, and B2 is set to be equal to the image size (e.g., a ½" correspondence size) of a currently popular image pickup element. In this manner, the manufacturing equipment (including photomasks and the like) of the currently popular image pickup element can be used without modifications, and image pickup element chips shown in FIGS. 23A and 23B can be manufactured with a high yield (since the manufacturing processes and the like are stable) without requiring high-grade manufacturing techniques and circuit techniques.

Furthermore, since the alignment precision in a manufacturing apparatus of the image pickup element chip is very high, the relative positions between the light-receiving positions of the light-receiving portions A1 and A2, and B1 and B2 can be set with very high precision. Therefore, as an alignment operation of the light-receiving portions (including a falling direction), the alignment operations between the light-receiving portions A1 and A2, and between the light-receiving portions B1 and B2 need not be performed, and the positions of the image pickup element chips need only be adjusted. This is very preferable in terms of stability of light-receiving position precision including an environmental change and a change over time. In addition, an image pickup element chip having a large package can be used.

Figure 24:
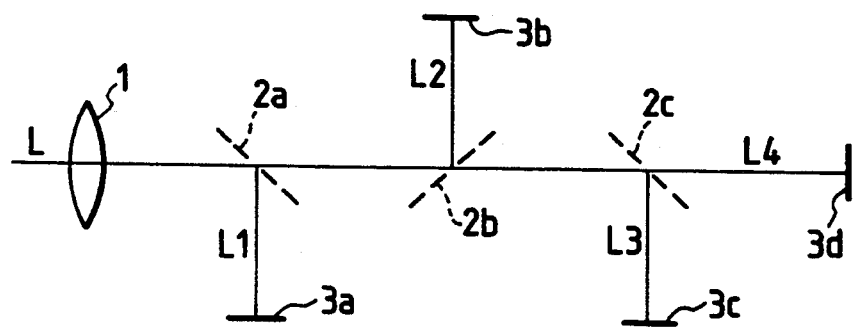
FIG. 24 is a diagram showing principal part according to the sixth embodiment of the present invention.

FIG. 24 is a diagram showing the sixth embodiment of the present invention. The same reference numerals in FIG. 24 denote the same parts as in FIG. 20. FIG. 24 illustrates only an image pickup optical system.

In the embodiment shown in FIG. 24, the number of split optical paths of image pickup light L is doubled, i.e., four as compared to the embodiment shown in FIG. 20, and three beam splitters 2a, 2b, and 2c are arranged. These beam splitters 2a, 2b, and 2c respectively have reflectances of 25% (¼), 33% (⅓), and 50% (½), and supply beams L1, L2, L3, and L4 having equal light amounts to four image formation planes 3a, 3b, 3c, and 3d, thus forming object images having the same size and the same brightness on the image formation planes 3a, 3b, 3c, and 3d. The object image on each of the image formation planes 3a, 3b, 3c, and 3d is split into a plurality of images, and light-receiving portions of image pickup elements (not shown), which are the same as the image pickup elements 100a and 100b shown in FIG. 20, are arranged at non-neighboring split positions of the images. Pieces of image information from these image pickup elements are synthesized to form the entire object image.

In the embodiment shown in FIG. 24, an object image is split into 16 images (4×4 in the horizontal and vertical directions) on each of the image formation planes 3a, 3b, 3c, and 3d, as shown in FIGS. 25A to 25D. The light-receiving portions of the image pickup elements are arranged at non-neighboring four split positions on each image formation plane. More specifically, on the image formation plane 3a shown in FIG. 25A, light-receiving portions A1, A2, A3, and A4 are respectively arranged at the first, third, ninth, and eleventh positions. On the image formation plane 3b shown in FIG. 25B, light-receiving portions B1, B2, B3, and B4 are respectively arranged at the second, fourth, tenth, and twelfth positions. On the image formation plane 3c shown in FIG. 25C, light-receiving portions C1, C2, C3, and C4 are respectively arranged at the fifth, seventh, thirteenth, and fifteenth positions. On the image formation plane 3d shown in FIG. 25D, light-receiving portions D1, D2, D3, and D4 are respectively arranged at the sixth, eighth, fourteenth, and sixteenth positions.

Image information of an object, which is separately picked up by the 16 light-receiving portions A1 to A4, B1 to B4, C1 to C4, and D1 to D4 in the above-mentioned arrangement states of the image pickup elements on the image formation planes 3a, 3b, 3c, and 3d, is synthesized by the image synthesizing circuit, as described above. FIG. 26 shows the state of the synthesized image information, and illustrates contributions of the respective light-receiving portions to the object image. In this embodiment, the number of effective pixels on the image formation planes 3a, 3b, 3c, and 3d is 16 times that of a single image pickup element, and a resolution equivalent to that obtained when an image pickup element having the number of pixels 16 times that of a conventional image pickup element, can be obtained, thus obtaining an image with higher image quality than that of the embodiment shown in FIG. 20.

Upon realization of the arrangements shown in FIGS. 25A to 25D like in the embodiment shown in FIG. 20, when the packages of the image pickup elements are sufficiently small, the 16 light-receiving portions A1 to A4, B1 to B4, C1 to C4, and D1 to D4 can be constituted by independent image pickup elements. However, when the size of the package of the image pickup element is too large, it is similarly impossible to obtain the above-mentioned arrangements of the light-receiving portions using the independent image pickup elements.

Figure 27A:
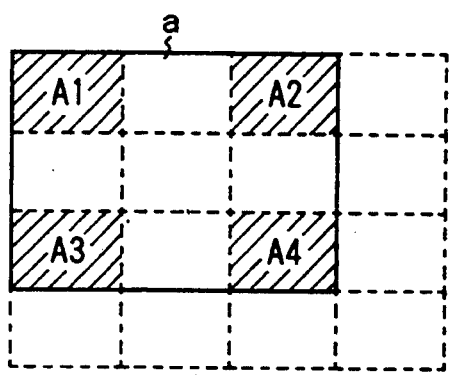
FIGS. 27A to 27D are explanatory views showing setting examples of light-receiving portions on the respective image formation planes shown in FIG. 24.
Figure 27B:
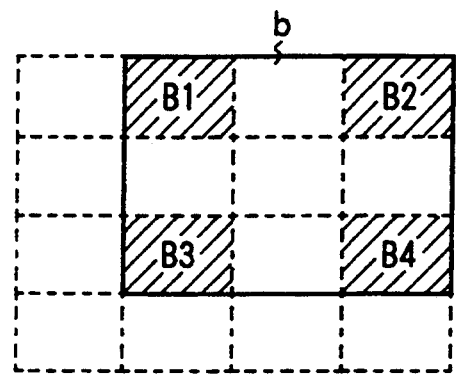
Figure 27C:
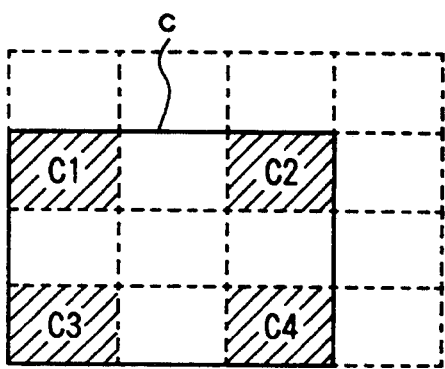
Figure 27D:
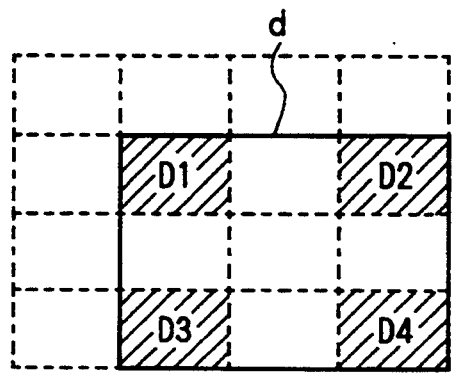

Like in the embodiment shown in FIG. 20, an image pickup element chip a whose light-receiving portion has a size corresponding to nine out of 16 split portions is arranged on the image formation plane 3a, as indicated by a solid line in FIG. 27A, and the light-receiving portions A1 to A4 are set on the four hatched portions of the these split portions. An image pickup element chip b whose light-receiving portion has a size corresponding to nine out of 16 split portions is arranged on the image formation plane 3b, as indicated by a solid line in FIG. 27B, and the light-receiving portions B1 to B4 are set on the four hatched portions of the these split portions. An image pickup element chip c whose light-receiving portion has a size corresponding to nine out of 16 split portions is arranged on the image formation plane 3c, as indicated by a solid line in FIG. 27C, and the light-receiving portions C1 to C4 are set on the four hatched portions of the these split portions. Similarly, an image pickup element chip d whose light-receiving portion has a size corresponding to nine out of 16 split portions is arranged on the image formation plane 3d, as indicated by a solid line in FIG. 27D, and the light-receiving portions D1 to D4 are set on the four hatched portions of the these split portions.

Like in the embodiment shown in FIG. 20, the size of each of the light-receiving portions A1 to A4, B1 to B4, C1 to C4, and D1 to D4 is set to be equal to the image size (e.g., a ⅔" correspondence size) of a currently popular image pickup element. In this manner, the manufacturing equipment (including photomasks and the like) of the currently popular image pickup element can be used without modifications, and the image pickup element chips a to d shown in FIGS. 27A to 27D can be manufactured with a high yield (since the manufacturing processes and the like are stable).

Furthermore, since the alignment precision in a manufacturing apparatus of the image pickup element chip is very high, the relative positions of the light-receiving positions of the light-receiving portions A1 to A4, B1 to B4, C1 to C4, and D1 to D4 can be set with very high precision. Therefore, as an alignment operation of the light-receiving portions (including a falling direction), the alignment operations among the light-receiving portions A1 to A4, B1 to B4, C1 to C4, and D1 to D4 need not be performed, and the positions of the image pickup element chips a, b, c, and d need only be adjusted. This is very preferable in terms of stability of light-receiving positional precision including an environmental change and a change over time.

Figure 28:
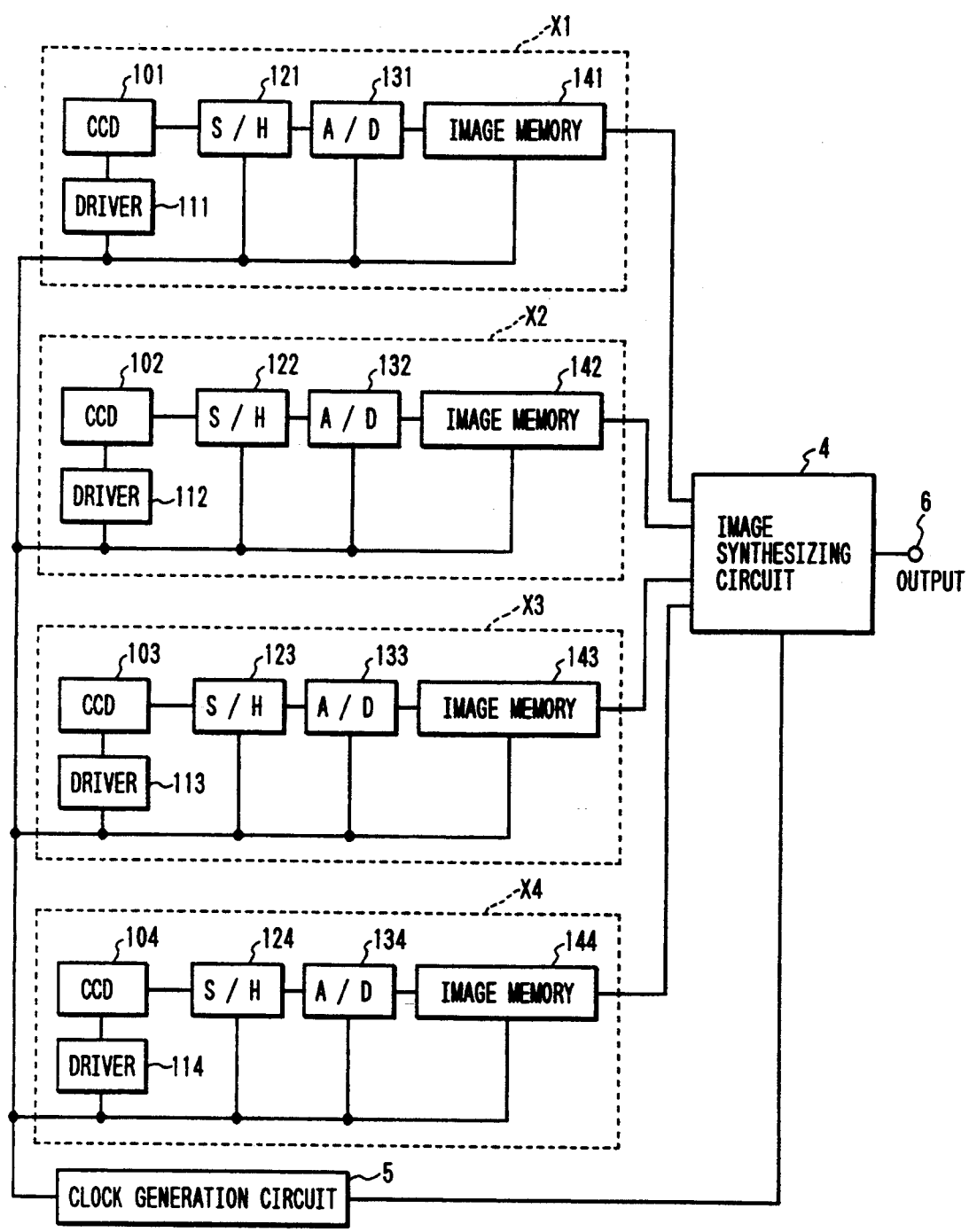
FIG. 28 is a block diagram showing a detailed circuit arrangement of an image pickup device having the arrangement shown in FIG. 20.

FIG. 28 is a block diagram showing a detailed circuit arrangement of the image pickup device having the arrangement shown in FIG. 20. The image pickup device shown in FIG. 28 includes an image pickup unit X1. The image pickup unit X1 comprises an image pickup element (e.g., a CCD) 101 shown in FIG. 20, a driver 111 for driving the image pickup element 101, an S/H circuit 121 for sampling and holding an output from the image pickup element 101, an A/D converter 131 for converting sampled/held analog image information into a digital signal, and an image memory 141 for storing the digital image information. The image pickup device also includes image pickup units X2, X3, and X4 having the same arrangement as that of the image pickup unit X1. More specifically, the image pickup units X2, X3, and X4 respectively comprise image pickup elements 102, 103, and 104 shown in FIG. 20, drivers 112, 113, and 114, S/H circuits 122, 123, and 124, A/D converters 132, 133, and 134, and image memories 142, 143, and 144 like in the image pickup unit X1. The image pickup device also includes a single clock generation circuit 5. The operation timings of the drivers 111 to 114, the S/H circuits 121 to 124, the A/D converters 131 to 34, and the image memories 141 to 144 of the image pickup units X1 to X4 are controlled by a timing signal output from the clock generation circuit 5. In addition, the driving operations of the image pickup elements 101 to 104 (100a and 100b) are also controlled by this timing signal. The operation of an image synthesizing circuit 4 is also controlled by the timing signal from the clock generation circuit 5. An image signal from an output terminal 6 is output to a display or a recorder (not shown).

The image pickup elements 100a and 100b of the image pickup units X1 to X4 respectively have the light-receiving portions A1, B1, A2, and B2 shown in FIGS. 21A and 21B, and FIG. 22, and pieces of image information of the four split object images described above are respectively stored in the image memories 141 to 144. The pieces of image information stored in the image memories 141 to 144 are read out in response to the signal from the clock generation circuit 5, and are input to the image synthesizing circuit 4. The image synthesizing circuit 4 synthesizes the image information of the overall object, and an image signal obtained by picking up an object is output from the output terminal 6.

The circuit arrangement of the image pickup device having the arrangement shown in FIG. 24 can be realized by arranging 16 image pickup units shown in FIG. 28. Pieces of image information from the image pickup units need only be input to the image synthesizing circuit to form the overall object image.

The above-mentioned image memories 141 to 144 and the image synthesizing circuit 4 can be easily realized by using known memories and their control techniques, which are normally used. Therefore, a detailed description of these memories and image synthesizing circuit will be omitted. In addition, more beam splitters than those in the above embodiment may be used to increase the number of split object images on each image formation plane, thereby obtaining an image having a higher resolution.

Figure 29:
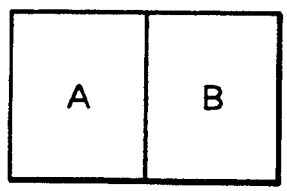
FIG. 29 is an explanatory view showing a basic unit when the number of image pickup elements is increased in the embodiment shown in FIG. 20.
Figure 30A:
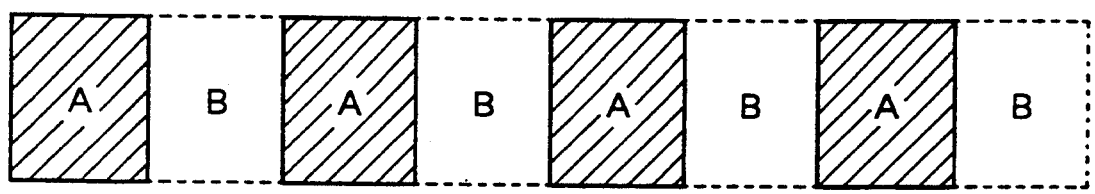
FIGS. 30A and 30B are explanatory views showing an example wherein the number of image pickup elements is increased in the embodiment shown in FIG. 20.
Figure 30B:
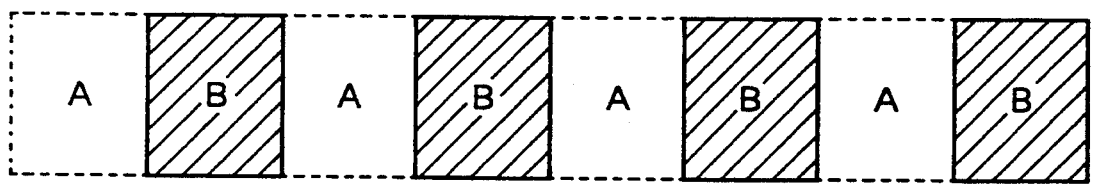
Figure 31:
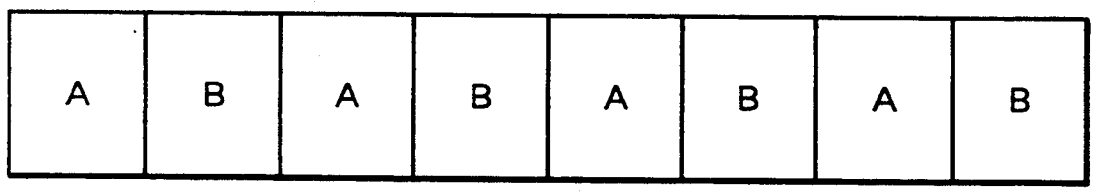
FIG. 31 is an explanatory view showing a state obtained by synthesizing two pieces of image information shown in FIGS. 30A and 30B.
Figure 32A:
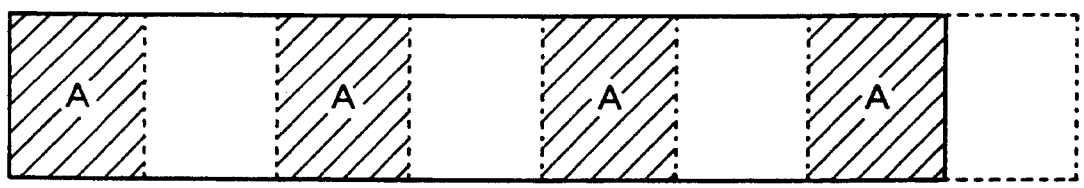
FIGS. 32A and 32B are explanatory views showing setting examples of light-receiving portions of image pickup elements in the arrangement shown in FIGS. 30A and 30B.
Figure 32B:
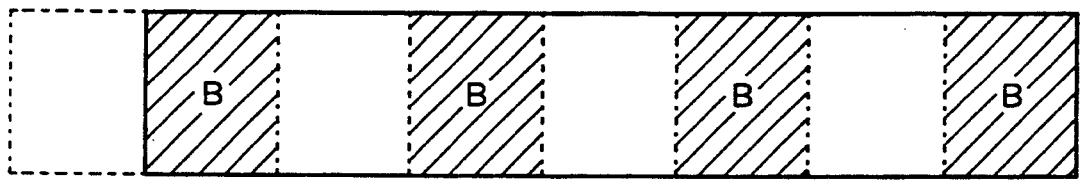

In the embodiment shown in FIG. 20, when the light-receiving portions are arranged in the horizontal direction in units of two image pickup elements shown in FIG. 29, the number of effective pixels in the horizontal direction of the image pickup elements can be infinitely increased, and the resolution can be theoretically infinitely improved in the horizontal direction. FIGS. 30A and 30B show a case wherein eight image pickup elements are used, and FIG. 31 shows a state of synthesized image information from these image pickup elements. In this case, when hatched portions of FIGS. 30A and 30B are constituted by independent image pickup elements, the elements cannot often be arranged since they interfere with each other. In this case, when light-receiving portions are arranged at non-neighboring positions on a single image pickup element chip, as indicated by hatched portions in FIGS. 32A and 32B, an image pickup element chip free from problems of relative positions and flatness can be constituted. Similarly, when the positional relationship shown in FIGS. 29 to 32B is rotated through 90°, the number of effective pixels can be similarly increased in the vertical direction.

Figure 33:
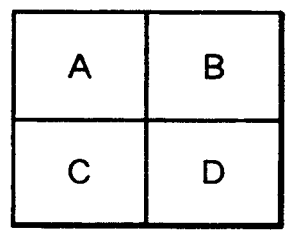
FIG. 33 is an explanatory view showing a basic unit when the number of image pickup elements is increased in the embodiment shown in FIG. 24.
Figure 36A:
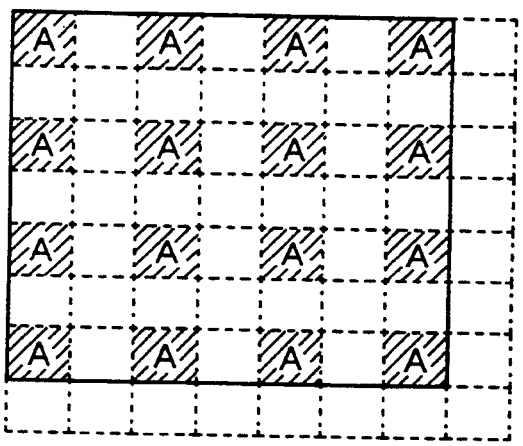
FIGS. 36A to 36D are explanatory views showing setting examples of light-receiving portions of the image pickup elements shown in FIGS. 34A to 34D.
Figure 36B:
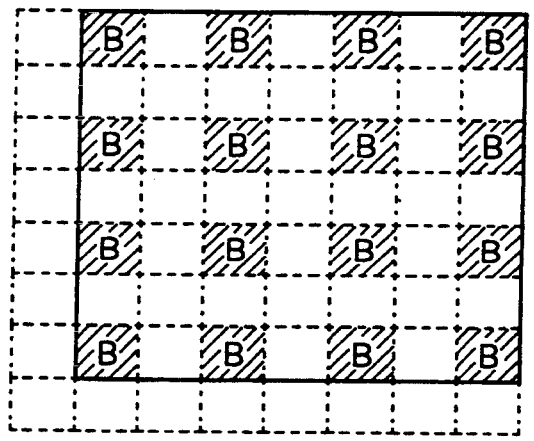
Figure 36C:
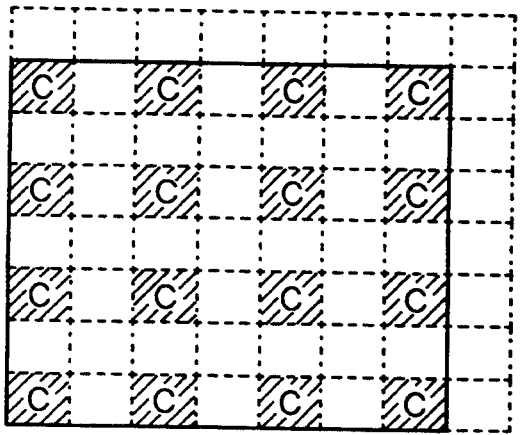
Figure 36D:
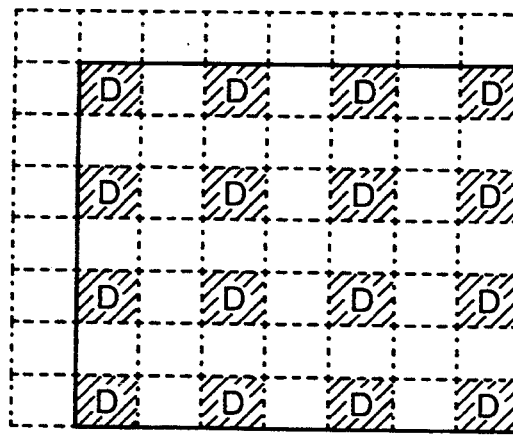

In the embodiment shown in FIG. 24, when the light-receiving portions are arranged in the vertical and horizontal directions in units of four image pickup elements shown in FIG. 33, the number of effective pixels of the image pickup elements can be infinitely increased, and the resolution can be theoretically infinitely improved. FIGS. 34A to 34D show a case wherein 64 (=8×8) image pickup elements are used, and FIG. 35 shows a state of synthesized image information from these image pickup elements. In this case, when hatched portions of FIGS. 34A to 34D are constituted by independent image pickup elements, the elements cannot often be arranged since they interfere with each other. In this case, when light-receiving portions are arranged at non-neighboring positions on a single image pickup element chip, as indicated by hatched portions in FIGS. 36A to 36D, an image pickup element chip free from problems of relative positions and flatness can be constituted.

In this manner, when an image formation optical path used in, e.g., an existing industrial-use multi-board camera is split into a plurality of paths by a beam splitter, the equivalent number of pixels can be greatly increased, and an image having higher image quality can be obtained. For example, when an image pickup element having four hundred thousand pixels and used in an existing home video camera is adopted in the present invention, the number of pixels can reach 1.6 millions in the embodiment shown in FIG. 20, and can reach 6.4 millions in the embodiment shown in FIG. 24. When the image size is further increased, the number of effective pixels can be infinitely increased.

Furthermore, since each image formation plane can be formed by a single image pickup element chip in which light-receiving elements each having a size equal to that of a consumer-use image pickup element, which is technically sufficiently established, are arranged at non-neighboring positions, a manufacturing apparatus (including photomasks) and manufacturing processes of the consumer-use image pickup element can be commonly used. In addition, an image pickup element having high performance in view of the relative positional precision of the light-receiving portions, flatness, and the like can be manufactured with a high yield. Since a single image pickup element chip (with a plurality of light-receiving portions) is arranged on each image formation plane, the image pickup element chip (light-receiving portions) can be aligned with remarkably higher precision and stability than those in a case wherein the light-receiving portions are constituted by independent image pickup element chips.

The operation frequency of the device of the present invention can be as low as that used in an existing home video camera, and a high frequency required in a "hi-vision" camera is not necessary. Thus, the device of the present invention can be easily realized by circuit members and techniques used in conventional devices.

As described above, according to the present invention, image pickup light from an object is split into a plurality of beams in equal light amounts, and object images are formed at different positions. The light-receiving portions of the image pickup elements each having a plurality of light-receiving portions split on a plane are arranged at non-neighboring split positions when the object image is split into a plurality of images on each image formation plane, and pieces of image information are synthesized later. Thus, the number of effective pixels can be increased using conventional image pickup elements without using a high-integration image pickup element, and image quality can be improved. In addition, high-grade manufacturing techniques and circuit techniques are not required, and even an image pickup element having a large package can be used.

Figures 37, 38A, 38B:
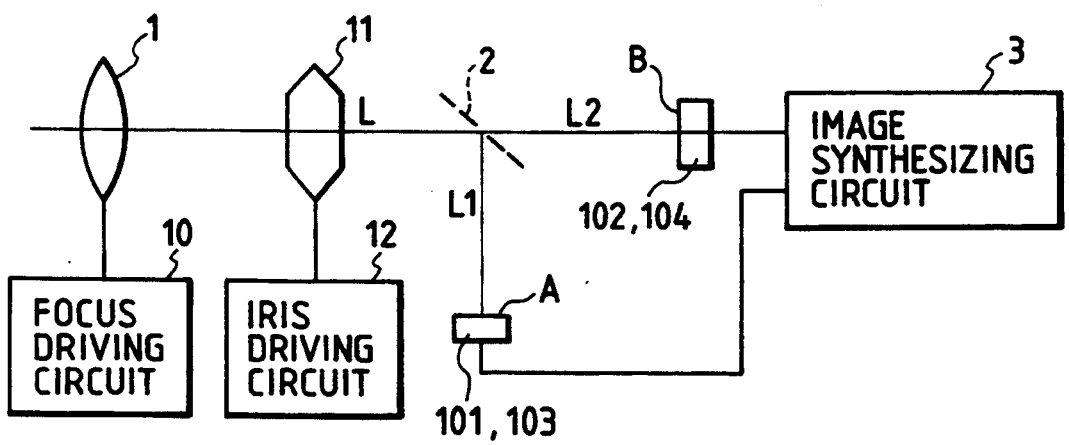
FIG. 37 is a diagram showing principal part according to the seventh embodiment of the present invention.
FIGS. 38A and 38B are explanatory views showing states of image formation planes of FIG. 37.

FIG. 37 is a diagram showing principal part of an image pickup device according to the seventh embodiment of the present invention. The image pickup device shown in FIG. 37 includes an imaging lens 1 through which image pickup light L from an object passes, and a beam splitter 2 as split means for splitting the image pickup light L into a plurality of beams L1 and L2 in equal light amounts, and forming object images at different positions. The beam splitter 2 comprises, e.g., a half mirror. The image pickup device also includes a plurality of image pickup elements (e.g., CCDs) 101 to 104 whose light-receiving portions are arranged on image formation planes A and B of the split object images. The light-receiving portions are arranged at non-neighboring split positions when an object image is split into a plurality of images (in this case, four images) on each of the image formation planes A and B. More specifically, since the image pickup elements 101 to 104 are sealed in packages, an object image is split into a plurality of images on each of the image formation planes A and B, and the image pickup elements 101 to 104 are arranged at non-neighboring positions so as not to interfere with each other. The image pickup device also includes an image synthesizing circuit 3 for receiving image information from the image pickup elements 101 to 104 to synthesize the entire object image.

The image pickup device also includes a focus driving circuit (adjusting means) 10 for performing automatic focus adjustment, an iris 11 for setting an incident light amount (exposure condition), and an iris driving circuit (adjusting means) 12 for performing automatic exposure adjustment, i.e., for controlling the aperture size of the iris 11.

In the image pickup device having the above-mentioned arrangement, the image pickup light L from an object through the lens 1 is guided as the beams L1 and L2 having equal light amounts along two optical paths split by the beam splitter 2, and the beams L1 and L2 reach the corresponding image formation planes (focal planes) A and B. Thus, object images having the same size and the same brightness are formed on the image formation planes A and B. FIGS. 38A and 38B show states of the image formation planes A and B. FIG. 38A shows the state of the image formation plane A, and FIG. 38B shows the state of the image formation plane B.

Figure 39:
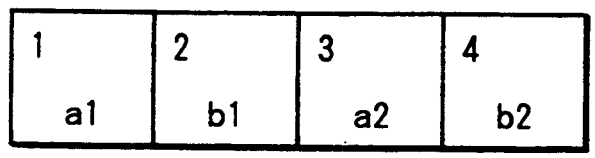
FIG. 39 is an explanatory view showing a state obtained by synthesizing two pieces of image information shown in FIGS. 38A and 38B.

On each of the image formation planes A and B, an object image is split into four images. On the image formation plane A, light-receiving portions a1 and a2 of the image pickup elements 101 and 103 are respectively located at the first and third split positions which are not adjacent to each other. On the image formation plane B, light-receiving portions b1 and b2 of the image pickup elements 102 and 104 are respectively located at the second and fourth split positions which are not adjacent to each other. Four pieces of image information photoelectrically converted by the image pickup elements 101 to 104 are input to the image synthesizing circuit 3, and are synthesized, as shown in FIG. 39, thereby forming a complete object image as a whole.

The total number of effective pixels on the image formation planes A and B can be four times that of a single image pickup element, and a resolution equivalent to that obtained when an image pickup element having the number of pixels four times that of a conventional image pickup element, can be obtained, thus obtaining an image having improved image quality. Since conventional image pickup elements used in a home video camera can be used without using a high-integration image pickup element, a low-cost image pickup device can be constituted by a simple circuit.

Figure 40:
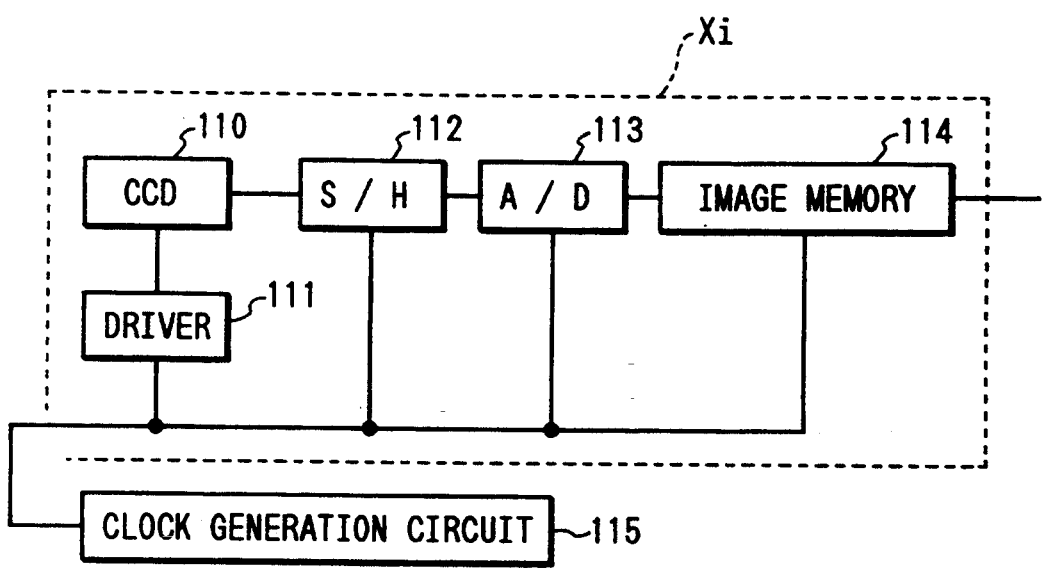
FIG. 40 is a block diagram showing an arrangement of an image pickup unit having an image pickup element shown in FIG. 37.

FIG. 40 is a block diagram showing a circuit arrangement of an image pickup unit Xi having the image pickup element shown in FIG. 37. The image pickup unit Xi in FIG. 40 comprises an image pickup element (e.g., a CCD) 110 shown in FIG. 37, a driver 111 for driving the image pickup element 110, an S/H circuit 112 for sampling and holding an output from the image pickup element 110, an A/D converter 113 for converting sampled/held analog image information into a digital signal, and an image memory 114 for storing the digital image information. The output from the image pickup unit Xi with the above-mentioned arrangement is input to the image synthesizing circuit 3 shown in FIG. 37. A single clock generation circuit 115 is connected to the image pickup unit Xi. A timing signal output from the clock generation circuit 115 controls the operation timings of the driver 111, the S/H circuit 112, the A/D converter 113, and the image memory 114. The driving operation of the image pickup element 110 is also controlled by this timing signal. The operation of the image synthesizing circuit 3 is also controlled by the timing signal from the clock generation circuit 115, and an image signal output from the image synthesizing circuit 3 is output to a display or a recorder (not shown).

Figure 41:
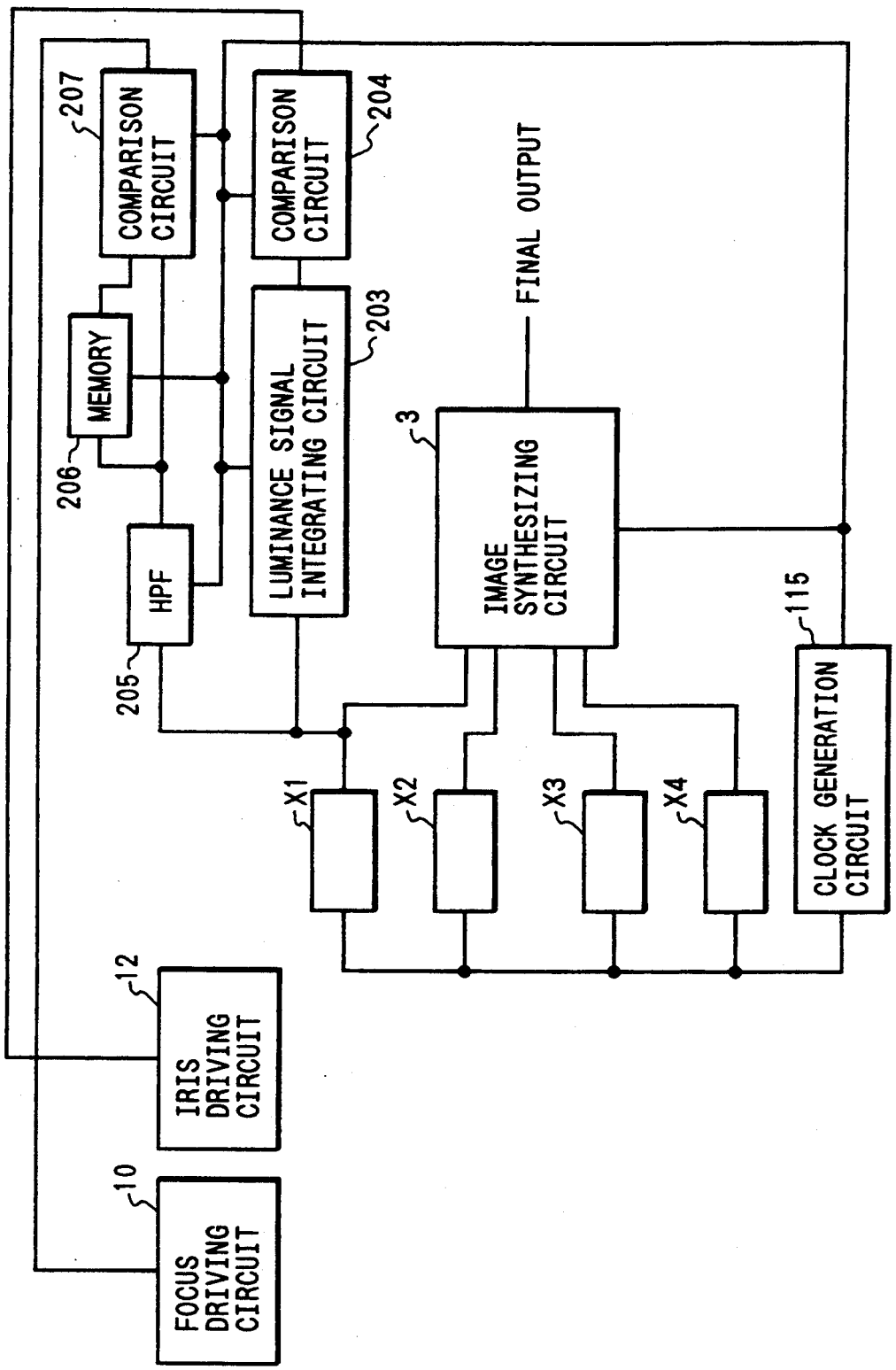
FIG. 41 is a block diagram showing a circuit arrangement of an image pickup device of the arrangement shown in FIG. 37.

FIG. 41 is a block diagram showing a detailed circuit arrangement of the image pickup device having the arrangement shown in FIG. 37. In FIG. 41, image pickup units X1 to X4 have the same arrangement as that of the image pickup unit Xi (i=1, 2, 3, 4) shown in FIG. 40, and respectively have the above-mentioned light-receiving portions a1, a2, b1, and b2. The operation timings of these image pickup elements 101 to 104 are controlled by the clock generation circuit 115.

The output terminal of the image pickup unit X1 is connected to a luminance signal integrating circuit 203 for integrating luminance signals for one frame from the image pickup element 101 having the light-receiving portion a1 to obtain an average amount of light incident on the image pickup element 101. The output terminal of the luminance signal integrating circuit 203 is connected to a comparison circuit 204 for comparing the average amount of light incident on the image pickup element 101 with a prescribed value to determine whether the average amount falls within a predetermined range from the prescribed value or is larger or smaller than the prescribed value exceeding the predetermined range. The output from the comparison circuit 204 is input to the iris driving circuit 12.

The output terminal of the image pickup unit X1 is also connected to a high-pass filter (HPF) 205. The output terminal of the HPF 205 is connected to a memory 206 for storing a maximum value of data for one frame, and one input terminal of a comparison circuit 207. The output terminal of the memory 206 is connected to the other input terminal of the comparison circuit 207. The output terminal of the comparison circuit 207 is connected to the focus driving circuit 10.

The output terminals of the image pickup units X1 to X4 are connected to the image synthesizing circuit 3, and the output from the image synthesizing circuit 3 serves as a final output. In this case, the operation timings of all the elements shown in FIG. 41 are controlled by the clock generation circuit 115.

Figure 42:
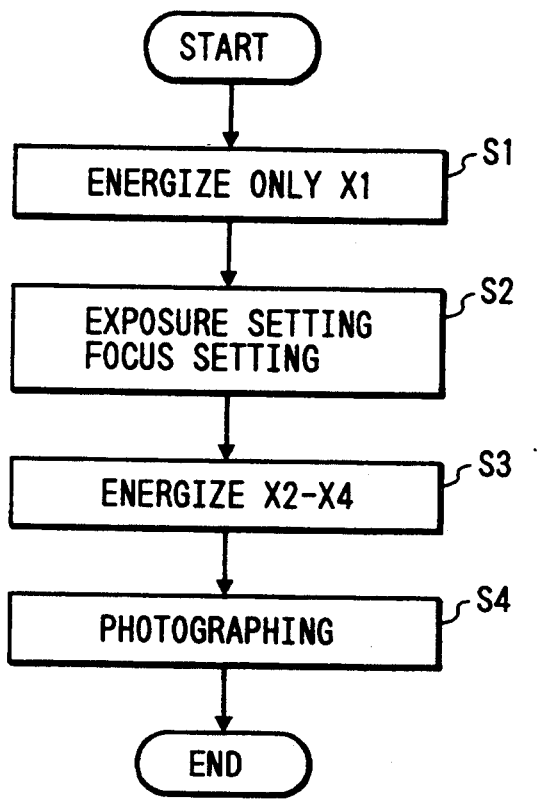
FIG. 42 is a flow chart showing an operation of the circuit shown in FIG. 41.

FIG. 42 shows a general flow of an image pickup operation of the circuit shown in FIG. 41. When the image pickup operation is started, only one of the image pickup elements, e.g., only the image pickup unit X1 of the image pickup element 101 is energized (step S1), and exposure and focus setting operations are performed by utilizing the output from the image pickup element 101 (step S2). Thereafter, the remaining image pickup units X2 to X4 are energized (step S3) to perform a photographing operation (step S4).

When the plurality of image pickup elements 101 to 104 are used to increase the number of pixels, power consumption is also increased in proportion to an increase in the number of pixels, thus posing problems of heat generation and a power supply countermeasure when an internal battery is used. In this embodiment, photographing conditions (e.g., exposure and focus setting operations) are set by utilizing the output from one of the image pickup elements. For this reason, power consumption can be saved, and a device having a high power saving effect can be realized.

The photographing operation will be described in detail below.

When only the image pickup unit X1 is energized, the luminance signal integrating circuit 203 connected to the output terminal of the image pickup unit X1 integrates luminance signals for one frame from the image pickup element 101 to obtain an average amount of light incident on the image pickup element 101, and the comparison circuit 204 then compares the average amount of light incident on the image pickup element 101 with a prescribed value to discriminate whether the average value falls within a predetermined range from the prescribed value or is larger or smaller than the prescribed value exceeding the predetermined range. When the discrimination result of the comparison circuit 204 indicates that the average amount of light incident on the image pickup element 101 is larger than the prescribed value exceeding the predetermined range, the iris 11 is stopped down based on the output from the comparison circuit 204 through the iris driving circuit 12. When it is determined that the average amount of light incident on the image pickup element 101 is smaller than the prescribed value exceeding the predetermined range, the iris 11 is opened based on the output from the comparison circuit 204 through the iris driving circuit 12. If it is determined that the average amount of light incident on the image pickup element 101 falls within the predetermined range from the prescribed value, the output from the comparison circuit 204 does not drive the iris driving circuit 12, and the aperture value of the iris 11 is left unchanged. In this manner, an exposure condition is set.

In the focus setting operation, outputs from the image pickup unit X1 are read out for one frame, and a maximum value of the outputs from the HPF 205 for one frame is stored in the memory 206. Then, the lens is driven through the focus driving circuit 10, so that the focal point is set at the near-focus side by a predetermined amount. Thereafter, outputs from the image pickup unit X1 are read out for one frame again, and the comparison circuit 207 compares the outputs from the HPF 205 for one frame with the immediately preceding maximum value stored in the memory 206. If it is determined that the maximum value of the currently readout outputs from the HPF 205 is larger than the immediately preceding maximum value stored in the memory 206 by a predetermined value or more, it can be considered that the focal point can be more satisfactorily adjusted in the current state than that in the immediately preceding state. Thus, the lens is driven through the focus driving circuit 10, so that the focal point is set at the near-focus side by another predetermined amount. Thereafter, the outputs from the image pickup unit X1 for one frame are read out, and the same operation as described above is repeated.

If it is determined that the maximum value of the currently readout outputs from the HPF 205 is larger than the immediately preceding maximum value stored in the memory 206 by a predetermined value or more, the focal point in the current state is shifted more than that in the immediately preceding state. Thus, the lens is driven through the focus driving circuit 10, so that the focal point is set at the far-focus side by a predetermined amount. Thereafter, the outputs from the image pickup unit X1 for one frame are read out, and the same operation as described above is repeated.

If it is determined that the maximum value of the currently readout outputs from the HPF 205 falls within a predetermined range from the immediately preceding maximum value stored in the memory 206, the focal point is substantially adjusted. Thus, the focus driving circuit 10 is not driven, and the current focal point position is left unchanged. In this manner, the focus setting operation is completed. In the above setting operations, since an operation for correcting a shift in focal point is repeated, the focal point can be finally adjusted.

Upon completion of the exposure condition and focus setting operations, as described above, all the image pickup units X1 to X4 are energized to perform a photographing operation. When a main exposure operation is performed, four split object image portions are respectively stored in the image memories of the image pickup units X1 to X4. These pieces of image information are read out by the image synthesizing circuit 3, and are synthesized in the pattern shown in FIG. 39. Thereafter, the synthesized information is output to an output terminal as a final output. In this case, the operation timing of the image synthesizing circuit 3 is also controlled by the clock generation circuit 115.

Figure 43:
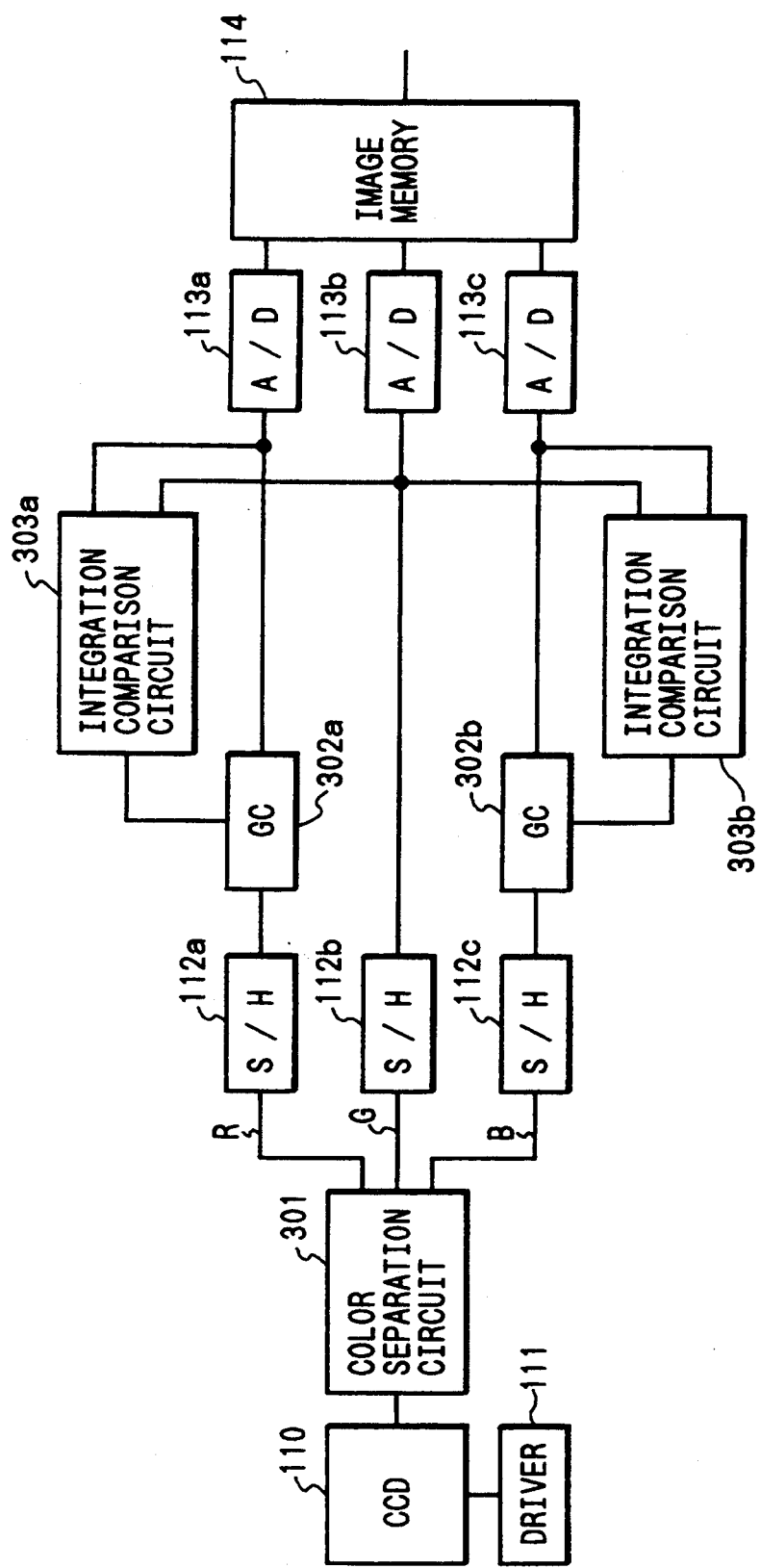
FIG. 43 is a block diagram showing an arrangement of an image pickup unit x1 when white balance adjustment is performed by the circuit shown in FIG. 41.
Figure 44:
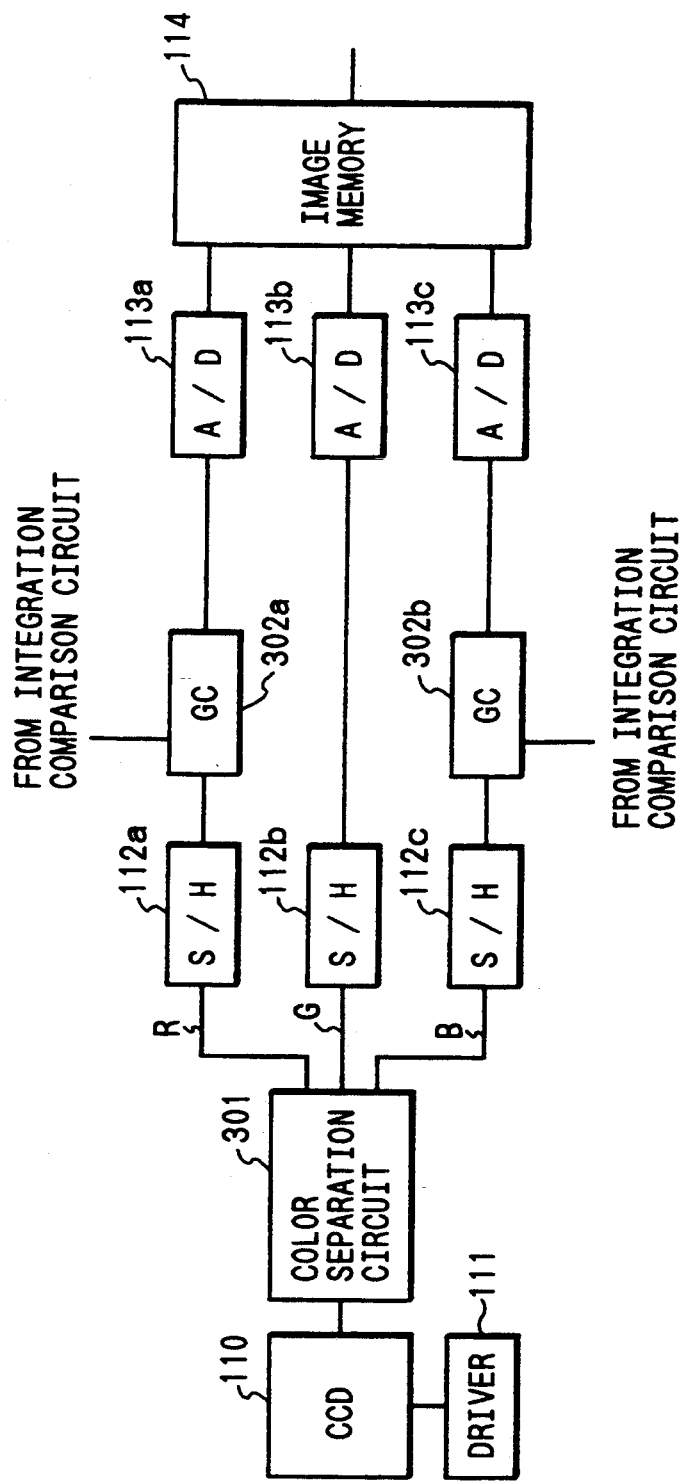
FIG. 44 is a block diagram showing an arrangement of image pickup units x2 to x4 when white balance adjustment is performed by the circuit shown in FIG. 41.

When white balance adjustment is to be additionally performed in the above embodiment, the image pickup unit X1 shown in FIG. 40 can be replaced with the circuit shown in FIG. 43, and each of the image pickup units X2 to X4 can be replaced with the circuit shown in FIG. 44, thus realizing white balance adjustment.

In FIG. 43, the image pickup element 110 and its driver 111 are the same as those shown in FIG. 40. Color filters are adhered to the image pickup element 110, and pieces of information from the color filters, which are spatially arranged, are time-serially read out. For this reason, these pieces of information are input to a color separation circuit 301 to separate color components (R, G, and B). The color-separated signals are sampled and held by S/H circuits 112a to 112c. Of the outputs from the S/H circuits 112a to 112c, R and B components are input to white balance adjustment variable gain amplifiers (GCs) 302a and 302b. The output from the R-component variable gain amplifier 302a and the output from the G-component S/H circuit 112b are supplied to the two input terminals of an integration comparison circuit 303a for generating an R component white balance control signal. The output from the integration comparison circuit 303a is input to the gain control terminal of the variable gain amplifier 302a. The output from the variable gain amplifier 302a is input to the image memory 114 through an A/D converter 113a.

The output from the B-component variable gain amplifier 302b and the output from the G-component S/H circuit 112b are supplied to the two input terminals of an integration comparison circuit 303b for generating a B-component white balance control signal. The output from the integration comparison circuit 303b is input to the gain control terminal of the variable gain amplifier 302b. The output from the variable gain amplifier 302b is input to the image memory 114 through an A/D converter 114c.

The output from the G-component S/H circuit 112b is directly input to the image memory 114 through an A/D converter 113b. The image memory 114 stores image information for one frame of the image pickup element 110.

FIG. 44 shows substantially the same arrangement as that shown in FIG. 43, except that the integration comparison circuits 303a and 303b shown in FIG. 43 are omitted, and the gain control terminals of the variable gain amplifiers 302a and 302b are directly connected to the output terminals of the integration comparison circuits 303a and 303b shown in FIG. 43, so that gain control is performed according to the signals input from the integration comparison circuits 303a and 303b.

The operations of the circuits shown in FIGS. 43 and 44 will be described below. The operation flow is substantially the same as that shown in FIG. 42, except that white balance adjustment is performed in place of the exposure and focus setting operations executed in step S2. Thus, only this operation will be described below.

In FIG. 43, information time-serially read out from the color filters of the image pickup element 110 is separated into color components (R, G, and B) by the color separation circuit 301. The color-separated signals are sampled and held by the S/H circuits 112a to 112c. Of the outputs from the S/H circuits 112a to 112c, R and B components are input to the variable gain amplifiers 302a and 302b for white balance adjustment. The output from the R-component variable gain amplifier 302a and the output from the G-component S/H circuit 112b are input to the two input terminals of the integration comparison circuit 303a for generating an R-component white balance control signal, so that the average values of R and G component signals for one frame are compared by the integration comparison circuit 303a. At this time, if the average value of the R component signals for one frame is larger than the average value of the G component signals by a predetermined value or more, the output from the integration comparison circuit 303a is set to be a value smaller than the current value by the predetermined value, thereby decreasing the gain of the variable gain amplifier 302a from the current value by a predetermined value. However, if the average value of the R component signals for one frame is smaller than the average value of the G component signals by a predetermined value or more, the output from the integration comparison circuit 303a is set to be a value larger than the current value by the predetermined value, thereby increasing the gain of the variable gain amplifier 302a by a predetermined value. When it is determined according to the comparison result that the difference between the two average values falls within a predetermined range, since the G and R components are balanced, the output from the integration comparison circuit 303a maintains the current value.

The output from the B-component variable gain amplifier 302b and the output from the G-component S/H circuit 112b are input to the two input terminals of the integration comparison circuit 303b for generating a G-component white balance control signal, so that the average values of B and G component signals for one frame are compared by the integration comparison circuit 303b. At this time, if the average value of the B component signals for one frame is larger than the average value of the G component signals by a predetermined value or more, the output from the integration comparison circuit 303b is set to be a value smaller than the current value by the predetermined value, thereby decreasing the gain of the variable gain amplifier 302b from the current value by a predetermined value. However, if the average value of the B component signals for one frame is smaller than the average value of the G component signals by a predetermined value or more, the output from the integration comparison circuit 303b is set to be a value larger than the current value by the predetermined value, thereby increasing the gain of the variable gain amplifier 302b by a predetermined value. When it is determined according to the comparison result that the difference between the two average values falls within a predetermined range, since the G and B components are balanced, the output from the integration comparison circuit 303b maintains the current value.

In the above operation, a white balance shift in any direction can be corrected for both the R and B components, and when white balance is attained, the balance state is maintained. As a result, a correct white balance can be attained finally.

In this manner, after the white balance adjustment is performed in step S2 in FIG. 42, the image pickup units X2 to X4 each having the arrangement shown in FIG. 44 are energized. At this time, the control inputs of the variable gain amplifiers 302a and 302b are the outputs from the integration comparison circuits 303a and 303b in FIG. 43, as described above (step S3).

When a main exposure operation is performed, four split object image portions are respectively stored in the image memories of the image pickup units X1 to X4. These pieces of image information are read out by the image synthesizing circuit 3, and are synthesized in the pattern shown in FIG. 39 (step S4).

Figure 45:
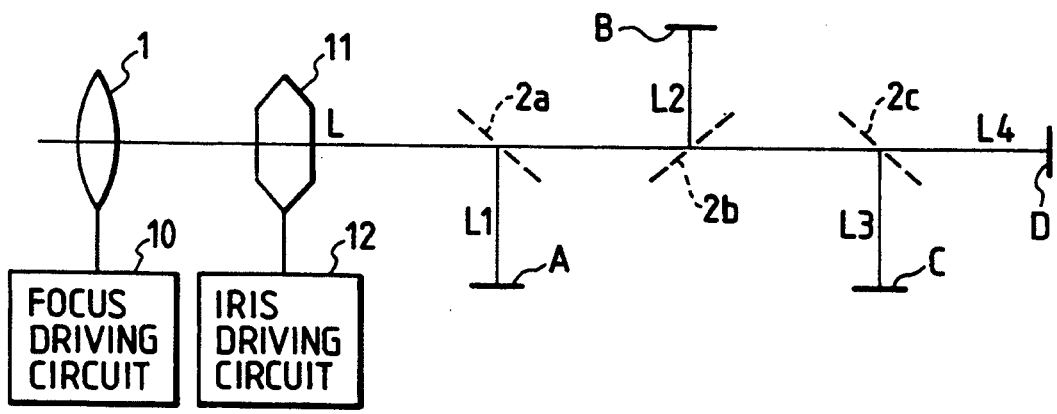
FIG. 45 is a diagram showing principal part according to the eighth embodiment of the present invention.

FIG. 45 is a diagram showing the eighth embodiment of the present invention. The same reference numerals in FIG. 45 denote the same parts as in FIG. 37. FIG. 45 illustrates only an image pickup optical system.

In the embodiment shown in FIG. 45, the number of split optical paths of image pickup light L is doubled, i.e., four as compared to the embodiment shown in FIG. 37, and three beam splitters 2a, 2b, and 2c are arranged. These beam splitters 2a, 2b, and 2c respectively have reflectances of 25% (¼), 33% (⅓), and 50% (½), and supply beams L1, L2, L3, and L4 having equal light amounts to four image formation planes A, B, C, and D, thus forming object images having the same size and the same brightness on the image formation planes A, B, C, and D. The object image on each of the image formation planes A, B, C, and D is split into a plurality of images, and light-receiving portions of image pickup elements (not shown) are arranged at non-neighboring split positions of the images. Pieces of image information from these image pickup elements are synthesized to form the entire object image.

In the embodiment shown in FIG. 45, an object image is split into 16 images (4×4 in the horizontal and vertical directions) on each of the image formation planes A, B, C, and D, as shown in FIGS. 46A to 46D. The light-receiving portions of the image pickup elements are arranged at non-neighboring four split positions on each image formation plane. More specifically, on the image formation plane A shown in FIG. 46A, light-receiving portions a1, a2, a3, and a4 are respectively arranged at the first, third, ninth, and eleventh positions. On the image formation plane B shown in FIG. 46B, light-receiving portions b1, b2, b3, and b4 are respectively arranged at the second, fourth, tenth, and twelfth positions. On the image formation plane C shown in FIG. 46C, light-receiving portions c1, c2, c3, and c4 are respectively arranged at the fifth, seventh, thirteenth, and fifteenth positions. On the image formation plane D shown in FIG. 46D, light-receiving portions d1, d2, d3, and d4 are respectively arranged at the sixth, eighth, fourteenth, and sixteenth positions.

Image information of an object, which is separately picked up by the 16 light-receiving portions a1 to a4, b1 to b4, c1 to c4, and d1 to d4 in the above-mentioned arrangement states of the image pickup elements on the image formation planes A, B, C, and D, is synthesized by the image synthesizing circuit, as described above. FIG. 47 shows the state of the synthesized image information, and illustrates contributions of the respective light-receiving portions to the object image. In this embodiment, the number of effective pixels on the image formation planes A, B, C, and D is 16 times that of a single image pickup element, and a resolution equivalent to that obtained when an image pickup element having the number of pixels 16 times that of a conventional image pickup element, can be obtained, thus obtaining an image with higher image quality than that of the embodiment shown in FIG. 37.

Like in the embodiment shown in FIG. 37, automatic focus adjustment and automatic exposure adjustment are performed by a focus driving circuit 10 and an iris driving circuit 12. In this case, since these adjustment operations are performed by utilizing the output from one of image pickup elements, power consumption can be saved, and the same effect as in the embodiment shown in FIG. 37 can be obtained.

Figure 48:
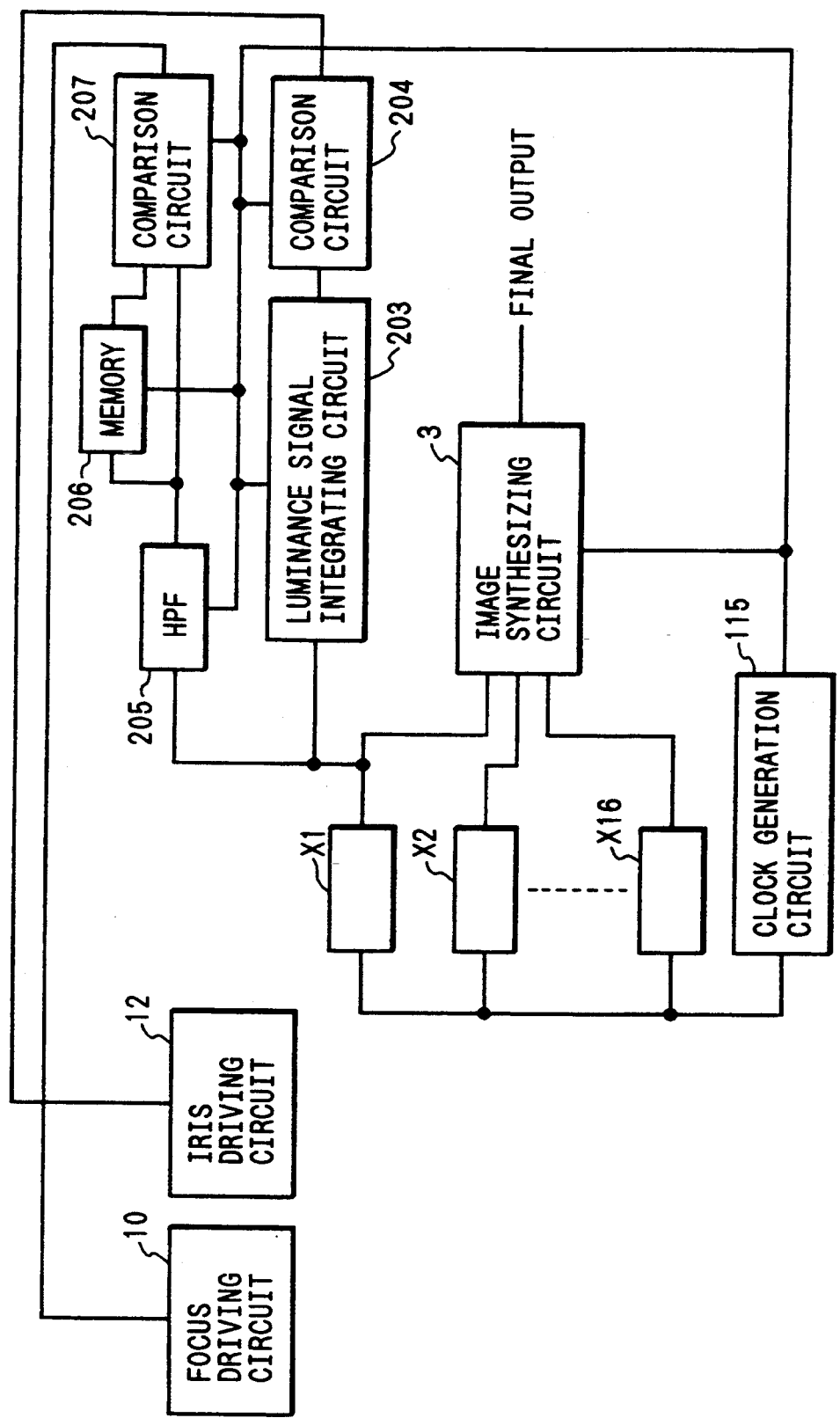
FIG. 48 is a block diagram showing a circuit arrangement of an image pickup device having the arrangement shown in FIG. 45.

FIG. 48 is a block diagram showing a circuit arrangement of the image pickup device having the arrangement shown in FIG. 45. The same reference numerals in FIG. 45 denote the same parts as in FIG. 41. More specifically, in this circuit, the number of image pickup units Xi in the circuit shown in FIG. 41 is increased from 4 to 16, and the operation flow is the same as that shown in FIG. 42.

In the embodiment shown in FIG. 37, when the light-receiving units a1 and b1 are arranged in the horizontal direction in units shown in FIG. 49A, the number of image pickup elements can be infinitely increased. FIG. 49B shows a case wherein a total of eight light-receiving portions a and b are arranged in the horizontal direction. The arrangement in the vertical direction can be realized by rotating the above-mentioned pattern shown in FIG. 49A through 90°.

In the embodiment shown in FIG. 45, when the light-receiving units a1, b1, c1 and d1 are arranged in the vertical and horizontal directions in units shown in FIG. 50A, the number of image pickup elements can be infinitely increased. FIG. 50B shows a case wherein a total of 64 light-receiving portions a, b, c, and d are arranged.

In these extended examples shown in FIGS. 49A to 50B, an electrical circuit for driving these elements can be easily realized by increasing the number of image pickup units having the circuit shown in FIG. 41 in correspondence with the number of image pickup elements.

In this manner, when an image formation optical path used in, e.g., an existing industrial-use multi-board camera is split into a plurality of paths by a beam splitter, the equivalent number of pixels can be greatly increased, and an image having higher image quality can be obtained. Since photographing conditions are set by utilizing the output from one of the image pickup elements, a high power saving effect can be obtained.

As described above, according to the above-mentioned embodiments, image pickup light from an object is split into a plurality of beams in equal light amounts, and object images are formed at different positions. The light-receiving portions of the image pickup elements are arranged at non-neighboring split positions when the object image is split into a plurality of images on each image formation plane, and pieces of image information are synthesized later. Thus, the number of effective pixels can be increased using conventional image pickup elements without using a high-integration image pickup element, and image quality can be improved. In addition, power consumption can be saved, and a high power saving effect can be obtained.

Figure 51:
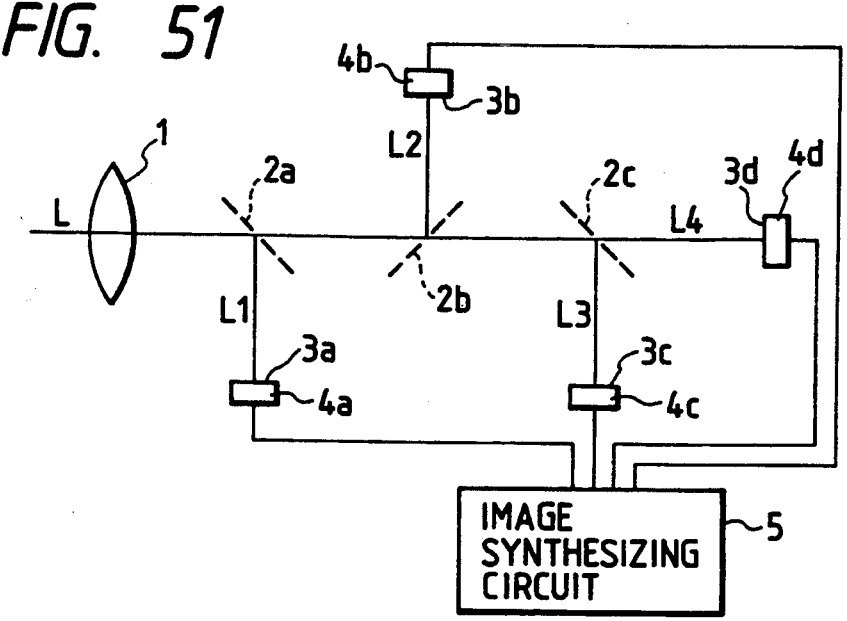
FIG. 51 is a diagram showing principal part according to the ninth embodiment of the present invention.
Figure 52A:
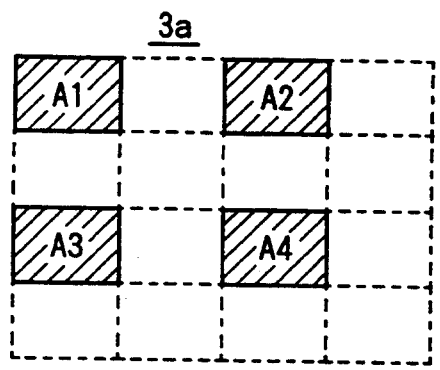
FIGS. 52A to 52D are explanatory views showing states of image formation planes of FIG. 51.
Figure 52B:
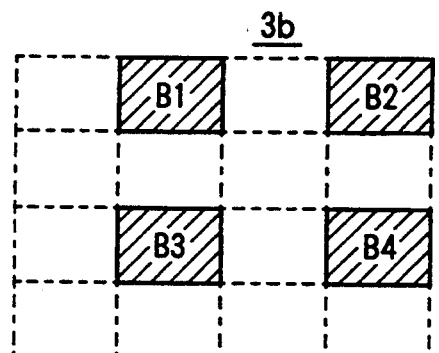
Figure 52C:
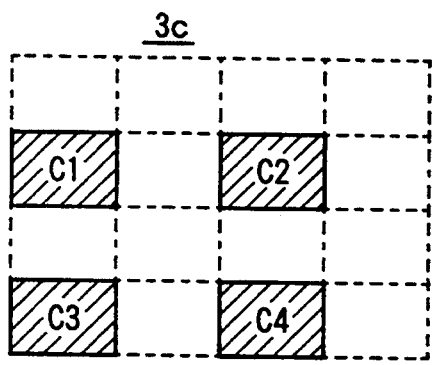
Figure 52D:
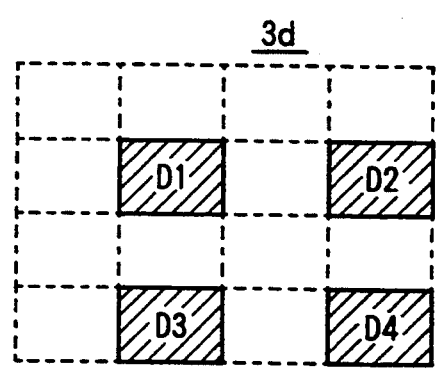

FIG. 51 is a diagram showing principal part of an image pickup device according to the ninth embodiment of the present invention. The image pickup device shown in FIG. 51 includes an imaging lens 1 through which image pickup light L from an object passes, and beam splitters 2a, 2b, and 2c serving as split means for splitting the image pickup light L into a plurality of beams L1, L2, L3, and L4 in equal light amounts, and forming object images at different positions. Each of these beam splitters 2a, 2b, and 2c comprises, e.g., a half-mirror. The beam splitters 2a, 2b, and 2c respectively have reflectances of 25% ($\frac{1}{4}$), 33% ($\frac{1}{3}$), and 50% ($\frac{1}{2}$), and supply beams L1, L2, L3, and L4 having equal light amounts to image formation planes (focal planes) 3a, 3b, 3c, and 3d of the four object images, thus forming object images having the same size and the same brightness on the image formation planes 3a, 3b, 3c, and 3d. The image pickup device also includes image pickup element chips 4a, 4b, 4c, and 4d each having a plurality of light-receiving portions, which are split on a plane. These light-receiving portions are arranged at non-neighboring positions when an object image is split into a plurality of images on each of the image formation planes 3a, 3b, 3c, and 3d. The image pickup device further includes an image synthesizing circuit 5 for receiving image information from the image pickup element chips 4a, 4b, 4c, and 4d, and synthesizing the entire object image.

On each of the image formation planes 3a, 3b, 3c, and 3d, an object image is split into 16 (4×4 in the horizontal and vertical directions) portions, as shown in FIGS. 52A to 52D, and the plurality of light-receiving portions A1 to A4, B1 to B4, C1 to C4, or D1 to D4 of a corresponding one of the image pickup element chips 4a, 4b, 4c, and 4d are arranged at four non-neighboring split positions. More specifically, on the image formation plane 3a shown in FIG. 52A, the light-receiving portions A1, A2, A3, and A4 are respectively arranged at the first, third, ninth, and eleventh positions. On the image formation plane 3b shown in FIG. 52B, the light-receiving portions B1, B2, B3, and B4 are respectively arranged at the second, fourth, tenth, and twelfth positions. On the image formation plane 3c shown in FIG. 52C, the light-receiving portions C1, C2, C3, and C4 are respectively arranged at the fifth, seventh, thirteenth, and fifteenth positions. On the image formation plane 3d shown in FIG. 52D, the light-receiving portions D1, D2, D3, and D4 are respectively arranged at the sixth, eighth, fourteenth, and sixteenth positions.

Image information of an object, which is separately picked up by the 16 light-receiving portions A1 to A4, B1 to B4, C1 to C4, and D1 to D4 in the above-mentioned arrangement states of the image pickup element chips 4a, 4b, 4c, and 4d on the image formation planes 3a, 3b, 3c, and 3d, is synthesized by the image synthesizing circuit 5, as described above. FIG. 53 shows the state of the synthesized image information, and illustrates contributions of the respective light-receiving portions (A, B, C, and D) to the object image. In this embodiment, the number of effective pixels on the image formation planes 3a, 3b, 3c, and 3d is 16 times that of a single image pickup element, and a resolution equivalent to that obtained when an image pickup element having the number of pixels 16 times that of a conventional image pickup element, can be obtained, thus obtaining an image with high image quality.

Upon realization of the arrangements shown in FIGS. 52A to 52D, when the packages of the image pickup elements are sufficiently small, the 16 light-receiving portions A1 to A4, B1 to B4, C1 to C4, and D1 to D4 can be constituted by independent image pickup elements. However, when the size of the package of the image pickup element is too large, if the independent image pickup elements are used, they interfere with each other. Thus, in this embodiment, the image pickup element chip 4a whose light-receiving portion has a size corresponding to nine out of 16 split portions is arranged on the image formation plane 3a, as indicated by a solid line in FIG. 54A, and the light-receiving portions A1 to A4 are set on the four hatched portions of the these split portions. The image pickup element chip 4b whose light-receiving portion has a size corresponding to nine out of 16 split portions is arranged on the image formation plane 3b, as indicated by a solid line in FIG. 54B, and the light-receiving portions B1 to B4 are set on the four hatched portions of the these split portions. Similarly, the image pickup element chip 4c whose light-receiving portion has a size corresponding to nine out of 16 split portions is arranged on the image formation plane 3c, as indicated by a solid line in FIG. 54C, and the light-receiving portions C1 to C4 are set on the four hatched portions of the these split portions. The image pickup element chip 4d whose light-receiving portion has a size corresponding to nine out of 16 split portions is arranged on the image formation plane 3d, as indicated by a solid line in FIG. 54D, and the light-receiving portions D1 to D4 are set on the four hatched portions of the these split portions.

In this case, the size of each of the light-receiving portions A1 to A4, B1 to B4, C1 to C4, and D1 to D4 is set to be equal to the image size (e.g., a $\frac{1}{2}$" correspondence size) of a currently popular image pickup element. In this manner, the manufacturing equipment (including photomasks and the like) of the currently popular image pickup element can be used without modifications, and the image pickup element chips 4a to 4d shown in FIGS. 54A to 54D can be manufactured with a high yield (since the manufacturing processes and the like are stable).

Furthermore, since the alignment precision in a manufacturing apparatus of the image pickup element chip is very high, the relative positions of the light-receiving positions of the light-receiving portions A1 to A4, B1 to B4, C1 to C4, and D1 to D4 can be set with very high precision. Therefore, as an alignment operation of the light-receiving portions (including a falling direction), the alignment operations among the light-receiving portions A1 to A4, B1 to B4, C1 to C4, and D1 to D4 need not be performed, and the positions of the image pickup element chips 4a to 4d need only be adjusted. This is very preferable in terms of stability of light-receiving positional precision including an environmental change and a change over time.

Figure 55:
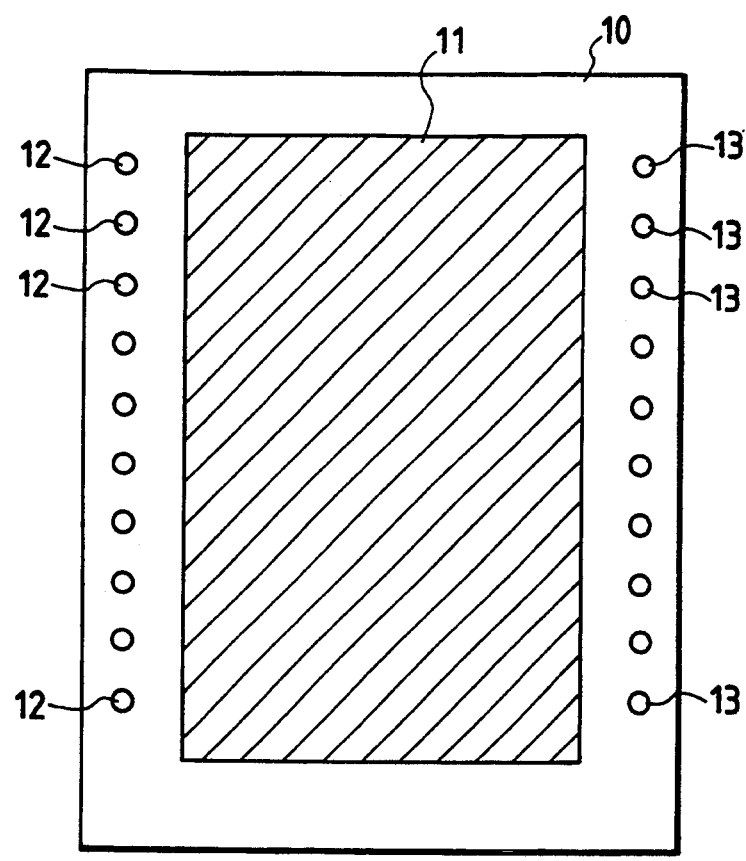
FIG. 55 is a plan view showing a detailed structure of a normal image pickup element chip.

FIG. 55 is a plan view showing the structure of a single image pickup element chip. The structure shown in FIG. 55 includes a semiconductor chip 10 of an image pickup element, an effective light-receiving area (light-receiving portion) 11 provided to a hatched portion inside the semiconductor chip 10, and a plurality of bonding pads 12 and 13 connected to external pins through wires. These bonding pads 12 and 13 are connected to a circuit on the semiconductor chip through necessary wires during the manufacturing process of an integrated circuit (image pickup element). As shown in FIG. 55, bonding wires extending from the semiconductor chip 10 of the image pickup element to external terminals are led from the ends of the semiconductor chip 10. With this structure, the distance between the bonding pads 12 and 13 on the semiconductor chip 10 and a lead frame of an image pickup element package can be minimized. For this reason, easy machining is allowed, and electrical interference among bonding wires does not easily occur, thus improving stability and reliability.

For the sake of simplicity, assume that the bonding pads 12 are terminals for signals such as driver inputs to be input to the image pickup element, the bonding pads 13 are terminals for signals such as photoelectric conversion outputs to be output from the image pickup element, and other terminals such as a power supply terminal, a ground terminal and the like are properly connected to either side. In this case, when each of the image pickup element chips 4a to 4d shown in FIGS. 54A to 54D is constituted on the basis of the image pickup element shown in FIG. 55, the arrangement state of the light-receiving portions of each image pickup element chip is as shown in FIG. 56.

Figure 56:
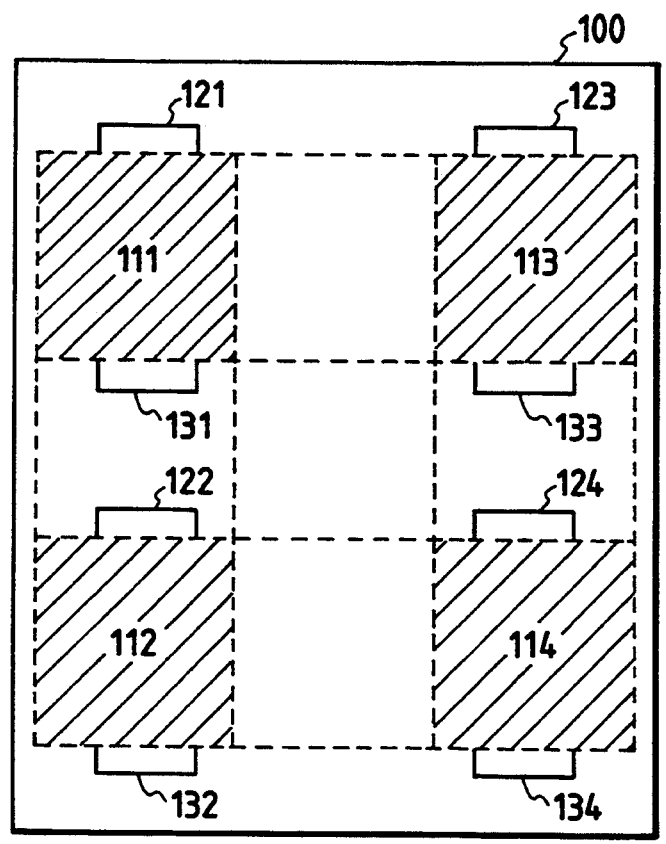
FIG. 56 is a plan view showing a detailed structure of an image pickup element chip shown in FIGS. 54A to 54D.

In FIG. 56, a semiconductor chip 100 corresponds to one of the image pickup element chips 4a to 4d shown in FIGS. 54A to 54D, and includes light-receiving portions 111 to 114 corresponding to those of each of the image pickup element chips 4a to 4d shown in FIGS. 54A to 54D. As can be seen from FIG. 55, the bonding pads of these light-receiving portions 111 to 114 are pads 121 to 124 (corresponding to the pads 12 in FIG. 55) in FIG. 56 and pads 131 to 134 (corresponding to the pads 13 in FIG. 55).

As can be apparent from FIG. 56, a wide blank region (a portion which is not used on the chip) is present among the light-receiving portions 111 to 114, and is wasteful in terms of the space factor. Thus, in this embodiment, a peripheral circuit portion of the image pickup element is formed between the light-receiving portions.

Figure 57:
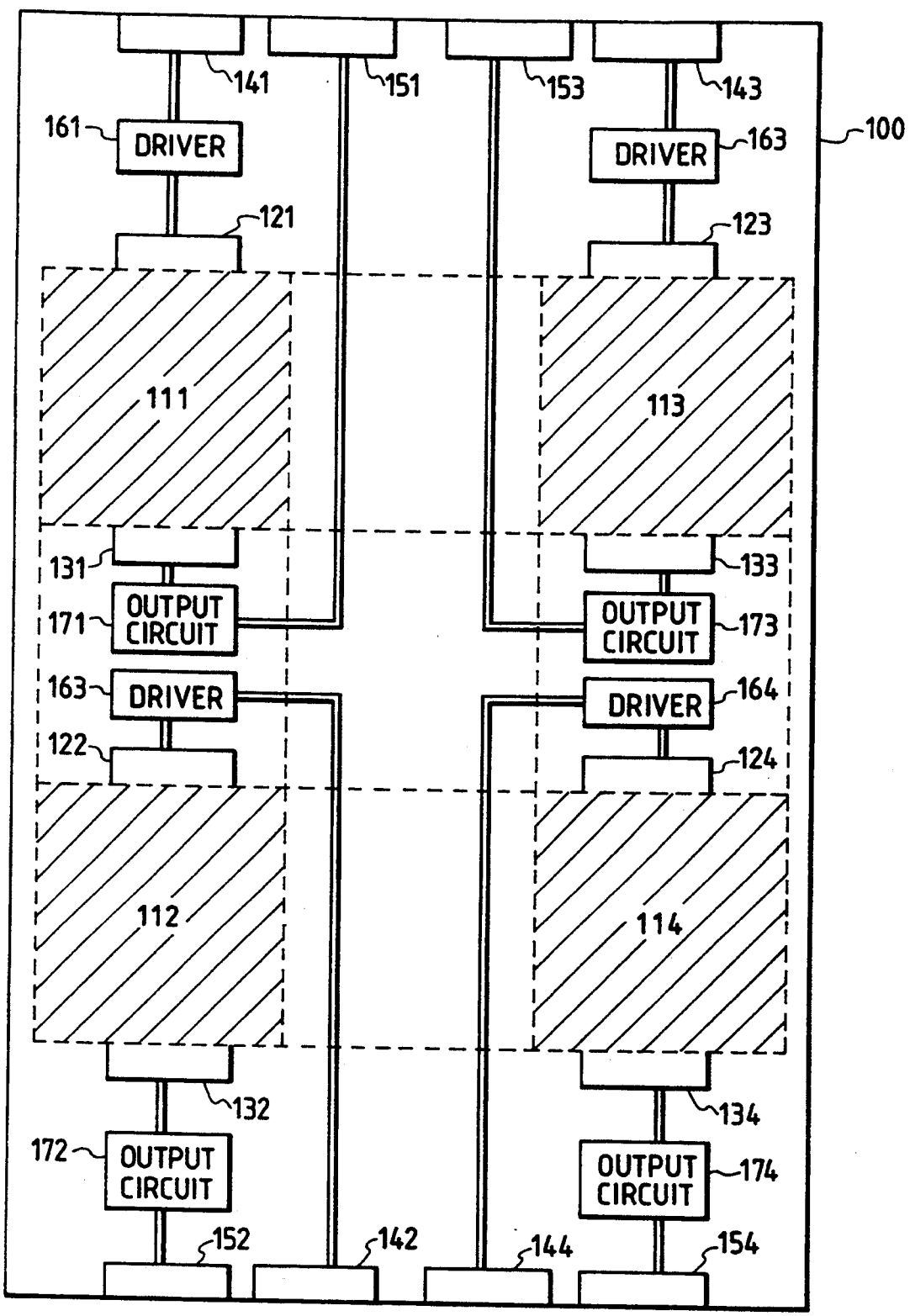
FIG. 57 is a diagram showing an example wherein an input/output circuit is arranged between light-receiving portions of the semiconductor chip shown in FIG. 56.

FIG. 57 is a diagram showing an arrangement wherein an input/output circuit is arranged in a blank portion between the light-receiving portions. FIG. 57 is basically the same as FIG. 56, and the same reference numerals in FIG. 57 denote the same parts as in FIG. 56. Most of a portion of the semiconductor chip 100 has no circuit elements excluding the light-receiving portions 111 to 114, and is in a blank state. Thus, as indicated by double lines in FIG. 57, by utilizing the blank portion between the light-receiving portions, the input bonding pads 121 to 124 are connected to bonding pads 141 to 144 arranged on the side edges of the chip through input circuits (not shown) or drivers (driving circuits) 161 to 164 formed on the blank region. The output bonding pads 131 to 134 are connected to bonding pads 151 to 154 arranged at the side edges of the chip through output circuits [noise reduction circuits for reducing noise components of output signals, S/H circuits for sampling/holding signals, or output-side signal processing circuits (a (variable gain) amplifier, a clamp circuit, a gamma correction circuit, a black/white clip circuit, and the like, or an A/D converter)] 171 to 174.

For the sake of illustrative convenience, FIG. 57 illustrates the drivers 161 and 163, and the output circuits 172 and 174 such that they are not present on the blank region between the light-receiving portions. However, in practice, these circuits are formed on the blank region between the light-receiving portions. The above-mentioned output circuits 171 to 174 may include a storage portion of a frame transfer type CCD, a frame interline type CCD, or the like.

Figure 58:
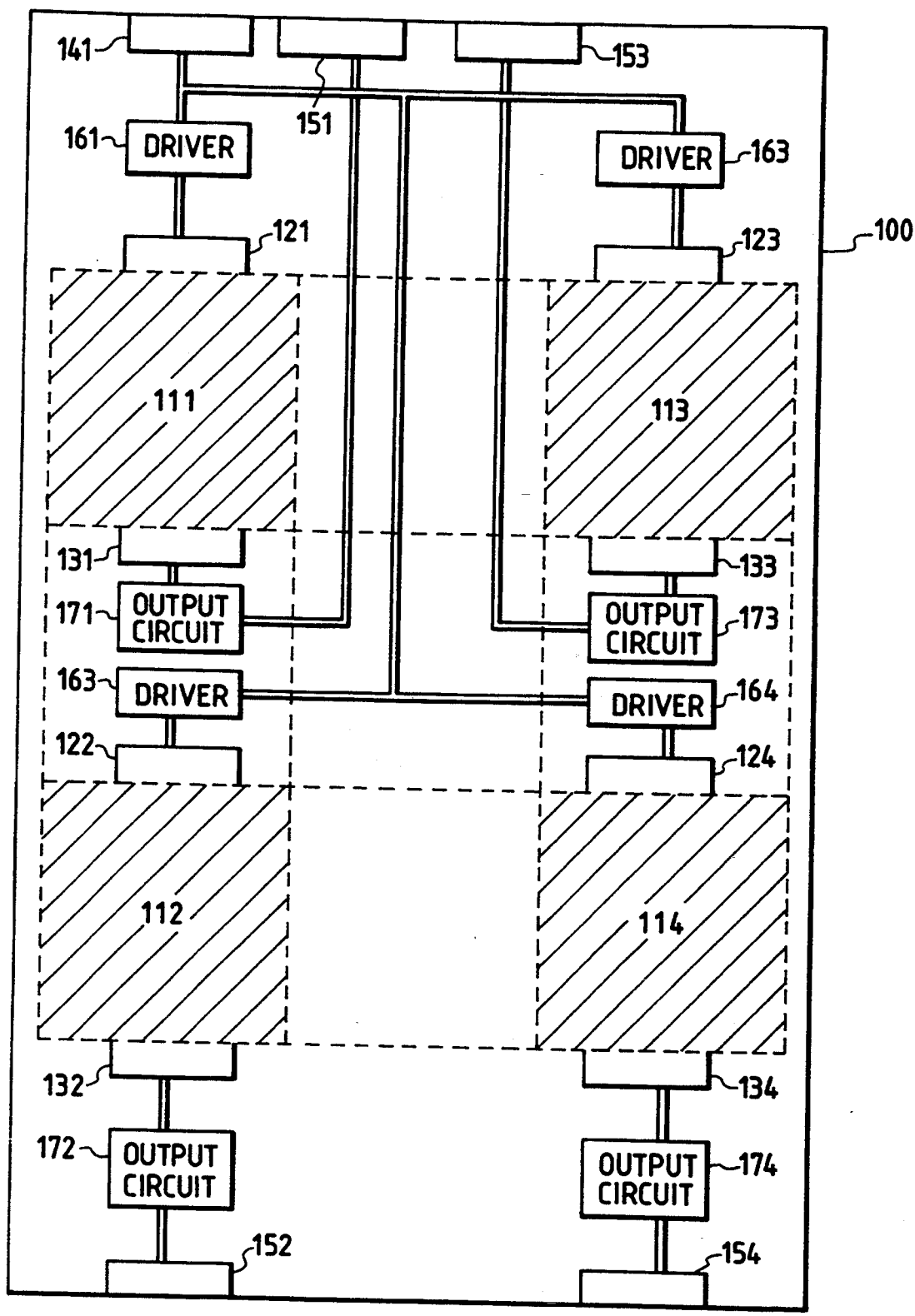
FIG. 58 is a diagram showing an example wherein the input side in the semiconductor chip shown in FIG. 57 is multiplexed.

FIG. 58 shows a modification of FIG. 57, and exemplifies a case wherein the input side is multiplexed. The two arrangements are almost the same, and the same reference numerals in FIG. 58 denote the same parts as in FIG. 57. An only difference is that the drivers 161 to 164 are controlled through the single bonding pad 141 of the chip. This is because the input impedance of the drivers is high, and the drivers can be sufficiently driven by a single timing signal generator. When the output impedance of the timing signal generator is relatively high, and the generator cannot drive four drivers, the output of the timing signal generator may be connected to a buffer to drive the four drivers. In this case, the buffer can be arranged in the semiconductor chip 100. On the contrary, when a plurality of light-receiving portions can be driven by a single driver, the plurality of light-receiving portions can be driven by a single driver.

In FIG. 58, the light-receiving portions are simultaneously driven. When the light-receiving portions are to be sequentially driven in terms of output-side signal processing, the arrangement shown in FIG. 55 can be employed. When the light-receiving portions are to be synchronously driven, the arrangement shown in FIG. 58 is simplest, and precision can also be improved. Furthermore, in this modification, the number of pins of the semiconductor chip 100 can be greatly decreased, thus providing another merit.

Figure 59:
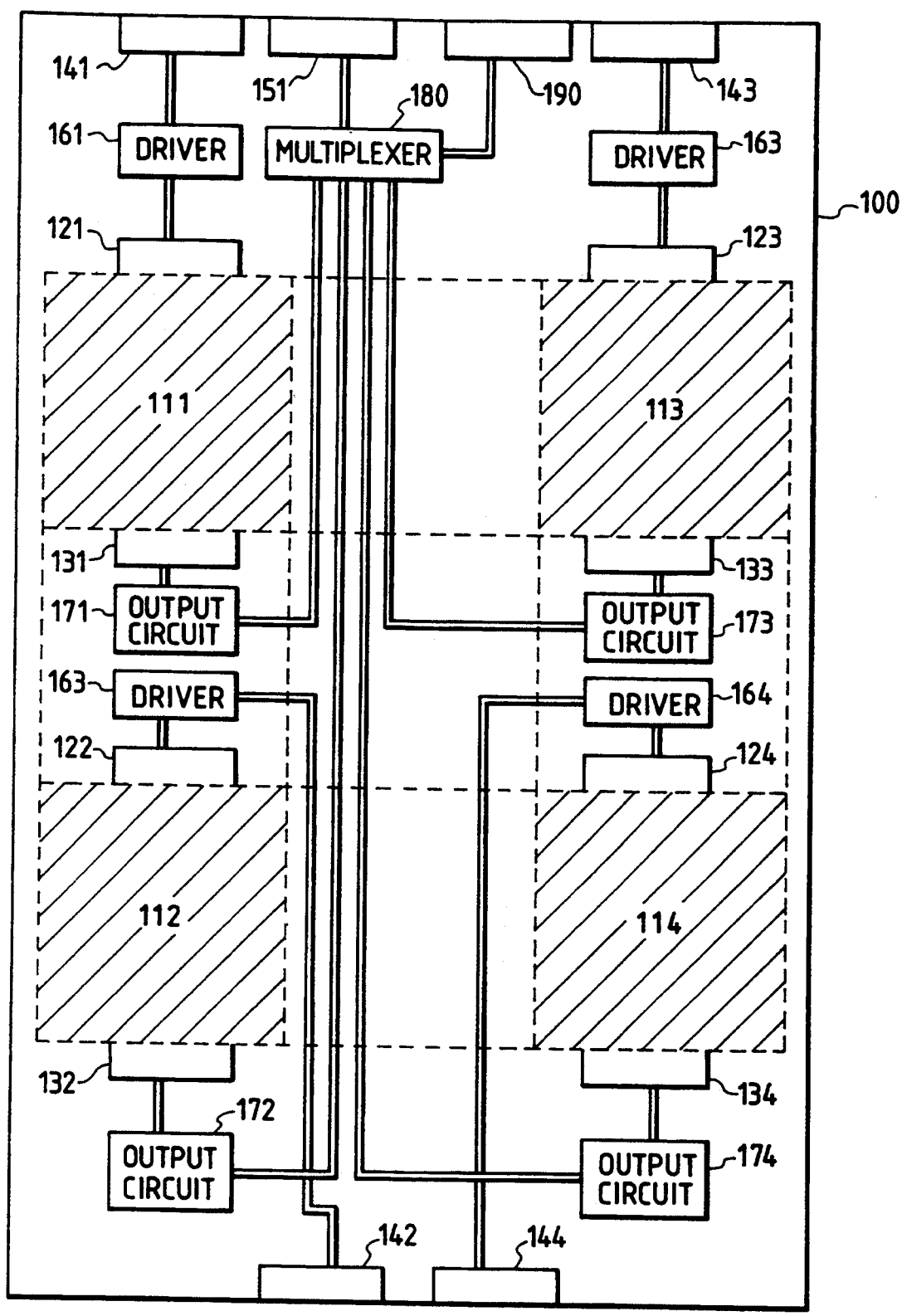
FIG. 59 is a diagram showing an example wherein the output side in the semiconductor chip shown in FIG. 57 is multiplexed.

FIG. 59 shows another modification of FIG. 57, and exemplifies a case wherein the output side is multiplexed. Also in this case, the two arrangements are almost the same, and the same reference numerals in FIG. 59 denote the same parts as in FIG. 57. Only a difference from FIG. 58 will be described below. In FIG. 59, all the output circuits 171 to 174 are connected to a multiplexer 180, and their outputs are output from the single bonding pad 151 on the chip. The multiplexer 180 determines one of the light-receiving portions 111 to 114 to output information according to a control signal from a bonding pad 190 arranged at the side edge of the semiconductor chip 100. This arrangement is suitable for a case wherein photographing results are output from the light-receiving portions in a frame-sequential (time-serial) manner in, e.g., a still image photographing operation. In this case, the number of pins of the semiconductor chip 100 can also be greatly decreased.

Figure 60:
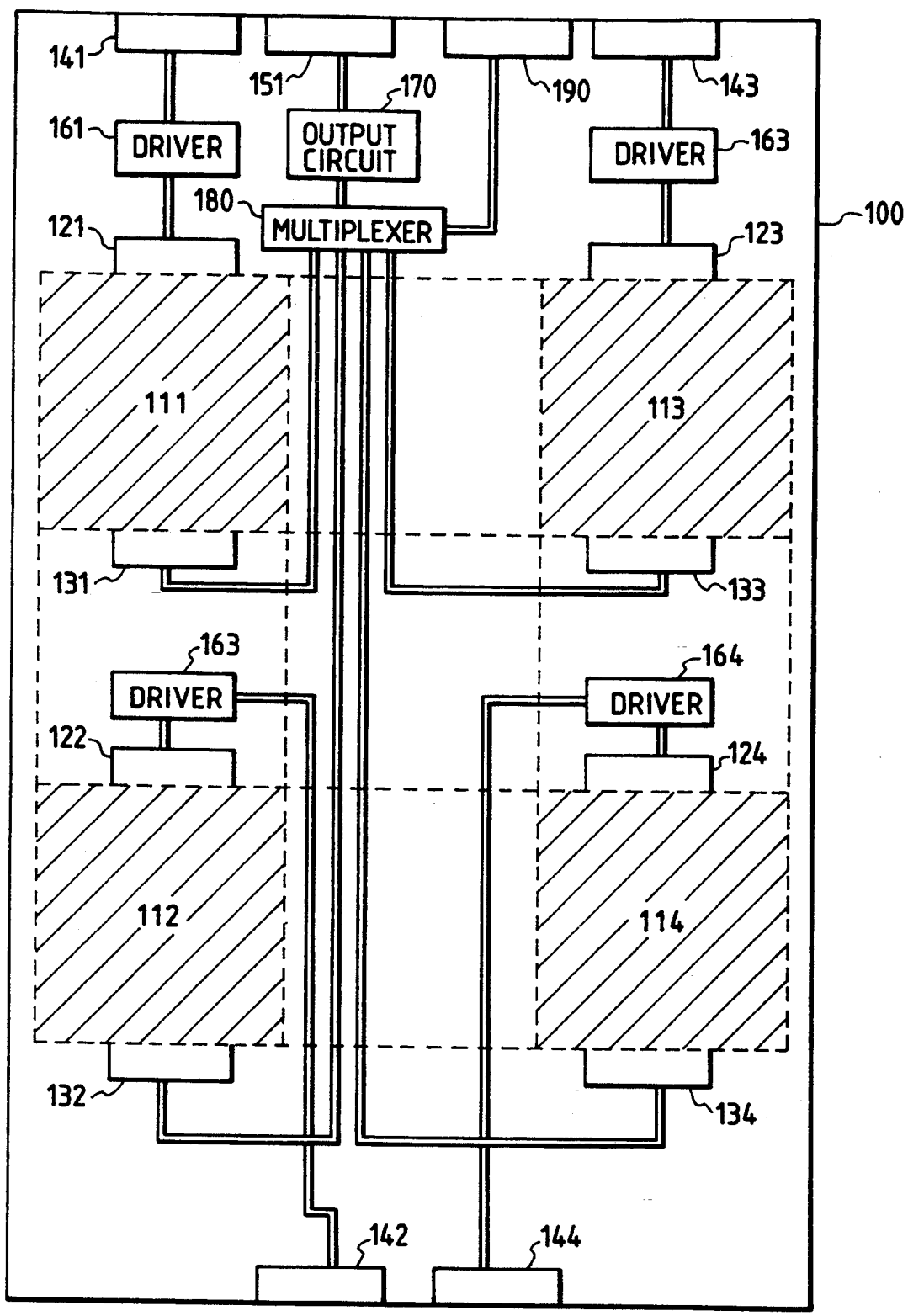
FIG. 60 is a diagram showing an example wherein a multiplexer is arranged at the output side of an output circuit in the semiconductor chip shown in FIG. 59.

FIG. 60 shows a modification of the semiconductor chip shown in FIG. 59, and exemplifies a case wherein the multiplexer 180 is arranged at the output side of an output circuit 170. More specifically, the two arrangements are almost the same, and the same reference numerals in FIG. 60 denote the same parts as in FIG. 59. Thus, only a difference from FIG. 58 will be described below. In FIG. 60, all the output bonding pads 131 to 134 are connected to the multiplexer 180, and their outputs are output from the single bonding pad 151 on the chip through the output circuit 170. The multiplexer 180 determines one of the light-receiving portions 111 to 114 to output information according to a control signal from a bonding pad 190 arranged at the side edge of the semiconductor chip 100. This arrangement is suitable for a case wherein photographing results are output from the light-receiving portions in a frame-sequential (time-serial) manner in, e.g., a still image photographing operation.

In this case, the number of pins of the semiconductor chip 100 can also be greatly decreased. Furthermore, in this case, since the output circuit 170 is common to all the light-receiving portions 111 to 114, the light-receiving portions 111 to 114 can have good matching output characteristics. In this case, the output circuit 170 may include a storage portion common to light-receiving portions when frame transfer type CCDs, frame interline type CCDs, or the like are employed.

Figure 61:
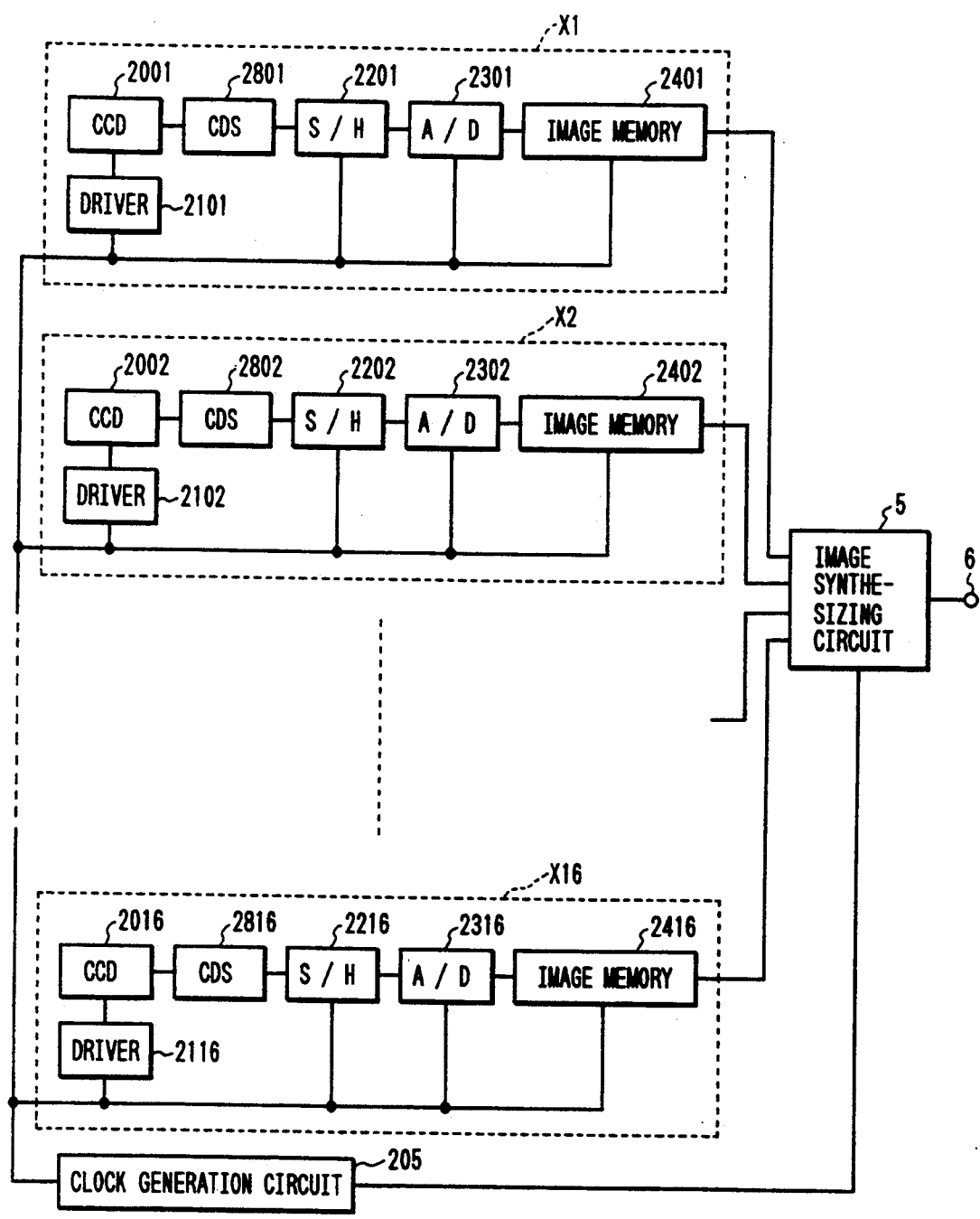
FIG. 61 is a block diagram showing a circuit arrangement of an image pickup device having the arrangement shown in FIG. 51.
Figure 65A:
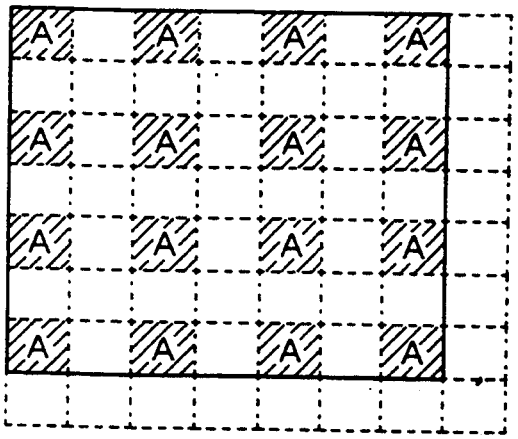
FIGS. 65A to 65D are explanatory views showing setting examples of light-receiving portions of the image pickup element chips shown in FIGS. 63A to 63D.
Figure 65B:
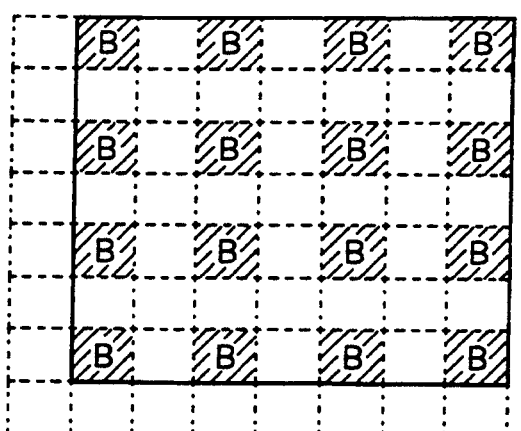
Figure 65C:
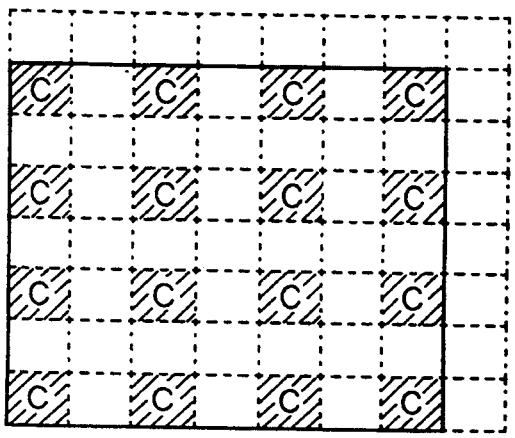
Figure 65D:
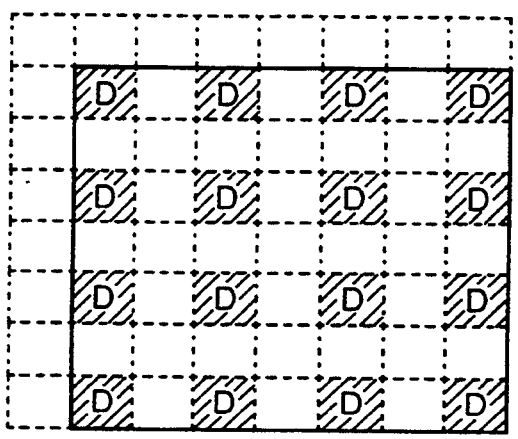

FIG. 61 is a block diagram showing a circuit arrangement of the image pickup device having the arrangement shown in FIG. 51. In FIG. 61, the image pickup device includes an image pickup element (e.g., a CCD) 2001 for photoelectrically converting an optical image of an object. The image pickup element 2001 corresponds to the light-receiving portion A1 in FIG. 54A in practice, and may include a storage portion when a frame transfer type CCD or a frame interline type CCD is employed. The image pickup device also includes a driver 2101 for driving the image pickup element 2001, a noise reduction circuit 2801 such as a correlation double sampling (CDS) circuit, an S/H circuit 2201 for sampling/holding an output from the image pickup element 2001, an A/D converter 2301 for converting an analog output signal from the image pickup element 2001, which is sampled and held by the S/H circuit 2201, into a digital signal, and an image memory 2401 for storing digital object image information converted by the A/D converter 2301 from the image pickup element 2001. The operation timings of the driver 2101 to the image memory 2401 are controlled by a timing signal from a clock generation circuit 205 as the above-mentioned timing signal generator.

Note that the above-mentioned signal processing circuits (a (variable gain) amplifier, a clamp circuit, a gamma correction circuit, a white/black clip circuit, and the like) may be arranged between the S/H circuit 2201 and the A/D converter 2301.

Some or all of the noise reduction circuit 2801 to the A/D converter 2301 may be arranged on the semiconductor chip 100 shown in FIGS. 57 to 59.

A portion consisting of the image pickup element 2001 to the image memory 2401 and surrounded by a broken line constitutes an image pickup unit X1. Image pickup units X2, X3, . . . , X16 having the same arrangement as that of the image pickup unit X1 attain a series of functions from a photoelectric conversion function of an object image by image pickup elements using the light-receiving portions A2 to A4, B1 to B4, C1 to C4, and D1 to D4 shown in FIGS. 54A to 54D to a storage function by image memories. More specifically, the image pickup units X2 to X16 respectively comprise image pickup elements 2002 to 2016, drivers 2202 to 2216, A/D converters 2302 to 2316, and image memories 2402 to 2416. The operation timings of the image pickup units X2 to X16 are also controlled by the clock generation circuit 205.

In the circuit shown in FIG. 61, 16 pieces of information of 16-split object image portions are respectively stored in the image memories 2401 to 2416. These pieces of information are read out by an image synthesizing circuit 5, and are synthesized in a pattern shown in FIG. 53. Thereafter, the synthesized information is output to an output terminal 6. The operation timing of the image synthesizing circuit 5 at this time is also controlled by the clock generation circuit 205.

The above-mentioned image memories 2401 to 2416 and the image synthesizing circuit 5 can be easily realized using known memories and their control techniques. Therefore, a detailed description thereof will be omitted.

In the above embodiment, when the light-receiving portions A, B, C, and D are arranged in the horizontal direction in units of four image pickup elements shown in FIG. 62, the number of effective pixels of the image pickup elements can be infinitely increased, and the resolution can be theoretically infinitely improved. For example, FIGS. 63A to 63D exemplify a case wherein the image pickup device is constituted by 64 image pickup elements, and FIG. 64 shows synthesized image information from these image pickup elements. In this case, as described above, when the light-receiving portions are set, as shown in FIGS. 65A to 65D, most area of each semiconductor chip portion becomes a blank region. Therefore, a peripheral circuit portion is formed by utilizing the blank portion of the semiconductor chip by the same method as in FIGS. 57 to 59, thereby improving the space factor of the semiconductor chip. In addition, the number of connection lines of the semiconductor chip can be decreased, and anti-noise characteristics can be improved.

In this manner, when an image formation optical path used in, e.g., an existing industrial-use multi-board camera is split into a plurality of paths by beam splitters, the equivalent number of pixels can be greatly increased, and an image having higher image quality can be obtained. Furthermore, since each image formation plane can be formed by a single image pickup element chip in which light-receiving elements each having a size equal to that of a consumer-use image pickup element, which is technically sufficiently established, are arranged at non-neighboring positions, a manufacturing apparatus (including photomasks) and manufacturing processes of the consumer-use image pickup element can be commonly used. In addition, an image pickup element having high performance in view of the relative positional precision of the light-receiving portions, flatness, and the like can be manufactured with a high yield. Since a single image pickup element chip (with a plurality of light-receiving portions) is arranged on each image formation plane, the image pickup element chip (light-receiving portions) can be aligned with considerably higher precision and stability than those in a case wherein the light-receiving portions are constituted by independent image pickup element chips.

Furthermore, since all the bonding pads are arranged at the side edges of the semiconductor chip, an arrangement having good machinability and reliability can be provided. In addition, when a peripheral circuit portion such as an input/output circuit is formed on a blank portion between the light-receiving portions on the semiconductor chip, the chip space can be efficiently utilized. In particular, a weak output signal can be prevented from being transmitted along a long wire, and anti-noise characteristics can be improved.

The operation frequency of the device of the present invention can be as low as that used in an existing home video camera, and a high frequency required in a "hi-vision" camera is not necessary. Thus, the device of the present invention can be easily realized by circuit members and techniques used in conventional devices.

As described above, according to the present invention, image pickup light from an object is split into a plurality of beams in equal light amounts, and object images are formed at different positions. A plurality of split light-receiving portions of image pickup element chips are arranged at non-neighboring split positions when an object image is split into a plurality of images on each image formation surface, and pieces of image information from the image pickup element chips are synthesized later. In addition, a peripheral circuit portion of the image pickup element is arranged between the plurality of split light-receiving portions. Therefore, the number of effective pixels can be increased using a normal image pickup element without using a high-integration image pickup element, and image quality can be improved. In addition, the space factor of the image pickup element chip can be improved, and anti-noise characteristics can also be improved.

Figure 66:
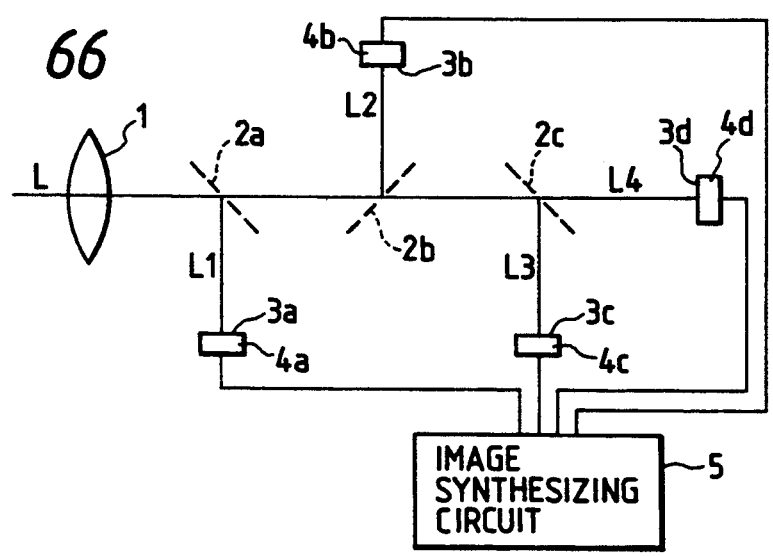
FIG. 66 is a diagram showing principal part according to the tenth embodiment of the present invention.
Figure 69A:
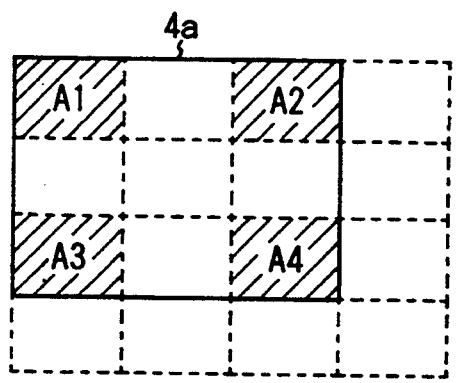
FIGS. 69A to 69D are explanatory views showing setting examples of light-receiving portions of an image pickup element chip shown in FIGS. 67A to 67D.
Figure 69B:
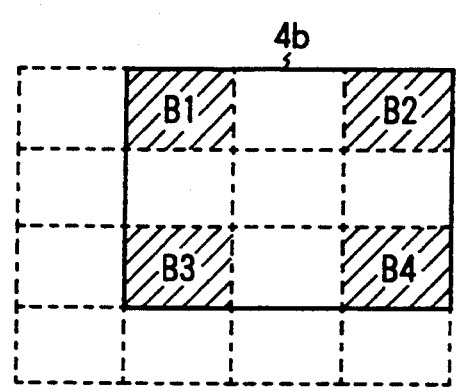
Figure 69C:
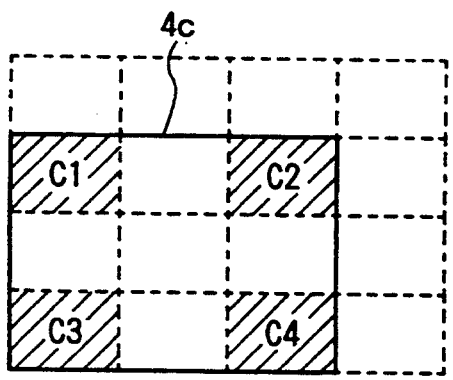
Figure 69D:
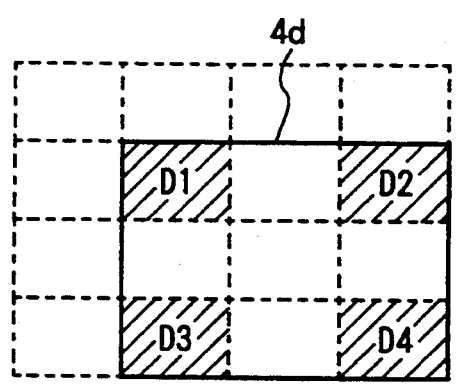

FIG. 66 is a diagram showing principal part of an image pickup device according to the tenth embodiment of the present invention. The image pickup device shown in FIG. 66 includes an imaging lens 1 through which image pickup light L from an object passes, and beam splitters 2a, 2b, and 2c serving as split means for splitting the image pickup light L into a plurality of beams L1, L2, L3, and L4 in equal light amounts, and forming object images at different positions. Each of these beam splitters 2a, 2b, and 2c comprises, e.g., a half mirror. The beam splitters 2a, 2b, and 2c respectively have reflectances of 25% ($\frac{1}{4}$), 33% ($\frac{1}{3}$), and 50% ($\frac{1}{2}$), and supply beams L1, L2, L3, and L4 having equal light amounts to image formation planes (focal planes) 3a, 3b, 3c, and 3d of the four object images, thus forming object images having the same size and the same brightness on the image formation planes 3a, 3b, 3c, and 3d. The image pickup device also includes image pickup element chips 4a, 4b, 4c, and 4d each having a plurality of light-receiving portions, which are split on a plane. These light-receiving portions are arranged at non-neighboring positions when an object image is split into a plurality of images on each of the image formation planes 3a, 3b, 3c, and 3d. The image pickup device further includes an image synthesizing circuit 5 for receiving image information from the image pickup element chips 4a, 4b, 4c, and 4d, and synthesizing the entire object image.

On each of the image formation planes 3a, 3b, 3c, and 3d, an object image is split into 16 (4×4 in the horizontal and vertical directions) portions, as shown in FIGS. 67A to 67D, and the plurality of light-receiving portions A1 to A4, B1 to B4, C1 to C4, or D1 to D4 of a corresponding one of the image pickup element chips 4a, 4b, 4c, and 4d are arranged at four non-neighboring split positions. More specifically, on the image formation plane 3a shown in FIG. 67A, the light-receiving portions A1, A2, A3, and A4 are respectively arranged at the first, third, ninth, and eleventh positions. On the image formation plane 3b shown in FIG. 67B, the light-receiving portions B1, B2, B3, and B4 are respectively arranged at the second, fourth, tenth, and twelfth positions. On the image formation plane 3c shown in FIG. 67C, the light-receiving portions C1, C2, C3, and C4 are respectively arranged at the fifth, seventh, thirteenth, and fifteenth positions. On the image formation plane 3d shown in FIG. 67D, the light-receiving portions D1, D2, D3, and D4 are respectively arranged at the sixth, eighth, fourteenth, and sixteenth positions.

Image information of an object, which is separately picked up by the 16 light-receiving portions A1 to A4, B1 to B4, C1 to C4, and D1 to D4 in the above-mentioned arrangement states of the image pickup element chips 4a, 4b, 4c, and 4d on the image formation planes 3a, 3b, 3c, and 3d, is synthesized by the image synthesizing circuit 5, as described above. FIG. 68 shows the state of the synthesized image information, and illustrates contributions of the respective light-receiving portions (A, B, C, and D) to the object image. In this embodiment, the number of effective pixels on the image formation planes 3a, 3b, 3c, and 3d is 16 times that of a single image pickup element, and a resolution equivalent to that obtained when an image pickup element having the number of pixels 16 times that of a conventional image pickup element, can be obtained, thus obtaining an image with high image quality.

Upon realization of the arrangements shown in FIGS. 67A to 67D, when the packages of the image pickup elements are sufficiently small, the 16 light-receiving portions A1 to A4, B1 to B4, C1 to C4, and D1 to D4 can be constituted by independent image pickup elements. However, when the size of the package of the image pickup element is too large, if the independent image pickup elements are used, they interfere with each other. Thus, in this embodiment, the image pickup element chip 4a whose light-receiving portion has a size corresponding to nine out of 16 split portions is arranged on the image formation plane 3a, as indicated by a solid line in FIG. 69A, and the light-receiving portions A1 to A4 are set on the four hatched portions of the these split portions. The image pickup element chip 4b whose light-receiving portion has a size corresponding to nine out of 16 split portions is arranged on the image formation plane 3b, as indicated by a solid line in FIG. 69B, and the light-receiving portions B1 to B4 are set on the four hatched portions of the these split portions. Similarly, the image pickup element chip 4c whose light-receiving portion has a size corresponding to nine out of 16 split portions is arranged on the image formation plane 3c, as indicated by a solid line in FIG. 69C, and the light-receiving portions C1 to C4 are set on the four hatched portions of the these split portions. The image pickup element chip 4d whose light-receiving portion has a size corresponding to nine out of 16 split portions is arranged on the image formation plane 3d, as indicated by a solid line in FIG. 69D, and the light-receiving portions D1 to D4 are set on the four hatched portions of the these split portions.

In this case, the size of each of the light-receiving portions A1 to A4, B1 to B4, C1 to C4, and D1 to D4 is set to be equal to the image size (e.g., a $\frac{1}{2}$" correspondence size) of a currently popular image pickup element. In this manner, the manufacturing equipment (including photomasks and the like) of the currently popular image pickup element can be used without modifications, and the image pickup element chips 4a to 4d shown in FIGS. 69A to 69D can be manufactured with a high yield (since the manufacturing processes and the like are stable).

Furthermore, since the alignment precision in a manufacturing apparatus of the image pickup element chip is very high, the relative positions of the light-receiving positions of the light-receiving portions A1 to A4, B1 to B4, C1 to C4, and D1 to D4 can be set with very high precision. Therefore, as an alignment operation of the light-receiving portions (including a falling direction), the alignment operations among the light-receiving portions A1 to A4, B1 to B4, C1 to C4, and D1 to D4 need not be performed, and the positions of the image pickup element chips 4a to 4d need only be adjusted. This is very preferable in terms of stability of light-receiving positional precision including an environmental change and a change over time.

Figure 70:
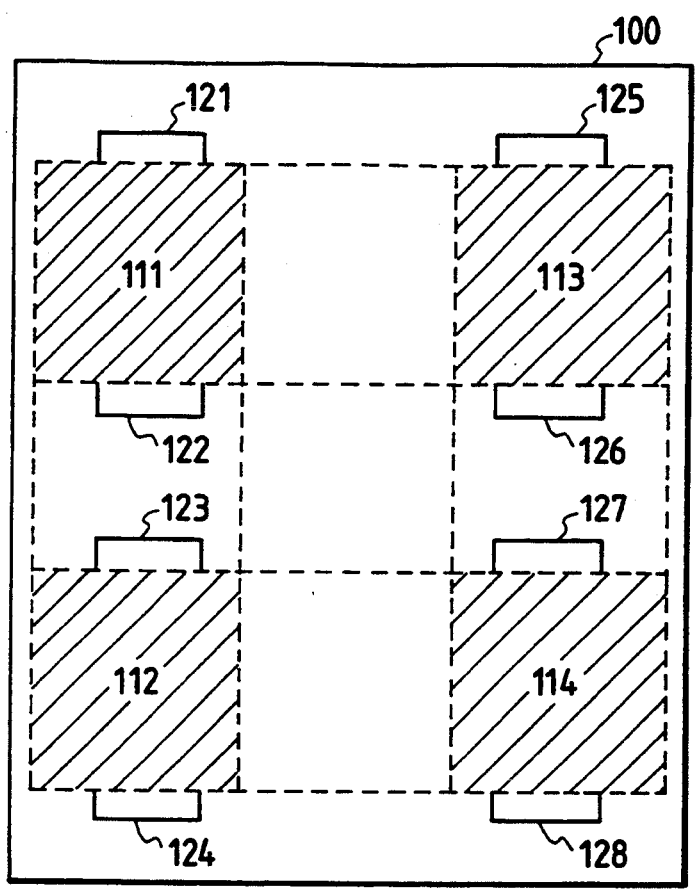
FIG. 70 is a diagram showing a detailed arrangement of the image pickup element chip shown in FIGS. 69A to 69D.

In this embodiment, when each of the image pickup element chips 4a to 4d shown in FIGS. 69A to 69D is constituted on the basis of the image pickup element shown in FIG. 55, the arrangement state of the light-receiving portions of each image pickup element chip is as shown in FIG. 70. More specifically, in FIG. 70, a semiconductor chip 100 corresponds to each of the image pickup element chips 4a to 4d shown in FIGS. 69A to 69D, and light-receiving portions 111 to 114 correspond to those of the image pickup element chips 4a to 4d. As can be seen from FIG. 55, bonding pads of these light-receiving portions 111 to 114 are located at positions of spaces 121 to 128 shown in FIG. 70.

The bonding pad spaces 122, 123, 126, and 127 of the light-receiving portions 111 to 114 are located not near the side edges of the semiconductor chip 100 but at inner deep positions. Therefore, when bonding wires are connected from these positions to a lead frame of an IC package, the bonding wires become very long, resulting in poor machinability and reliability.

Figure 71:
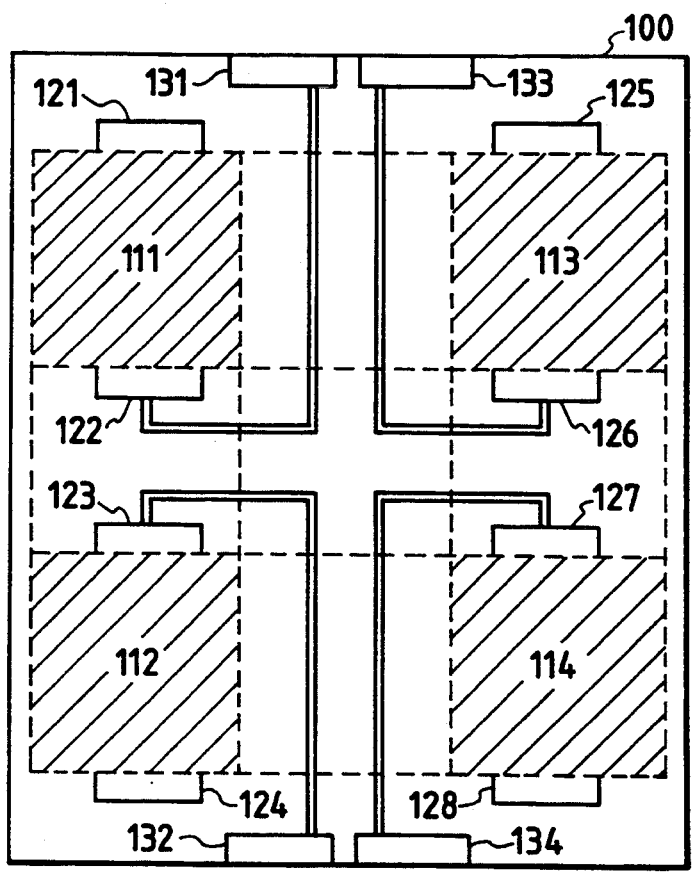
FIG. 71 is a diagram showing an arrangement wherein light-receiving portions of the semiconductor chip shown in FIG. 70 are connected through wiring lines.

Thus, in this embodiment, in order to eliminate this drawback, a wiring pattern to be connected to bonding pads arranged at the side edges of the semiconductor chip 100 is formed between the split light-receiving portions, as shown in FIG. 71. FIG. 71 is substantially the same as FIG. 70, and the same reference numerals in FIG. 71 denote the same parts as in FIG. 70. Therefore, only a difference from FIG. 70 will be described below. Most portion of the semiconductor chip 100 has no circuit elements excluding the light-receiving portions 111 to 114, and is in a blank state. Thus, as indicated by double lines in FIG. 71, when a wiring pattern for respectively connecting the space 122 and a bonding pad 131, the space 123 and a bonding pad 132, the space 126 and a bonding pad 133, and the space 127 and a bonding pad 134 is formed by utilizing the blank portion between the light-receiving portions, all the bonding pads including the bonding pads 131 to 134 can be located at the side edge portions of the semiconductor chip 100. For this reason, the bonding pads at these positions and the lead frame of the IC package can be connected through the shortest bonding wires. Therefore, easy bonding is allowed, and anti-noise characteristics can be improved, thus improving machinability and reliability.

Figure 72:
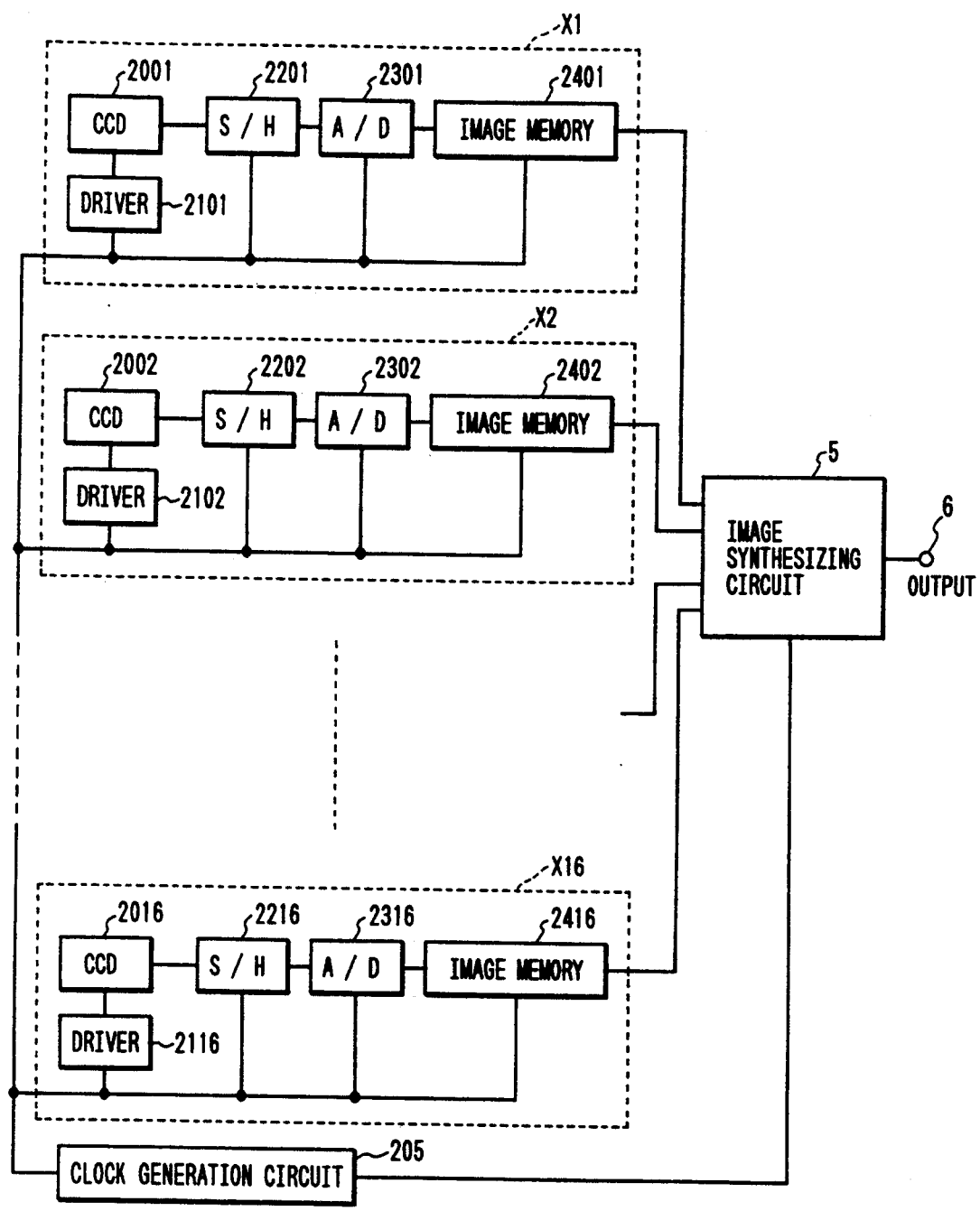
FIG. 72 is a block diagram showing a circuit arrangement of an image pickup device having the arrangement shown in FIG. 66.
Figure 76A:
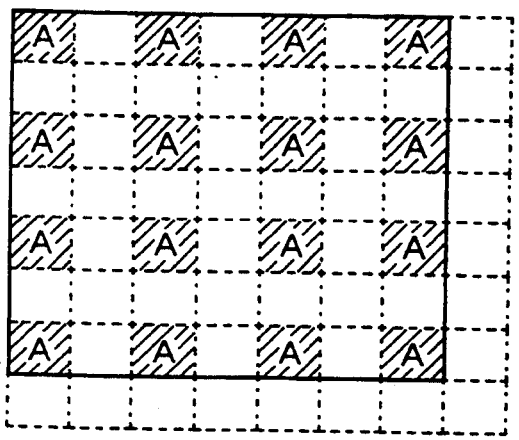
FIGS. 76A to 76D are explanatory views showing setting examples of light-receiving portions of the image pickup element chip shown in FIG. 74.
Figure 76B:
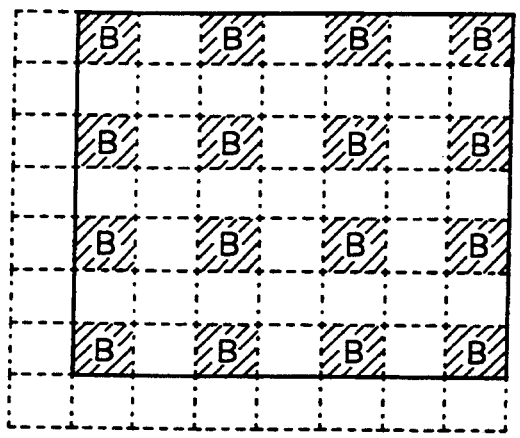
Figure 76C:
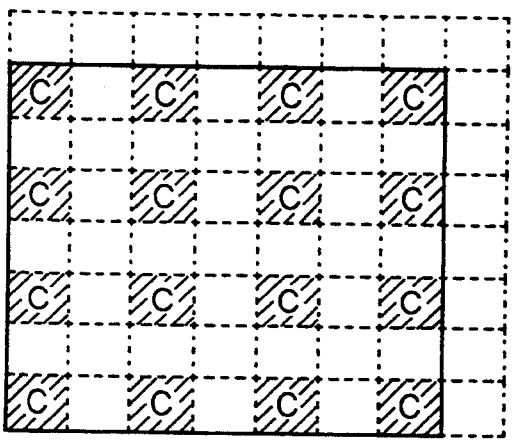
Figure 76D:
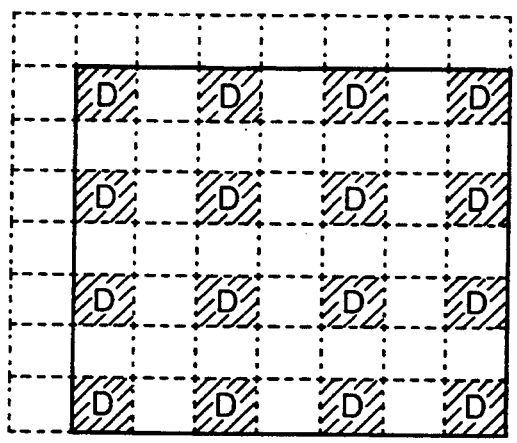

FIG. 72 is a block diagram showing a circuit arrangement of the image pickup device having the arrangement shown in FIG. 66. In FIG. 72, the image pickup device includes an image pickup element (e.g., a CCD) 2001 for photoelectrically converting an optical image of an object. The image pickup element 2001 corresponds to the light-receiving portion A1 in FIG. 69A in practice. The image pickup device also includes a driver 2101 for driving the image pickup element 2001, an S/H circuit 2201 for sampling/holding an output from the image pickup element 2001, an A/D converter 2301 for converting an analog output signal from the image pickup element 2001, which is sampled and held by the S/H circuit 2201, into a digital signal, and an image memory 2401 for storing digital object image information converted by the A/D converter 2301 from the image pickup element 2001. The operation timings of the driver 2101 to the image memory 2401 are controlled by a timing signal from a clock generation circuit 205 as the above-mentioned timing signal generator.

A portion consisting of the image pickup element 2001 to the image memory 2401 and surrounded by a broken line constitutes an image pickup unit X1. Image pickup units X2, X3, . . . , X16 having the same arrangement as that of the image pickup unit X1 attain a series of functions from a photoelectric conversion function of an object image by image pickup elements using the light-receiving portions A2 to A4, B1 to B4, C1 to C4, and D1 to D4 shown in FIGS. 69A to 69D to a storage function by image memories. More specifically, the image pickup units X2 to X16 respectively comprise image pickup elements 2002 to 2016, drivers 2202 to 2216, A/D converters 2302 to 2316, and image memories 2402 to 2416. The operation timings of the image pickup units X2 to X16 are also controlled by the clock generation circuit 205.

In the circuit shown in FIG. 72, 16 pieces of information of 16-split object image portions are respectively stored in the image memories 2401 to 2416. These pieces of information are read out by the image synthesizing circuit 5, and are synthesized in a pattern shown in FIG. 69. Thereafter, the synthesized information is output to an output terminal 6. The operation timing of the image synthesizing circuit 5 at this time is also controlled by the clock generation circuit 205.

The above-mentioned image memories 2401 to 2416 and the image synthesizing circuit 5 can be easily realized using known memories and their control techniques. Therefore, a detailed description thereof will be omitted.

In the above embodiment, when the light-receiving portions A, B, C, and D are arranged in the horizontal direction in units of four image pickup elements shown in FIG. 73, the number of effective pixels of the image pickup elements can be infinitely increased, and the resolution can be theoretically infinitely improved. For example, FIGS. 74A to 74D exemplify a case wherein the image pickup device is constituted by 64 image pickup elements, and FIG. 75 shows synthesized image information from these image pickup elements. In this example, most of wires led from the light-receiving portions of hatched portions in FIGS. 76A to 76D are not present at the side edges of the semiconductor chip. In contrast to this, when a wiring pattern is formed by utilizing the blank portion of the semiconductor chip by the same method as in FIG. 70, bonding pads can be arranged at the side edges of the semiconductor chip, as can be apparent from the above description.

In this manner, when an image formation optical path used in, e.g., an existing industrial-use multi-board camera is split into a plurality of paths by a beam splitter, the equivalent number of pixels can be greatly increased, and an image having higher image quality can be obtained. For example, when an image pickup element having four hundred thousand pixels and used in an existing home video camera is adopted in the present invention, the number of pixels can reach 1.6 millions in the embodiment shown in FIG. 66, and can reach 6.4 millions in this embodiment. When the image size is further increased, the number of effective pixels can be infinitely increased.

Furthermore, since each image formation plane can be formed by a single image pickup element chip in which light-receiving elements each having a size equal to that of a consumer-use image pickup element, which is technically sufficiently established, are arranged at non-neighboring positions, a manufacturing apparatus (including photomasks) and manufacturing processes of the consumer-use image pickup element can be commonly used. In addition, an image pickup element having high performance in view of the relative positional precision of the light-receiving portions, flatness, and the like can be manufactured with a high yield. Since a single image pickup element chip (with a plurality of light-receiving portions) is arranged on each image formation plane, the image pickup element chip (light-receiving portions) can be aligned with remarkably higher precision and stability than those in a case wherein the light-receiving portions are constituted by independent image pickup element chips.

Furthermore, since all the bonding pads are located at the side edges of the semiconductor chip, good machinability and reliability can be provided.

The operation frequency of the device of the present invention can be as low as that used in an existing home video camera, and a high frequency required in a "hi-vision" camera is not necessary. Thus, the device of the present invention can be easily realized by circuit members and techniques used in conventional devices.

As described above, according to this embodiment, image pickup light from an object is split into a plurality of beams in equal light amounts, and object images are formed at different positions. A plurality of split light-receiving portions of image pickup element chips are arranged at non-neighboring split positions when an object image is split into a plurality of images on each image formation surface, and pieces of image information from the image pickup element chips are synthesized later. In addition, a wiring pattern connected to connection portions arranged at the side edges of the image pickup element chip is formed between the plurality of split light-receiving portions. Therefore, the number of effective pixels can be increased using a normal image pickup element without using a high-integration image pickup element, and image quality can be improved. In addition, the space factor of the image pickup element chip can be improved, and anti-noise characteristics can also be improved. Moreover, easy bonding is allowed, thus improving machinability and reliability.

In each of the above-mentioned embodiments, light is incident on a portion between the light-receiving portions. In this state, image light reflected by such a portion becomes stray light, thus causing an adverse influence such as flare. More specifically, since some light components of an object image are radiated on portions B1 and B2 in FIG. 77A and on portions A1 and A2 in FIG. 77B, these portions may undesirably become very bright. Light reflected by these portions becomes stray light, and when some stray light components reach the light-receiving portions, they cause flare, thus deteriorating quality of the picked-up image.

Thus, this embodiment comprises split means for splitting an optical path of an object image obtained by an image pickup optical system into a plurality optical paths, a plurality of image pickup elements, arranged at non-neighboring positions on image formation planes of the plurality of optical paths split by the split means, for picking up corresponding portions of the object image, synthesizing means synthesizing image pickup information of the entire object image on the basis of information from the plurality of image pickup elements, and non-reflection members arranged on portions, where the image pickup elements are not arranged, of the image formation planes. Thus, even when light is radiated on the portions, where the image pickup elements are not arranged, of the image formation planes, since the light is not reflected, stray light can be prevented, and a high-resolution picked-up image with high quality can be obtained.

The content of the eleventh embodiment will be described in detail below with reference to the accompanying drawings.

Figure 77A:
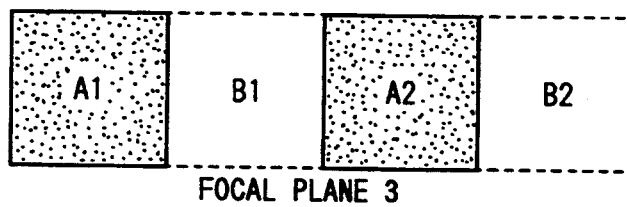
FIGS. 77A to 77C are explanatory views of image formation planes of an optical system.
Figure 77B:
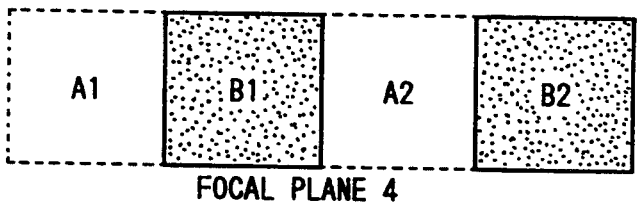
Figure 77C:
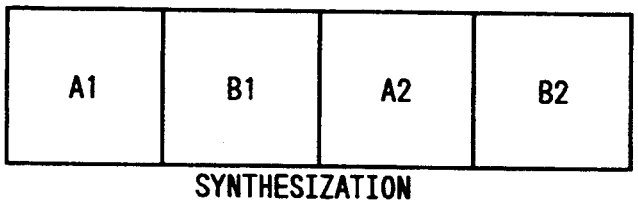
Figure 78A:
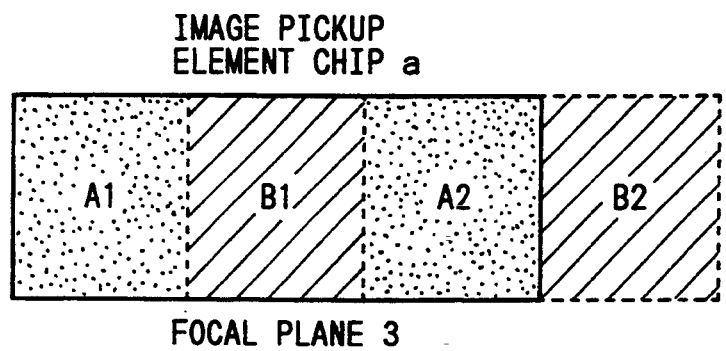
FIGS. 78A and 78B are explanatory views of image formation planes of an optical system according to the eleventh embodiment of the present invention.
Figure 78B:
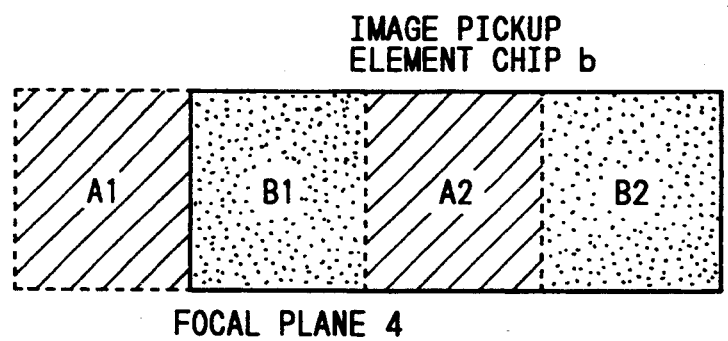

The same optical system as in the previous embodiment (e.g., an optical system shown in FIG. 1) is used, and as focal planes 3 and 4, image pickup elements shown in FIGS. 78A and 78B are used. More specifically, FIGS. 78A and 78B show states of the focal planes (or image formation planes) 3 and 4 on which images split by a beam splitter 2 are formed. A and B respectively correspond to the focal planes 3 and 4. On each focal plane, an object image is split into four portions. On the focal plane 3, light-receiving portions A1 and A2 of an image pickup element are arranged at the non-neighboring first and third positions. On the focal plane 3, light-receiving portions B1 and B2 of an image pickup element are arranged at the non-neighboring second and fourth positions. In this state, pieces of object image information separately picked up by the four light-receiving portions A1, A2, B1, and B2 are synthesized to a single image later. In this manner, a complete original image can be restored in a contribution pattern of the image pickup elements to an object image, as shown in FIG. 77C.

An anti-reflection film is coated or adhered on hatched portions B1 and B2 in FIG. 78A and hatched portions A1 and A2 in FIG. 78B. In this manner, even when object image light is radiated on the hatched portions, light reflected from these portions can be greatly suppressed, and quality deterioration of the picked-up image caused by reflected light can be prevented. In this embodiment, light is absorbed by the anti-reflection film. However, the above-mentioned hatched portions may be constituted by transparent members to transmit light therethrough, as a matter of course.

Figure 79:
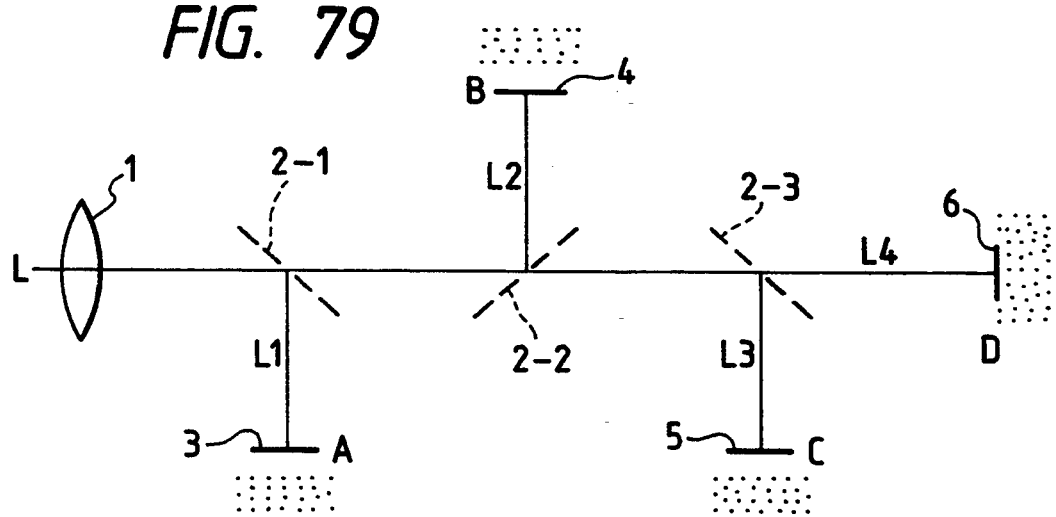
FIG. 79 is a diagram showing an arrangement of an optical system according to the twelfth embodiment of the present invention.

FIG. 79 shows the twelfth embodiment of the present invention. In this embodiment, the number of split optical paths is doubled, i.e., four as compared to the eleventh embodiment.

In FIG. 79, an image pickup device includes a lens 1, and beam splitters 2-1, 2-2, and 2-3 respectively having reflectances of about 25% ($\frac{1}{4}$), 33% ($\frac{1}{3}$), and 50% ($\frac{1}{2}$). These beam splitters 2-1, 2-2, and 2-3 split incident light L into beams L1, L2, L3, and L4 having equal light amounts, and form images at positions of focal planes 3, 4, 5, and 6. In this embodiment, each focal plane (image formation plane) is split into 16 (=4×4) portions, and four light-receiving portions are respectively arranged at four non-neighboring positions on each focal plane, as shown in FIGS. 80A to 80D:

Focal plane 3:
    position 1—light-receiving portion A1
    position 3—light-receiving portion A2
    position 9—light-receiving portion A3
    position 11—light-receiving portion A4
    (FIG. 80A)
Focal plane 4:
    position 2—light-receiving portion B1 position 4—light-receiving portion B2
position 10—light-receiving portion B3
position 12—light-receiving portion B4
(FIG. 80B)
Focal plane 5:
position 5—light-receiving portion C1
position 7—light-receiving portion C2
position 13—light-receiving portion C3
position 15—light-receiving portion C4
(FIG. 80C)
Focal plane 6:
position 6—light-receiving portion D1
position 8—light-receiving portion D2
position 14—light-receiving portion D3
position 16—light-receiving portion D4
(FIG. 80D)

In this state, object image information separately picked up by the 16 light-receiving portions A1 to A4, B1 to B4, C1 to C4, and D1 to D4 are synthesized to one image later. In this manner, a complete original image can be restored in a contribution pattern of the image pickup elements to an object image, as shown in FIG. 80E. In this case, the number of effective pixels on the focal planes can be 16 times that of a single image pickup element, and the resolution can be increased accordingly.

Like in the eleventh embodiment, since object images are formed on portions indicated by N in FIGS. 80A to 80D, an anti-reflection film is coated or adhered on these portions N. In this manner, light reflected by these portions N can be greatly reduced, and quality deterioration of the picked-up image caused by reflected light can be prevented.

Figure 81:
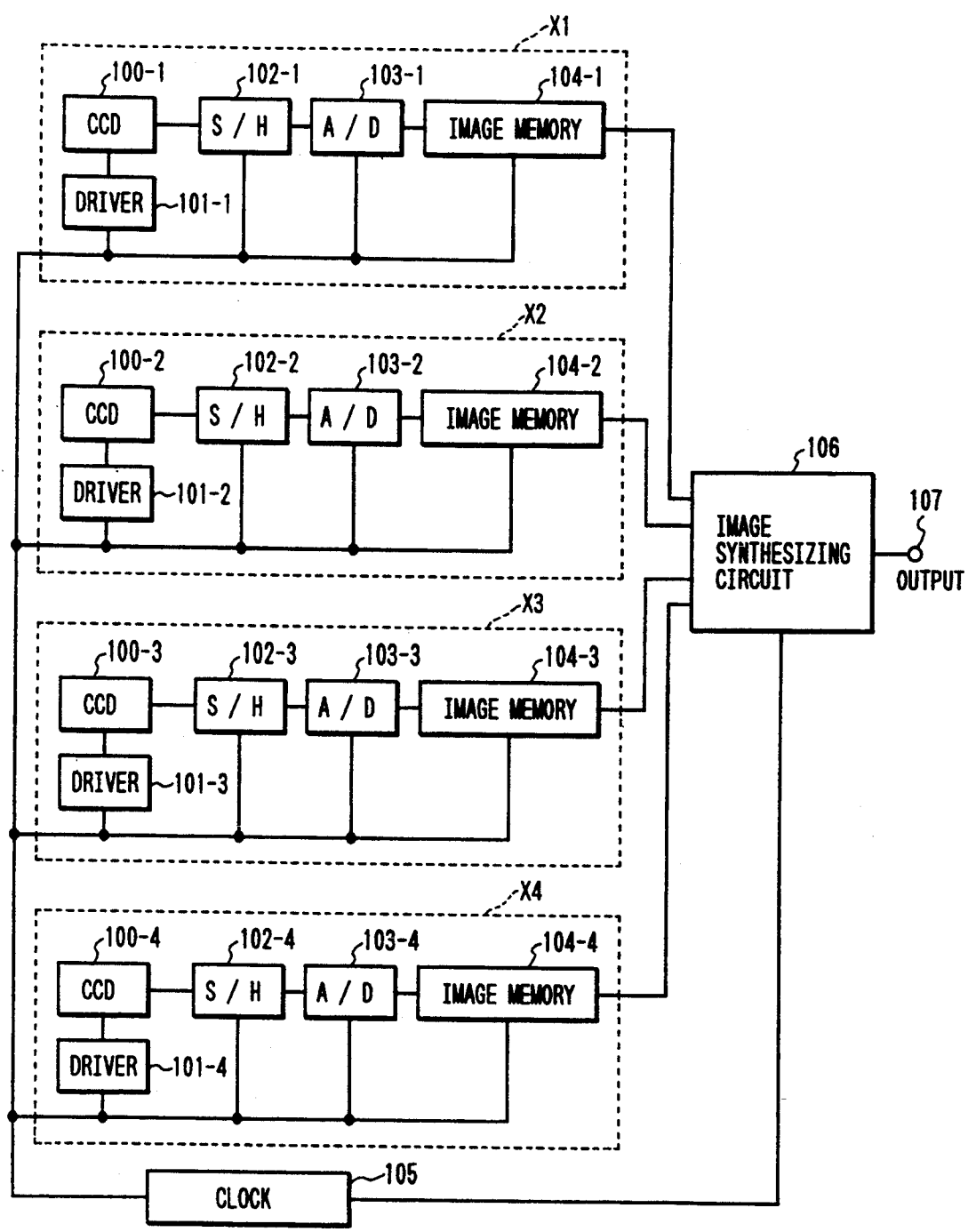
FIG. 81 is a diagram showing an electrical circuit of the eleventh embodiment of the present invention.

FIG. 81 is a block diagram showing an electrical circuit of the eleventh embodiment of the present invention. In FIG. 81, the image pickup device includes an image pickup element (e.g., A1 in FIG. 78A) 100-1 such as a CCD for photoelectrically converting an optical image of an object, a driver 101-1 for driving the image pickup element 100-1, a sample/hold (S/H) circuit 102-1 for sampling and holding an output from the image pickup element 100-1, an A/D converter 103-1 for converting an analog output signal from the image pickup element 100-1, which is sampled and held by the S/H circuit 102-1, into a digital signal, and an image memory 104-1 for storing digital object image information from the image pickup element 100-1 converted by the A/D converter 103-1. The operation timings of the driver 101-1 to the image memory 104-1 are controlled by a clock circuit 105 for generating a timing signal.

A portion consisting of the image pickup element 100-1 to the image memory 104-1 and surrounded by a broken line constitutes an image pickup unit X1. Image pickup units X2, X3, and X4 having the same arrangement as the image pickup unit X1 attain a series of functions from a photoelectric conversion function of object images corresponding to B1 (FIG. 78B), A2 (FIG. 78A), and B2 (FIG. 78B) by image pickup elements to a storage function by image memories. The operation timings of the image pickup units X2, X3, and X4 are also controlled by the clock circuit 105. In this manner, four-split object image portions are respectively stored in the image memories 104-1 to 104-4. An image synthesizing circuit 106 reads out and synthesizes these pieces of information in a pattern shown in FIG. 77C, and outputs the synthesized information to an output terminal 107. The operation timing of the image synthesizing circuit 106 is also controlled by the clock circuit 105.

Since the image memories 104-1 to 104-4 and the image synthesizing circuit 106 can be easily realized by using a known memory technique and its control technique, a detailed description thereof will be omitted. The electrical circuit of the twelfth embodiment can be realized by using 16 image pickup units and by synthesizing their outputs, and a detailed description thereof will be omitted.

Figure 82:
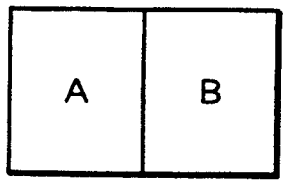
FIG. 82 is an explanatory view of a basic unit of an optical system as an extended example of the eleventh embodiment.
Figure 83A:
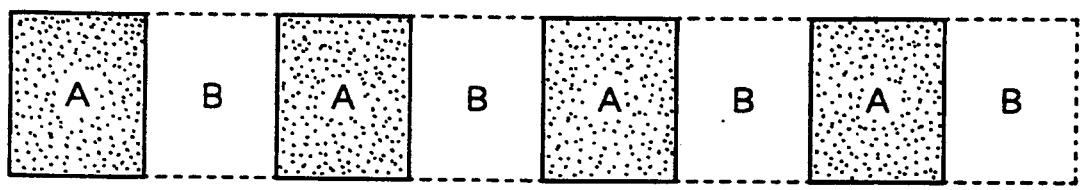
FIGS. 83A to 83C are explanatory views of image formation planes of the optical system of the extended example shown in FIG. 82.
Figure 83B:
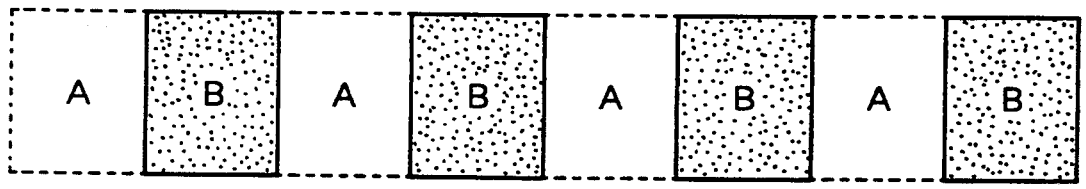
Figure 83C:
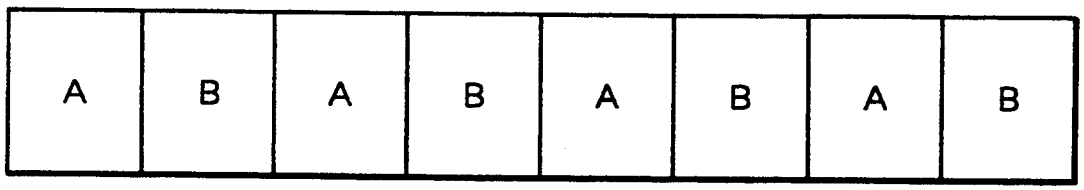
Figure 84:
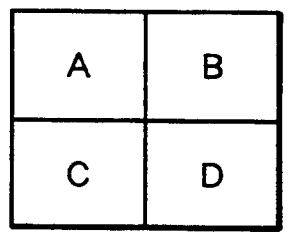
FIG. 84 is an explanatory view of a basic unit of an optical system as an extended example of the twelfth embodiment.
Figures 85A, 85B, 85C, 85D, 85E:
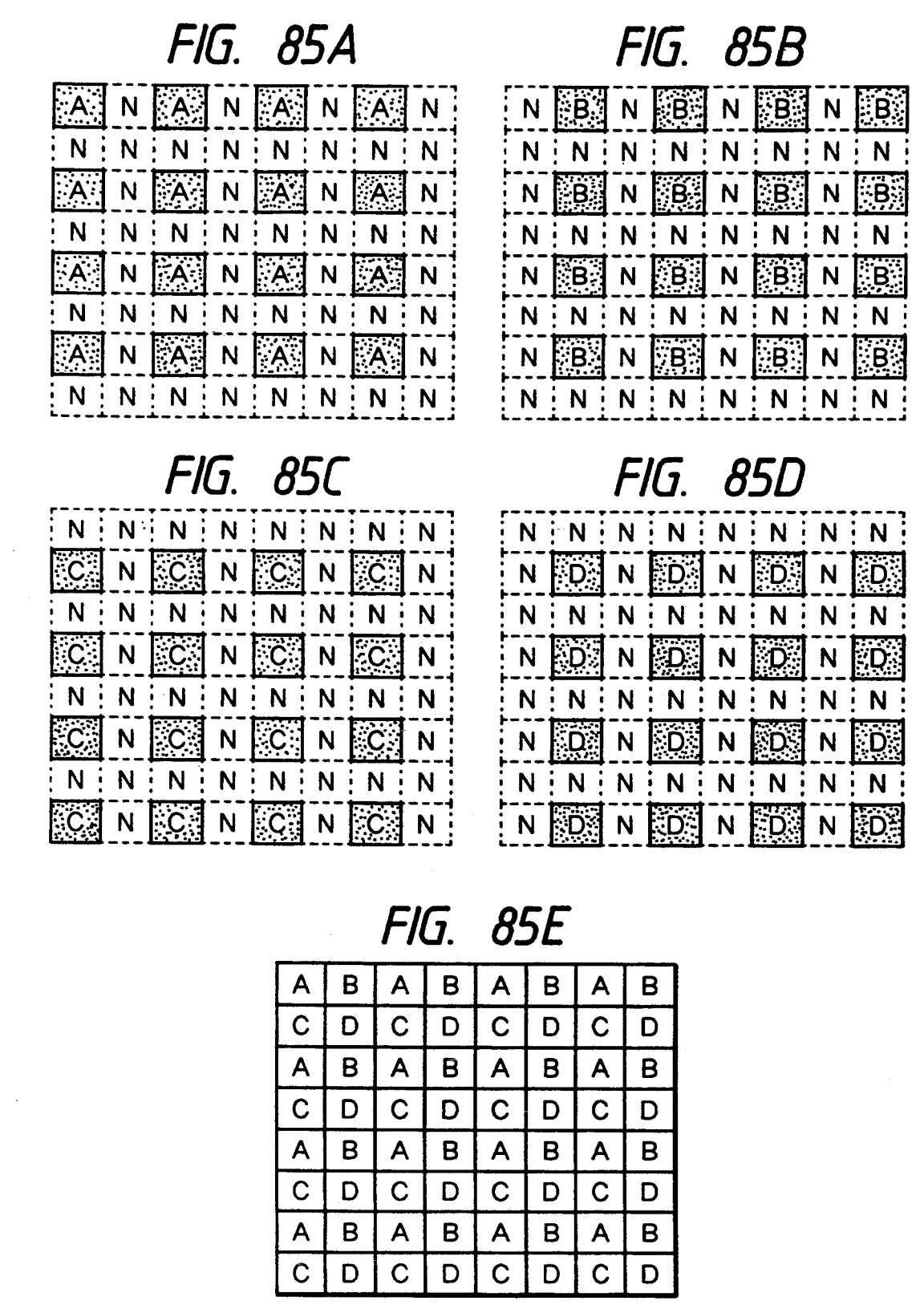

In the eleventh embodiment, when light-receiving portions are repetitively arranged in units shown in FIG. 82, the resolution can be theoretically infinitely improved in one direction. FIGS. 83A to 83C exemplify a case wherein eight light-receiving portions are used. In this case, an anti-reflection film is coated or adhered to portions B in FIG. 83A and portions A in FIG. 83B, thus obtaining the same effect as described above. In the twelfth embodiment, when light-receiving portions are repetitively arranged in units shown in FIG. 84, the resolution can be theoretically infinitely improved in both the vertical and horizontal directions. FIGS. 85A to 85E exemplify a case wherein 64 light-receiving portions are used. In this case, an anti-reflection film is coated or adhered to portions N (which are not used for the light-receiving portions) in FIGS. 85A to 85D, thereby obtaining the same effect as described above.

As can be seen from the above description, according to the above embodiments, the number of effective pixels of the image pickup elements can be greatly increased, and quality of the obtained image can be improved accordingly. Furthermore, deterioration of image quality caused by reflection of light by portions which are not used as light-receiving portions in the image pickup elements can be prevented.

Figure 86:
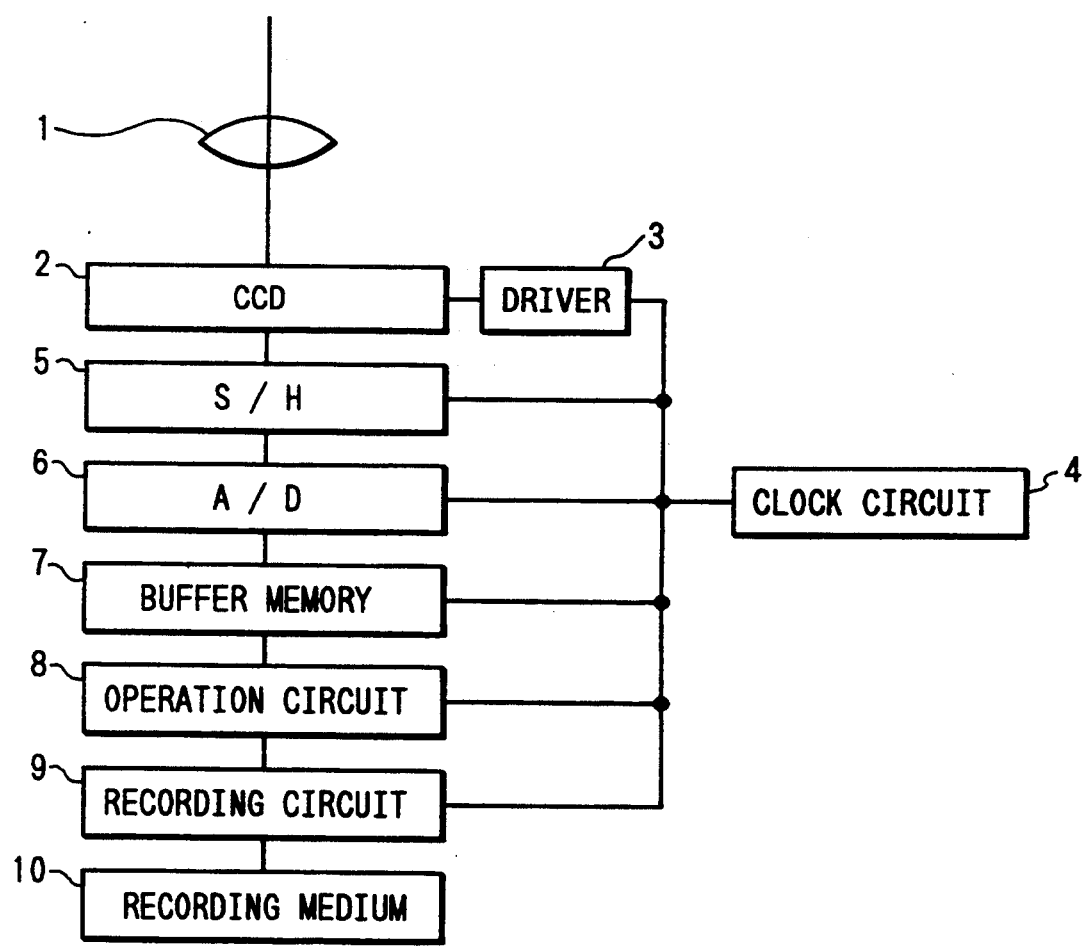
FIG. 86 is a block diagram showing a circuit arrangement according to the thirteenth embodiment of the present invention.

FIG. 86 is a block diagram showing a circuit arrangement of an image pickup device according to the thirteenth embodiment of the present invention. In FIG. 86, the image pickup device comprises a lens 1 constituting an optical system for forming an object image, and an image pickup element (e.g., a CCD, a MOS, an image pickup tube, or the like) 2, on which an object image is formed, and which photoelectrically converts image pickup light from an object, and outputs image signals in units of pixels. The image pickup device also comprises a driver 3 for driving the image pickup element 2 at a timing controlled by a signal from a clock circuit 4, an S/H circuit 5 for sampling and holding image signals output from the image pickup element 2, an A/D converter 6 for converting sampled/held analog image signals into digital signals, a buffer memory 7 for storing the digital image signals and operation data (to be described later), and an operation circuit 8 for, when the output level of an image signal from the image pickup element 2 is equal to or lower than a predetermined value, determining a signal obtained by adding and averaging the image signals of neighboring pixels under the same condition as image signals of these pixels. The operation circuit 8 receives image signals from the buffer memory 7, and the above-mentioned operation data. The image pickup device further comprises a recording circuit 9 for recording the image signals output from the operation circuit 8 on a recording medium 10. The operation timings of the above-mentioned circuits are controlled by a signal from the clock circuit 4 like in the driver 3.

In the image pickup device with the above arrangement, the image pickup element 2 outputs image signals in units of pixels. When the output level of an image signal is equal to or lower than a predetermined value, the operation circuit 8 adds and averages image signals of neighboring pixels under the same condition, and outputs the average signal as image signals of these pixels. Therefore, sufficient resolving power can be assured for a bright portion of an object, and sufficient image signals can be obtained even for a dark portion of the object, thus obtaining high image quality.

In this case, the number of neighboring pixels whose image signals are added is changed according to the output level of an image signal. The priority order is assigned to the neighboring pixels according to spatial relative positions, and a high priority is given for a pixel which has a small influence on resolving power.

Figure 87:
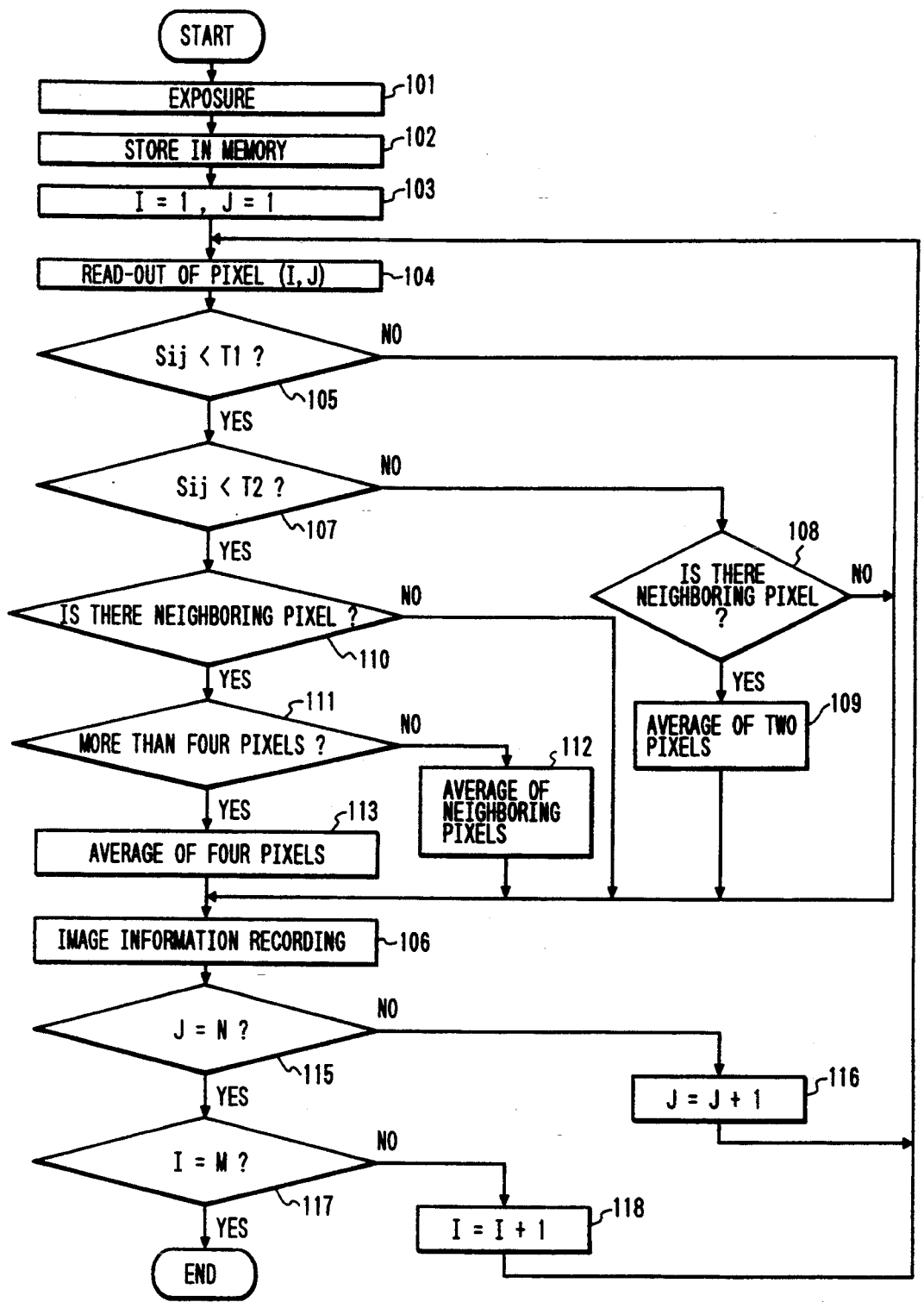
FIG. 87 is a flow chart showing an operation of the circuit shown in FIG. 86.

The details of the above-mentioned operation will be described below with reference to the flow chart shown in FIG. 87.

When a photographing operation is started, an object image is formed on the light-receiving portion of the image pickup element 2 through the lens 1, and is exposed for a predetermined period of time (step 101). Thereafter, the image pickup element 2 is driven by the driver 3 to output image signals for one frame. The image signals for one frame are stored in the buffer memory 7 through the S/H circuit 5 and the A/D converter 6 (step 102).

Assuming that the numbers of pixels in the vertical and horizontal directions of the image pickup element 2 are respectively M and N, the object image information stored in the buffer memory 7 is sequentially read out in units of pixels in I rows×J columns (I=1, 2, ..., M, J=1, 2, ..., N), and after the readout pixels are subjected to operation processing, the processed pixels are recorded on the recording medium 10. When image information is to be read out, the coordinates (I, J) of the read address are initialized to (1, 1) (step 103), and thereafter, signals Sij of I rows×J columns pixels stored in the buffer memory 7 are read out (step 104).

The operation circuit 8 then checks if the readout signal Sij is smaller than a first threshold value T1 input from the buffer memory 7 (step 105). At this time, if the signal Sij is equal to or larger than the threshold value T1, the object luminance of a pixel corresponding to the signal Sij is sufficiently high, and a sufficient signal can be obtained as an output for one pixel of the image pickup element 2. Thus, the operation circuit 8 causes the recording circuit 9 to record image information of the pixel (I, J) of the image pickup element 2 at a predetermined position on the recording medium 10 (step 106).

However, if the readout signal Sij is smaller than the threshold value T1, the object luminance corresponding to this pixel is low, and a sufficient signal cannot be obtained as an output for one pixel of the image pickup element 2 in terms of signal processing. In this case, it is checked if the signal Sij is smaller than a second threshold value T2 lower than the first threshold value T1 (step 107). At this time, if the signal Sij is equal to or larger than the threshold value T2, it is determined that a signal having a sufficient level for signal processing can be obtained by adding signals of two pixels under the same condition although the signal for one pixel is insufficient for processing. Thus, it is searched if there is a neighboring pixel under the same condition (step 108). In this case, for example, eight neighboring pixels (I+1, J−1), (I+1, J), (I+1, J+1), (I, J+1), (I−1, J+1), (I−1, J), (I−1, J−1), and (I, J−1) are searched, and it is checked if their signals Sij satisfy a condition T2<Sij<T1. If there are no neighboring pixels satisfying the above condition, image information of the pixel (I, J) is recorded in step 106 in the same manner as described above. However, if neighboring pixels satisfying the above condition are detected, a signal obtained by averaging a signal of the pixel of interest and a signal of one of the detected pixels is output as image signals of these pixels (step 109), and the flow then advances to step 106.

If a plurality of neighboring pixels under the same condition are detected in step 108, a pixel is selected in the order of a smaller influence on resolving power. For example, when this image pickup element 2 has a larger number of pixels in the vertical direction than that in the horizontal direction according to its aspect ratio, since the resolving power in the horizontal direction tends to be short, a neighboring pixel is selected in the order of ① oblique direction, ② vertical direction, and ③ horizontal direction.

If it is determined in step 107 that the readout signal Sij is smaller than the second threshold value T2, it is determined that the object luminance corresponding to this pixel is still lower, a signal obtained by adding signals for two pixels is insufficient, and signals for four pixels must be added. Thus, it is checked if there are neighboring pixels under the same condition (step 110). In this case, eight neighboring pixels are searched in the same manner as described above. When four or more neighboring pixels under the same condition are found, the searching operation is stopped. However, when only three or less pixels are found, the searching operation of another eight neighboring pixels using a neighboring pixel under the same condition as a central pixel is repeated. However, if no pixel satisfying the same condition is found, the flow advances to step 106.

If neighboring pixels under the same condition are detected in step 110, it is checked if there are four or more pixels (step 111). If there are three or less pixels, a signal obtained by adding and averaging these pixels is output (step 112), and the flow advances to step 106. If there are four or more pixels under the same condition, an average of four signals of these pixels is output as an image signal (step 113), and the flow advances to step 106.

In this manner, when image information of the pixel (I, J) is recorded on the recording medium 10 in step 106, it is checked to prepare for the processing of the next pixel if the value of the column J has reached the last value N (J=N) (step 115). At this time, if NO in step 115, the value of the column J is incremented by one (step 116), and the operations in step 104 and subsequent steps are repeated. However, if YES in step 115 (J=N), it is checked if the value of the row I is the last value M (I=M) (step 117). If NO in step 117, the value of the row I is incremented by one (step 118), and the operations in step 104 and subsequent steps are repeated. However, if YES in step 117 (I=M), the operation processing for all the pixels of the image pickup element 2 is completed, and the photographing operation is ended.

When an object is photographed by the image pickup element which has an increased number of pixels, as described above, a portion, details of which must be clearly seen, in a scene is a relatively bright portion of an object, and a dark portion of the object need only provide rough information even though its details may not be clear.

In this case, since a sufficient light amount per pixel is incident in a bright portion of a scene, a sufficiently high photoelectric conversion output can be obtained even when only one pixel is read out. However, since a sufficient light amount per pixel is not incident in a dark portion of the scene, a sufficiently high photoelectric conversion output cannot be obtained when only one pixel is read out. However, a sufficiently high output can be obtained by adding photoelectric conversion outputs for a plurality of pixels. As has been described above, information of details is not always necessary for a dark portion, and color information can be rougher than the information of details for such a portion. Therefore, information lost by adding photoelectric conversion outputs for a plurality of pixels can rarely influence the overall object image in terms of visual sense characteristics of a person.

This applies to an image pickup device using a currently available image pickup element, and a sufficiently high photoelectric conversion output can be obtained by adding color information of a plurality of pixels for a dark portion in a scene.

In order to prevent a decrease in S/H in a dark portion of a scene, a relatively high standard signal level of an image pickup element is set. However, in an image pickup device obtained according to the present invention, the above-mentioned limitations can be relaxed. For this reason, the standard signal level of the image pickup element can be set to be low, and the dynamic range of the image pickup element can be widened accordingly.

Figure 88:
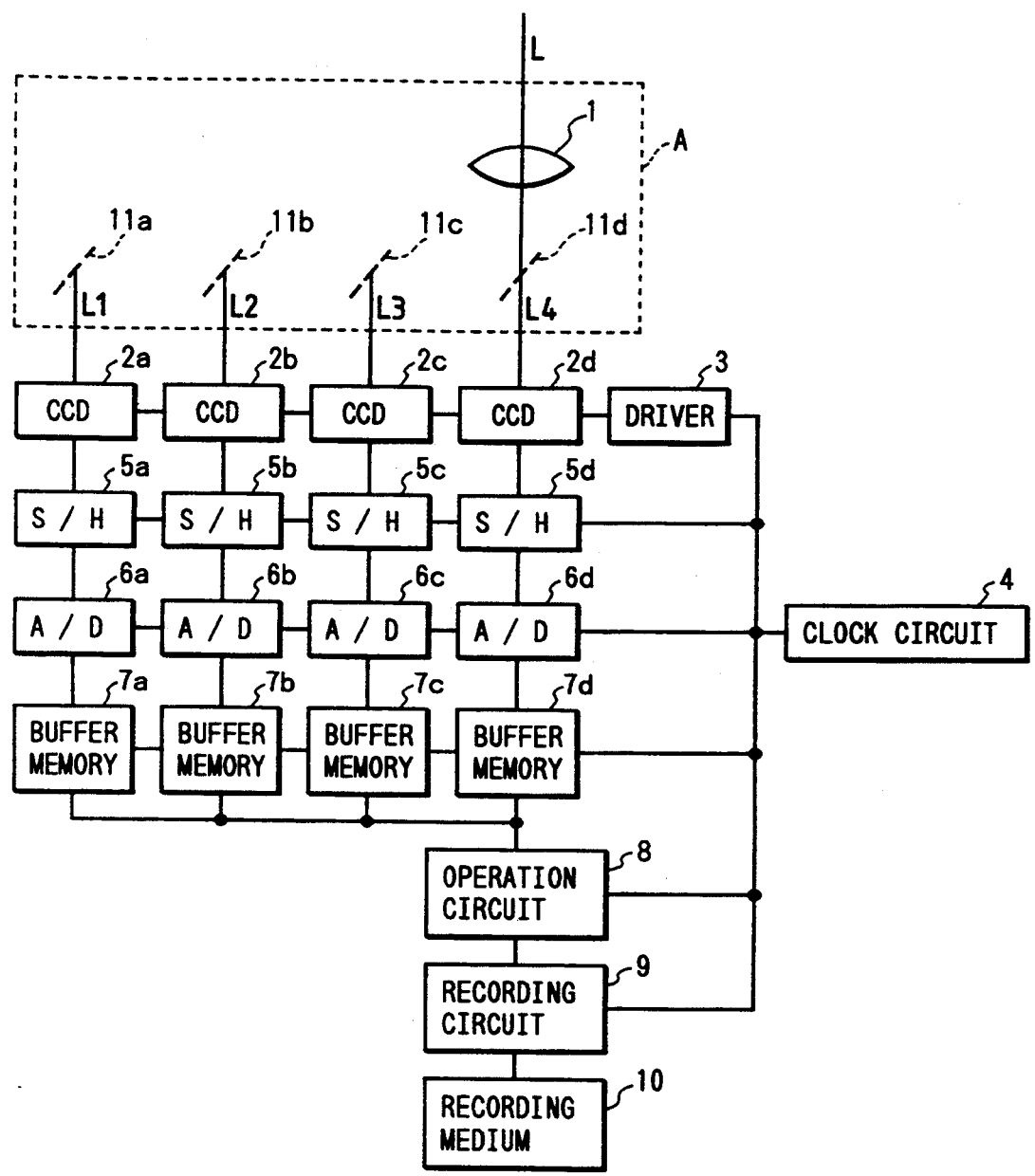
FIG. 88 is a block diagram showing a circuit arrangement according to the fourteenth embodiment of the present invention.

FIG. 88 is a block diagram showing a circuit arrangement according to the fourteenth embodiment of the present invention, which allows the above-mentioned color photographing operation. The same reference numerals in FIG. 88 denote the same parts as in FIG. 86. In FIG. 88, an optical system A for forming an image of an object is constituted by a lens 1 and four beam splitters 11a, 11b, 11c, and 11d comprising half mirrors. The beam splitters 11a, 11b, 11c, and 11d split light L incident on the optical system A into light beams L1 to L4 having equal light amounts, and form object images having the same size and brightness. The object images are respectively formed on image pickup elements 2a, 2b, 2c, and 2d, such as CCDs, MOS elements, image pickup tubes, or the like. The image pickup elements 2a, 2b, 2c, and 2d photoelectrically convert image pickup light from an object, and output image signals of respective color components in units of pixels.

The image pickup element 2a has no filter since it is used for a luminance photographing operation. However, red, green, and blue color filters are respectively arranged in front of light-receiving portions of the image pickup elements 2b, 2c, and 2d, and the respective color components are photographed by the image pickup elements 2b, 2c, and 2d. More specifically, the image pickup element 2b has the red filter since it is used for a red photographing operation, the image pickup element 2c has the green filter since it is used for a green photographing operation, and the image pickup element 2d has the blue filter since it is used for a blue photographing operation. In most of currently available multi-board type cameras, the image pickup element 2a for the luminance photographing operation is omitted. In this embodiment, for the sake of simplicity, a four-board type arrangement will be exemplified.

The circuit shown in FIG. 88 also includes a driver 3 for driving the image pickup elements 2a, 2b, 2c, and 2d, a clock circuit 4 for outputting a signal for controlling the operation timings of the respective circuit portions, S/H circuits 5a, 5b, 5c, and 5d for respectively sampling/holding output signals from the image pickup elements 2a, 2b, 2c, and 2d, A/D converters 6a, 6b, 6c, and 6d for converting the sampled/held signals into digital signals, buffer memories 7a, 7b, 7c, and 7d for storing the digital signals and necessary operation data, an operation circuit 8 for, when the output level of an image signal from the image pickup elements 2a, 2b, 2c, and 2d is equal to or lower than a predetermined value, adding and averaging image signals of neighboring pixels under the same condition, and a recording circuit 9 for recording image information of an object on a recording medium 10 on the basis of the output from the operation circuit 8.

The circuit shown in FIG. 88 independently processes the object luminance, red image information, green image information, and blue image information although it is basically the same as the circuit shown in FIG. 86. When the operation circuit 8 detects a dark portion (low-luminance portion) of an object, it searches if there is a neighboring dark portion. If a neighboring dark portion is detected, the operation circuit 8 outputs a signal obtained by adding and averaging outputs of pixels corresponding to these dark portions.

The operation of the circuit shown in FIG. 88 will be described below with reference to the flow chart shown in FIG. 87. An object image is formed on the light-receiving portions of the image pickup elements 2a, 2b, 2c, and 2d through the optical system A, and is exposed for a predetermined period of time (step 101). Thereafter, the driver 3 causes the image pickup elements 2a, 2b, 2c, and 2d to output image signals for one frame. These image signals are respectively stored in the buffer memories 7a, 7b, 7c, and 7d through the S/H circuits 5a, 5b, 5c, and 5d, and the A/D converters 6a, 6b, 6c, and 6d (step 102).

Signals in units of pixels from the image pickup element 2a, i.e., signals of I rows x J columns (I=1, 2, . . . , M, J=1, 2, . . . , N) pixels are sequentially read out from the luminance buffer memory 7a, and the readout signals are subjected to predetermined operation processing, or if necessary, signals of corresponding pixels from the image pickup elements 2b, 2c, and 2d are read out from the buffer memories 7b, 7c, and 7d, and the readout signals are subjected to predetermined operation processing. Thereafter, the readout signals are recorded on the recording medium 10. In this case, coordinates (I, J) are initialized to (I=1, J=1) (step 103), and thereafter, signals Sij of I rows x J columns pixels of the image pickup elements are read out (step 104).

The operation circuit 8 checks if the signal Sij of the readout pixel is smaller than a first threshold value T1 (Sij<T1) (step 105). If NO in step 105, three pieces of information of pixels (I, J) of the image pickup elements 2b, 2c, and 2d are directly recorded on the recording medium 10 (step 106). However, if YES in step 105, it is checked if the signal Sij is smaller than a second threshold value T2 (Sij<T2; T2<T1) (step 107). If NO in step 107, the above-mentioned eight neighboring pixels are searched to check if there are neighboring pixels satisfying the same condition (T2<Sij<T1) (step 108). At this time, if there are no neighboring pixels satisfying the same condition, the flow advances to step 106 to directly record three pieces of information of pixels (I, J) of the image pickup elements 2b, 2c, and 2d. However, if there are pixels satisfying the same condition, signals of the corresponding pixels from the buffer memories 7b, 7c, and 7d, and a signal of the detected neighboring pixel (one of a plurality of pixels if any) are averaged (step 109), and the average signal is recorded on the recording medium 10 as image information in step 106. In this case, like in the above embodiment, if there are a plurality of neighboring pixels satisfying the same condition, a pixel is selected in the order of a smaller influence on resolving power.

If it is determined in step 107 that the signal Sij is smaller than the second threshold value T2, it is checked if there are neighboring pixels satisfying the same condition (step 110). In this case, eight neighboring pixels are searched, and if four or more neighboring pixels satisfying the same condition are detected, the searching operation is stopped. However, if only three or less pixels are detected, the searching operation of another eight neighboring pixels using a neighboring pixel under the same condition as a central pixel is repeated. However, if no pixel satisfying the same condition is detected, the flow advances to step 106. If neighboring pixels satisfying the same condition are detected, it is checked if four or more pixels are detected (step 111). If NO in step 111, signals of pixels, corresponding to the detected pixels, from the buffer memories 7b, 7c, and 7d are added and averaged (step 112), and the flow then advances to step 106. However, if four or more pixels are detected, four signals of the detected pixels are averaged (step 113), and the flow advances to step 106.

Upon completion of recording of image information of the pixel (I, J), like in the above embodiment, it is checked if the value of the column J is the last value N (step 115). If NO in step 115, the value of the column J is incremented by one (step 116), and the flow returns to step 104; otherwise, it is checked if the value of the row I is the last value M (step 117). If NO in step 117, the value of the row I is incremented by one (step 118), and the flow returns to step 104; otherwise, this operation is ended.

In this manner, pieces of image information of the image pickup elements 2b, 2c, and 2d in units of color components are recorded on the recording medium 10. In this embodiment, satisfactory image information in units of colors can be obtained even for a dark portion as well as a bright portion of an object, and the same effect as in the above-mentioned embodiment can be obtained.

As described above, according to this embodiment, when the level of a signal in units of pixels output from the image pickup element is equal to or lower than a predetermined value, signals of neighboring pixels satisfying the same condition are added and averaged, and the average signal is used as image signals of these pixels. For this reason, high image quality can be obtained even for a dark portion as well as a bright portion of an object. In addition, the standard signal level of the image pickup element can be set to be low, and the dynamic range of the image pickup element can be widened accordingly.

What is claimed is:

1. An image pickup device comprising:
   split means for splitting image pickup light from an object into a plurality of beams in equal light amounts, and forming an object image which is split into a plurality of image portions on a plurality of image formation planes;
   a plurality of image pickup elements, light-receiving portions of which are arranged at positions which are not adjacent to each other on each image formation plane when the object image is split into the plurality of image portions on each image formation plane, so that each of the light-receiving portions on an image formation plane partially overlaps the light-receiving portion of at least a neighboring position of another image formation plane;
   an image synthesizing circuit for receiving information from said image pickup elements, and synthesizing the object image; and
   a correction circuit for comparing outputs from the overlapped portions of the light-receiving portions of said image pickup elements, and adjusting sensitivity levels of said image pickup elements.

2. A device according to claim 1, wherein said image pickup elements are controlled by a timing signal from a single clock generation circuit.

3. An image pickup device according to claim 1, wherein non-reflection members are arranged on portions of the image formation plane where no image pickup elements are arranged.

4. A device according to claim 3, wherein said image pickup elements are controlled by a timing signal from a single clock generation circuit.

5. An image pickup device comprising:
   split means for splitting image pickup light from an object into a plurality of beams in equal light amounts, and forming an object image which is split into a plurality of image portions on a plurality of image formation planes;
   a plurality of image pickup elements each having a plurality of light-receiving portions, which are split on a plane, the light-receiving portions being arranged at positions which are not adjacent to each other on each image formation plane when the object image is split into the plurality of image portions on each image formation plane, each of the light-receiving portions on an image formation plane partially overlapping a light-receiving portion of at least a neighboring position of another image formation plane;
   an image synthesizing circuit for receiving information from said image pickup elements, and synthesizing the object image; and
   correction means for comparing outputs from the overlapped portions of the light-receiving portions of said image pickup elements, and adjusting sensitivity levels of said image pickup elements.

6. A device according to claim 5, wherein said image pickup elements are controlled by a timing signal from a single clock generation circuit.

7. An image pickup device comprising:
   split means for splitting image pickup light from an object into a plurality of beams in equal light amounts, and forming an object image which is split into a plurality of image portions on a plurality of image formation planes;
   a plurality of image pickup elements, light-receiving portions of which are arranged at positions which are not adjacent to each other on each image formation when the object image is split into the plurality of image portions on each image formation plane, so that each of the light-receiving portions on an image formation plane partially overlaps the light-receiving portion of at least a neighboring position of another image formation plane;
   an image synthesizing circuit for receiving information from said image pickup elements, and synthesizing the object image;

adjusting means for setting a photographing condition by utilizing an output from one of said plurality of image pickup elements; and correction means for comparing inputs from the overlapped portions of the light-receiving portions of said image pickup elements, and adjusting sensitivity said image pickup elements.

8. A device according to claim 7, wherein said image pickup elements are controlled by a timing signal from a single clock generation circuit.

9. A device according to claim 7 or 8, wherein said adjusting means performs automatic exposure adjustment.

10. A device according to claim 7 or 8, wherein said adjusting means performs automatic focus adjustment.

11. A device according to claim 7 or 8, wherein said adjusting means performs automatic white balance adjustment.

12. A device according to claim 9, wherein said adjusting means performs automatic focus adjustment.

13. A device according to claim 9, wherein said adjusting means performs automatic white balance adjustment.

14. A device according to claim 10, wherein said adjusting means performs automatic white balance adjustment.

15. An image pickup device comprising:

split means for splitting image pickup light from an object into a plurality of beams in equal light amounts, and forming an object image which is split into a plurality of image portions on a plurality of image formation planes;

a plurality of image pickup element chips each having a plurality of light-receiving portions, which are split on a plane, the light-receiving portions being arranged at positions which are not adjacent to each other on each image formation plane when the object image is split into the plurality of image portions on each image formation plane, so that each of the light-receiving portions on an image formation plane partially overlaps the light-receiving portion of at least a neighboring position of another image formation plane;

an image synthesizing circuit for receiving information from said image pickup element chips, and synthesizing the object image, wherein a peripheral portion of a corresponding image pickup element is formed between the split light-receiving portions of each of said image pickup element chips; and correction means for comparing outputs from the overlapped portions of the light-receiving portions of said image pickup element chips, and adjusting sensitivity levels of said image pickup element chips.

16. A device according to claim 15, wherein driving circuits for driving said image pickup element chips are arranged in correspondence with the light-receiving portions, and are controlled by a timing signal from a single clock generation circuit.

17. A device according to claim 15 or 16, wherein each of said image pickup element chips multiplexes information from the light-receiving portions, and outputs the multiplexed information.

18. An image pickup device comprising:

split means for splitting image pickup light from an object into a plurality of beams in equal light amounts, and forming an object image which is split into a plurality of image portions on a plurality of image formation planes;

a plurality of image pickup element chips each having a plurality of light-receiving portions, which are split on a plane, the light-receiving portions being arranged at positions which are not adjacent to each other on each image formation plane when the object image is split into the plurality of image portions on each image formation plane so that each of the light-receiving portions on an image formation plane partially overlaps the light-receiving portion of at least a neighboring position on another image formation plane;

an image synthesizing circuit for receiving information from said image pickup element chips, and synthesizing the object image, wherein a wiring pattern to be connected to a connection portion arranged at a side edge of each of said image pickup element chips is formed between the split light-receiving portions of each of said image pickup element chips; and correction means for comparing outputs from the overlapped portions of the light-receiving portions of said image pickup element chips, and adjusting sensitivity levels of said image pickup element chips.

19. A device according to claim 18, wherein driving circuits for driving said image pickup element chips are arranged in correspondence with the light-receiving portions, and are controlled by a timing signal from a single clock generation circuit.

* * * * *

UNITED STATES PATENT AND TRADEMARK OFFICE
CERTIFICATE OF CORRECTION

PATENT NO. : 5,386,228
DATED : January 31, 1995
INVENTOR : TADASHI OKINO

It is certified that error appears in the above-identified patent and that said Letters Patent is hereby corrected as shown below:

ON THE TITLE PAGE

At [56] References Cited

Under "U.S. PATENT DOCUMENTS"

"Kameko et al." should read --Kaneko et al.--.

COLUMN 6

Line 33, "showing," should read --showing--.

COLUMN 9

Line 50, "images/in" should read --images (in--.

COLUMN 21

Line 53, "34," should read --134,--.

COLUMN 33

Line 6, "chip" should read --chip 10--.

COLUMN 50

Line 60, "mation" should read --mation plane--.

UNITED STATES PATENT AND TRADEMARK OFFICE
CERTIFICATE OF CORRECTION

PATENT NO. : 5,386,228

DATED : January 31, 1995

INVENTOR : TADASHI OKINO

It is certified that error appears in the above-identified patent and that said Letters Patent is hereby corrected as shown below:

<u>COLUMN 51</u>

Line 4, "inputs" should read --outputs--.
Line 7, "tivity" should read --tivity levels of--.

Signed and Sealed this

Thirtieth Day of May, 1995

*Attest:*

BRUCE LEHMAN

*Attesting Officer*  *Commissioner of Patents and Trademarks*